(12) United States Patent
Komoto et al.

(10) Patent No.: US 8,929,599 B2
(45) Date of Patent: Jan. 6, 2015

(54) ARTICULATION REGION DISPLAY APPARATUS, ARTICULATION REGION DETECTING APPARATUS, ARTICULATION REGION BELONGINGNESS CALCULATING APPARATUS, ARTICULATED OBJECT REGION BELONGINGNESS CALCULATING APPARATUS, AND ARTICULATION REGION DISPLAY METHOD

(75) Inventors: Ayako Komoto, Osaka (JP); Kunio Nobori, Osaka (JP); Masahiro Iwasaki, Kyoto (JP)

(73) Assignee: Panasonic Corporation, Osaka (JP)

( * ) Notice: Subject to any disclaimer, the term of this patent is extended or adjusted under 35 U.S.C. 154(b) by 399 days.

(21) Appl. No.: 13/536,131

(22) Filed: Jun. 28, 2012

(65) Prior Publication Data

US 2012/0269393 A1    Oct. 25, 2012

Related U.S. Application Data

(63) Continuation of application No. PCT/JP2011/007140, filed on Dec. 20, 2011.

(30) Foreign Application Priority Data

Jan. 26, 2011    (JP) ................................ 2011-014422

(51) Int. Cl.
G06K 9/00    (2006.01)
G06T 13/40    (2011.01)

(52) U.S. Cl.
CPC ............ *G06T 13/40* (2013.01); *G06K 9/00342* (2013.01)
USPC ...................................................... 382/103

(58) Field of Classification Search
None
See application file for complete search history.

(56) References Cited

U.S. PATENT DOCUMENTS

| 2008/0112592 A1 | 5/2008 | Wu et al. |
| 2011/0002509 A1 | 1/2011 | Nobori et al. |
| 2011/0228987 A1 | 9/2011 | Iwasaki et al. |

FOREIGN PATENT DOCUMENTS

| JP | 8-214289 | 8/1996 |
| JP | 2007-4732 | 1/2007 |
| JP | 2007-199864 | 8/2007 |
| JP | 2007-333690 | 12/2007 |

(Continued)

OTHER PUBLICATIONS

Chen, Lulu, Hong Wei, and James Ferryman. "A survey of human motion analysis using depth imagery." Pattern Recognition Letters 34.15 (2013): 1995-2006.*

(Continued)

*Primary Examiner* — Stephen R Koziol
*Assistant Examiner* — Raphael Schwartz
(74) *Attorney, Agent, or Firm* — Wenderoth, Lind & Ponack, LLP

(57) ABSTRACT

An articulation region display apparatus includes: an articulatedness calculating unit calculating an articulatedness, based on a temporal change in a point-to-point distance and a temporal change in a geodetic distance between given trajectories; an articulation detecting unit detecting, as an articulation region, a region corresponding to a first trajectory based on the articulatedness between the trajectories, the first trajectory being in a state where the regions corresponding to the first trajectory and a second trajectory are present on the same rigid body, the regions corresponding to the first trajectory and third trajectory are present on the same rigid body, and the region corresponding to the second trajectory is connected with the region corresponding to the third trajectory via the same joint; and a display control unit transforming the articulation region into a form visually recognized by a user, and output the transformed articulation region.

26 Claims, 23 Drawing Sheets

(56) References Cited

FOREIGN PATENT DOCUMENTS

| WO | 2010/050110 | 5/2010 |
|----|-------------|--------|
| WO | 2010/079556 | 7/2010 |

OTHER PUBLICATIONS

Oda, Takuya, et al. "Interactive skeleton extraction using geodesic distance." Artificial Reality and Telexistence—Workshops, 2006. ICAT'06. 16th International Conference on. IEEE, 2006.*

P. Anandan, "A Computational Framework and an Algorithm for the Measurement of Visual Motion", International Journal of Computer Vision, vol. 2, pp. 283-310, Jan. 1989.

Vladimir Kolmogorov et al., "Computing Visual Correspondence with Occlusions via Graph Cuts", International Conference on Computer Vision, 2001.

Jianbo Shi et al., "Good Features to Track", IEEE Conference on Computer Vision and Pattern Recognition, pp. 593-600, Jun. 1994.

E. W. Dijkstra, "A note on two problems in connexion with graphs", Numerische Mathematik, pp. 269-271, 1959.

* cited by examiner (a) Picture of frame 1

(b)

(c)

(d)

(e)

(f) Picture of frame T

FIG. 9

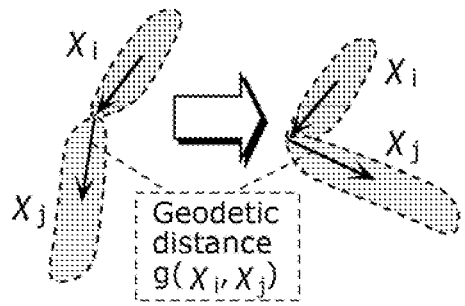

(a) Articulated motion
Temporal change in geodetic distance
(Time: $t = T \rightarrow t = T + \delta$ )

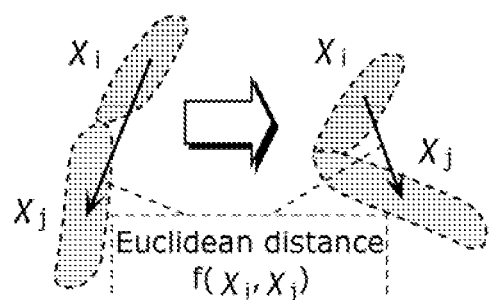

(b) Articulated motion
Temporal change in Euclidean distance
(Time: $t = T \rightarrow t = T + \delta$ )

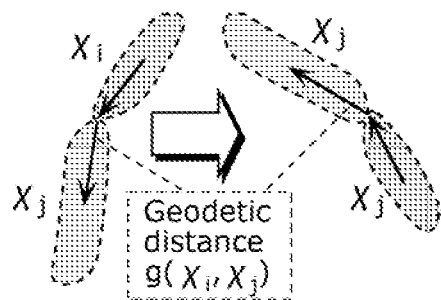

(c) Rigid body motion
Temporal change in geodetic distance
(Time: $t = T \rightarrow t = T + \delta$ )

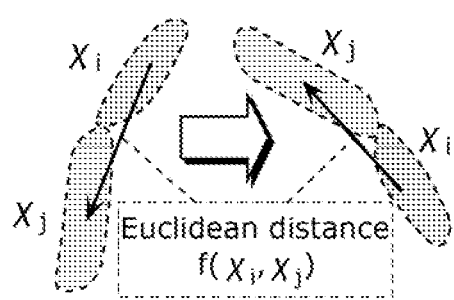

(d) Rigid body motion
Temporal change in Euclidean distance
(Time: $t = T \rightarrow t = T + \delta$ )

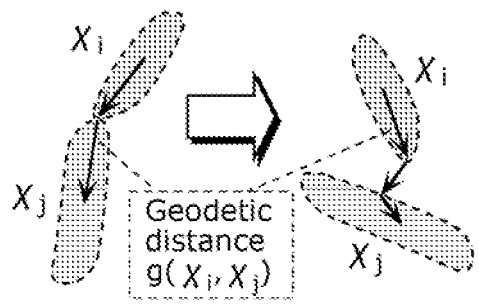

(e) Non-articulated motion
Temporal change in geodetic distance
(Time: $t = T \rightarrow t = T + \delta$ )

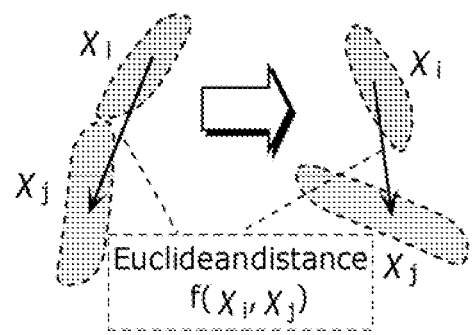

(f) Non-articulated motion
Temporal change in Euclidean distance
(Time: $t = T \rightarrow t = T + \delta$ )

Diagram illustrating relationship between values of gt and ft and articulatedness FIG. 16
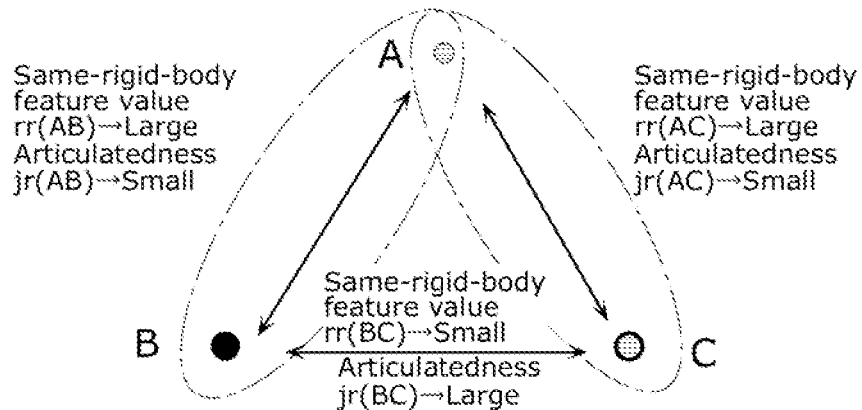
(a) diagram illustrating three trajectories (one joint, two different rigid bodies) on articulation
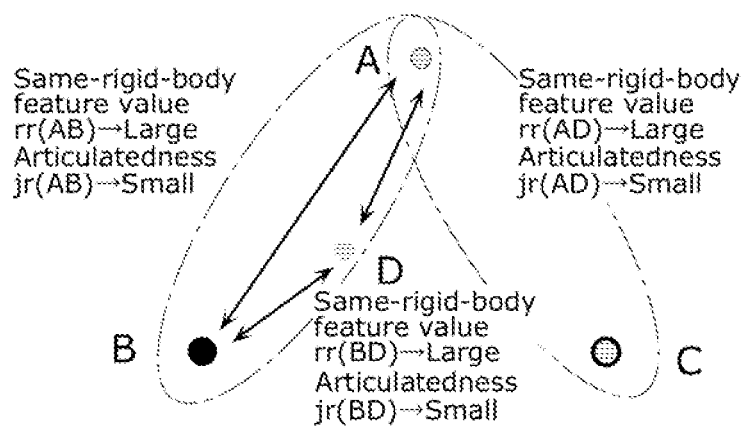
(b) diagram illustrating three trajectories (one joint) on the same rigid body
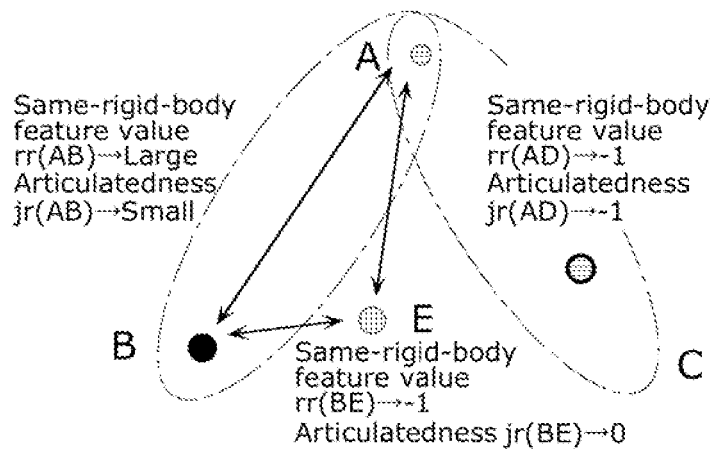
(c) diagram illustrating three trajectories (one joint) on the same rigid body FIG. 18
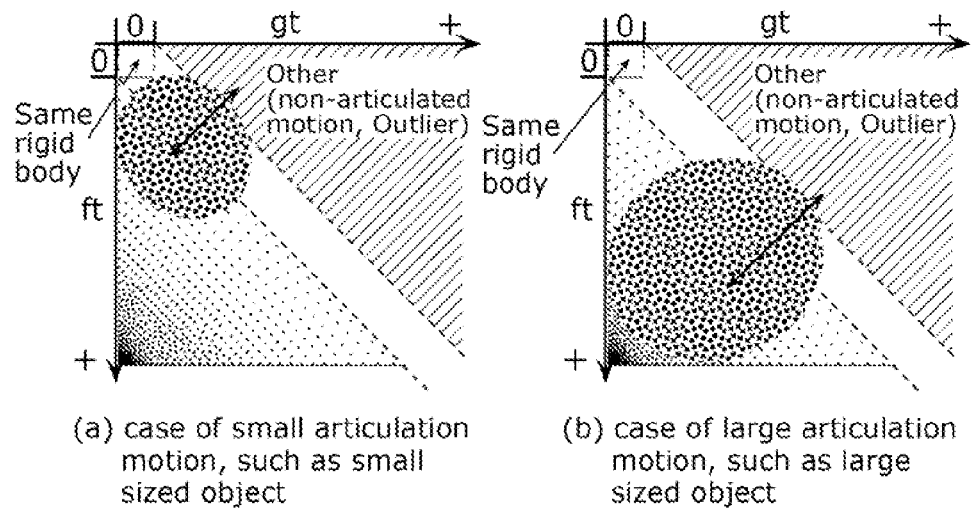
(a) case of small articulation motion, such as small sized object
(b) case of large articulation motion, such as large sized object
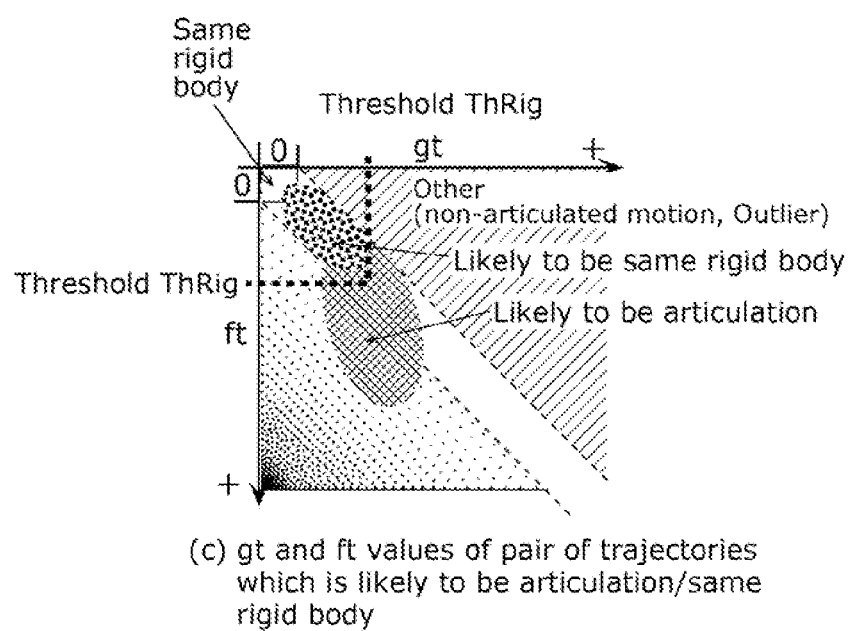
(c) gt and ft values of pair of trajectories which is likely to be articulation/same rigid body

ARTICULATION REGION DISPLAY APPARATUS, ARTICULATION REGION DETECTING APPARATUS, ARTICULATION REGION BELONGINGNESS CALCULATING APPARATUS, ARTICULATED OBJECT REGION BELONGINGNESS CALCULATING APPARATUS, AND ARTICULATION REGION DISPLAY METHOD

CROSS REFERENCE TO RELATED APPLICATION

This is a continuation application of PCT Patent Application No. PCT/JP2011/007140 filed on Dec. 20, 2011, designating the United States of America, which is based on and claims priority of Japanese Patent Application No. 2011-014422 filed on Jan. 26, 2011. The entire disclosures of the above-identified applications, including the specifications, drawings and claims are incorporated herein by reference in their entirety.

TECHNICAL FIELD

Apparatuses and methods consistent with one or more exemplary embodiments of the present disclosure relate generally to a technique for extracting and displaying a region of a moving object in an image based on motion information in video including plural images. The apparatuses and methods relate particularly to an articulation (or "joint") region display apparatus and the like for detecting, for an object such as a person that moves changing an outline shape, an articulation which is held characteristically by such a moving object, and displaying the detected articulation. As mentioned, both the term "joint" and "articulation" region can be used to describe the region corresponding to the center position, where the rigid parts of the articulated object are connected to each other, and around which they make articulated motion.

BACKGROUND ART

Research and development has been widely carried out on a region extraction technique with which a region of a moving object in an image is extracted from the image including an image of the moving object (hereinafter referred simply to as "moving object"). The technique of extracting a region of a moving object is, particularly when the moving object is a person, a fundamental technique used widely in common for: focus control and image quality improvement processing for digital video cameras or digital still cameras; image quality improvement processing; image synthesis processing for movie production; safe driving support system for vehicles; or prediction of human behavior, operating analysis, and so on. The technique of extracting a region of a moving object in an image includes, as a general method, a method of detecting a region of a moving object by evaluating the similarity between a moving object model prepared in advance and a candidate region for the moving object in the image.

The method includes, as a representative method, a method of extracting a candidate of a moving object region from an image, and then evaluates the similarity between the candidate of a moving object region that has been extracted and a moving object model prepared in advance to extract a region with high similarity as the moving object region. Furthermore, for extracting a region of a moving object which walks changing shape, such as a walking person or the like, another method using a moving object model considering shape change is used.

According to a method described in Patent Literature (PTL) 1, for example, a silhouette image of a moving object is extracted from plural images, as a candidate for a moving object region. PTL 1 further discloses a method of evaluating the similarity between a model related to a change in shape of the moving object that has been parameterized in advance and the silhouette image that has been extracted, so that a parameter of a region with high similarity and the model are estimated. Since this allows applying the parameterized model to a human figure that moves periodically changing shape, it is possible to perform extraction of a region of the moving object such as a human.

In addition, an image analysis method for extracting more detailed motion data or a shape from an image is proposed in order to generate an image of an articulated object such as a human.

For example, PTL 2 discloses further estimating, based on rough motion information of an articulation and a part which is obtained by applying a previously held model having an articulation to an articulated object in an obtained image, a position and the motion information of the articulation and the part in more detail. This allows generating a new image in which information including the shape and motion of a part of an articulated object in an image is reflected. Compared to the case where only the parameter calculated in advance is used, parameterization of the shape and motion of the part of a person in the image is made possible with higher accuracy because information is extracted from the articulated object in the image. This makes it possible to apply the parameterized model with higher accuracy also to the person that moves changing shape, thereby allowing extraction of a region of the moving object with higher accuracy.

CITATION LIST

Patent Literature

[PTL 1] Japanese Unexamined Patent Application Publication No. 8-214289
[PTL 2] Japanese Unexamined Patent Application Publication No. 2007-4732

SUMMARY OF INVENTION

Technical Problem

However, the conventional techniques of region extraction do not enable correctly extracting a moving object in such a case where the shape of the moving object significantly changes due to a change in a posture or a size, in a scene in which plural persons walk, for example.

Solution to Problem

One or more exemplary embodiments of the present disclosure may overcome the above disadvantage and other disadvantages not described herein. However, it is understood that one or more exemplary embodiments of the present disclosure are not required to overcome or may not overcome the disadvantage described above and other disadvantages not described herein. One or more exemplary embodiments of the present disclosure provide an articulation region (joint region) display apparatus and the like which is capable of correctly extracting a moving object in such a case where the shape of the moving object significantly changes due to a change in a posture or a size, in a scene in which plural persons walk, for example. Hereafter, we use the word "articulatedness" between a pair of trajectories as a pair-wise measure to describe how likely a pair of trajectories or a pair of regions each corresponding to them is connected to each other via a joint, that is, how likely the pair is on the same articulated object. According to an exemplary embodiment of the present disclosure, an articulation region display apparatus which (i) detects an articulation region (joint region), using trajectories corresponding, in a one-to-one relationship, to regions included in a moving object in video and (ii) displays the detected articulation region includes: an articulatedness calculating unit configured to: calculate, for a pair of given trajectories among trajectories each of which is a motion trajectory of a block and spans pictures included in the video, (i) a point-to-point distance that is a direct distance between the trajectories of the pair of trajectories and (ii) a geodetic distance that is a distance of a path that passes through, as a relay point, a trajectory other than the trajectories of the pair of trajectories, from one of the trajectories of the pair of trajectories to reach the other; and calculate an articulatedness based on a temporal change in the point-to-point distance between the trajectories and a temporal change in the geodetic distance between the trajectories, the block including one or more pixels each of which constitutes a corresponding one of the pictures, and the articulatedness being a degree of likelihood that regions corresponding, in a one-to-one relationship, to the trajectories are connected via a same joint; an articulation detecting unit configured to detect, as an articulation region, a region corresponding to a first trajectory, based on the articulatedness between the trajectories obtained by the articulatedness calculating unit, the first trajectory being in a state where the region corresponding to the first trajectory and a region corresponding to a second trajectory are on a same rigid body, the region corresponding to the first trajectory and a region corresponding to a third trajectory are on a same rigid body, and the region corresponding to the second trajectory is connected with the region corresponding to the third trajectory via a same joint; and a display control unit configured to transform the articulation region detected by the articulation detecting unit into a form that can be visually recognized by a user, and output each of the pictures.

It is to be noted that the present inventive concept can be implemented not only as an articulation region display apparatus including characteristic processing units described above but also as an articulation region display method having, as steps, the characteristic processing units included in the articulation region display apparatus. In addition, the present inventive concept can also be implemented as a program which causes a computer to execute the characteristic steps included in the articulation region display method. Furthermore, it should be understood that such a program can be distributed via a non-transitory computer-readable recording medium such as a CD-ROM (Compact Disc Read Only Memory) and a communications network such as the Internet. In addition, an articulation region detecting apparatus, an articulation region belongingness (which describes how likely a trajectory belongs to an articulation region) calculating apparatus, and an articulated object region belongingness calculating apparatus also can be implemented as methods or programs in the same manner as above.

Advantageous Effects of Invention

According to various exemplary embodiments of the present disclosure, it is possible to . . .

According to various exemplary embodiments of the present disclosure, it is possible to correctly extract a moving object in such a case where the shape of the moving object significantly changes due to a change in a posture or a size, in a scene in which plural persons walk, for example.

BRIEF DESCRIPTION OF DRAWINGS

These and other advantages and features of exemplary embodiments of the present disclosure will become apparent from the following description thereof taken in conjunction with the accompanying Drawings that illustrate general and specific exemplary embodiments of the present disclosure. In the Drawings:

FIG. 9 is a diagram which shows a temporal change of the geodetic distance and the point-to-point distance between trajectories, involved with various motions of a rigid body;

FIG. 16 is a diagram which shows a trajectory of a joint, a trajectory on a rigid body, and a trajectory of an outlier;

FIG. 18 is a diagram which shows a region in which values of the temporal change of a geodetic distance and values of the temporal change of the point-to-point distance are distributed;

Figure 1:
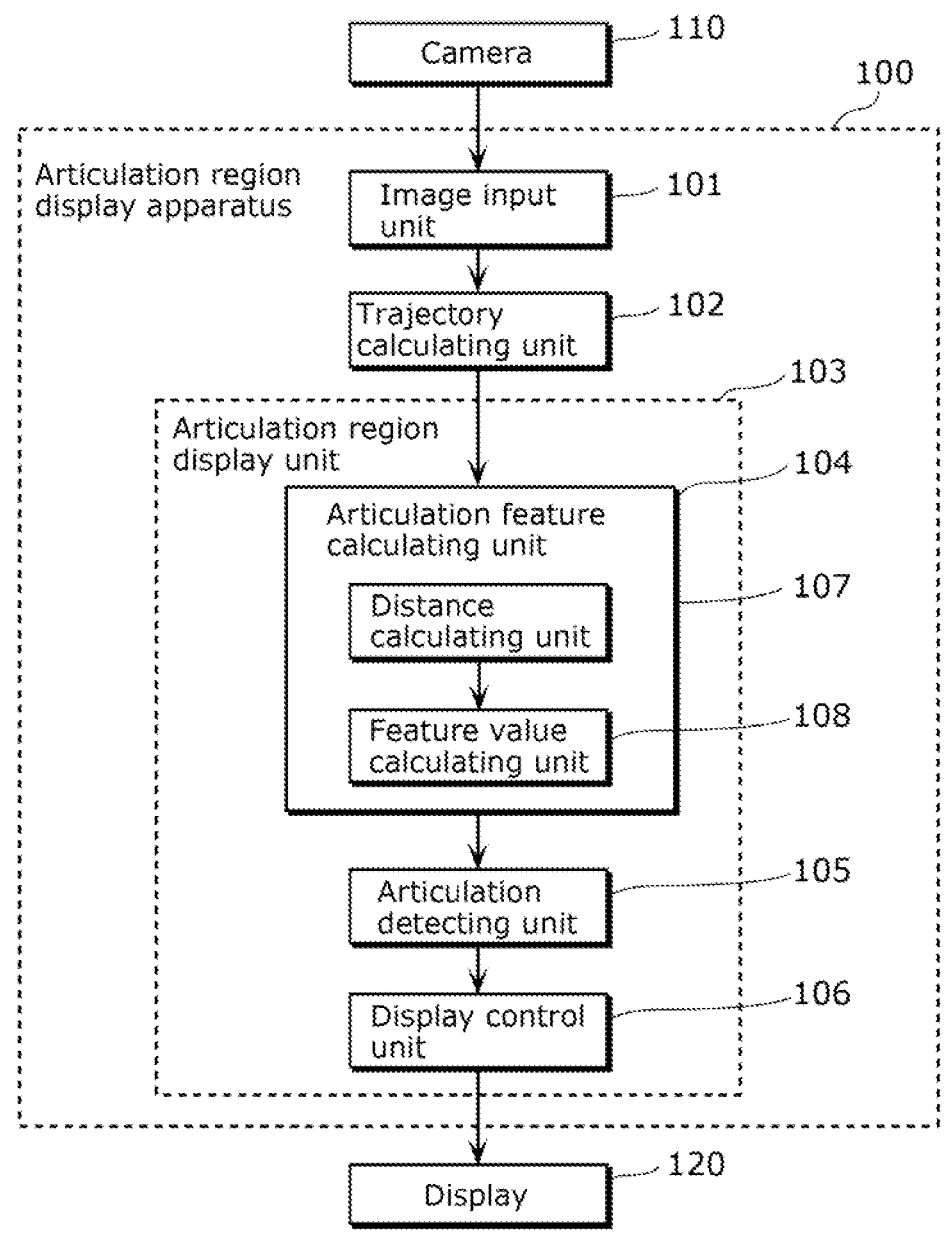
FIG. 1 is a diagram which shows a configuration of an articulation region display apparatus according to Embodiment 1 of the present disclosure.

DESCRIPTION OF EMBODIMENTS (Underlying Knowledge Forming Basis of the Present Disclosure)

With the method of extracting a region using a model prepared in advance as represented by the method described in PTL 1, it is necessary to extract a candidate for a moving object region from an image. In performing this, unless the candidate for a moving object region is appropriately extracted, it is not possible to correctly apply, to the candidate for the moving object region, the model obtained by parameterizing the moving object. In the scene described above, in particular, since the shape of the moving object significantly changes due to a change in the posture, size, or the like of the moving object, it is difficult to appropriately extract the candidate for a moving object region. Furthermore, even if the candidate for the moving object region is appropriately extracted, there is yet another problem as below.

When the moving object is an object which involves an articulated motion, such as a person, the range of changes in an image due to a variety of postures, positions, or a size of the moving object becomes significantly large. For this reason, a huge number of parameters are required when performing parameterization on the moving object model. This induces an error in applying a model. Thus, there is a problem in that the moving object cannot be detected correctly. For example, plural moving objects are erroneously regarded as one moving object in extracting a region, or a region in which a moving object to be extracted does not exist is erroneously extracted as a moving object.

With the method as represented by the method described in PTL 2, in addition to applying an articulated object to a model generated in advance as described in PTL 1, a more detailed parameter related to an articulated object in an image is estimated based on a result of applying the articulated object to the generated model, and thus the possibility of correctly extracting a moving object increases.

However, in the same manner as in PTL 1, when appropriate extraction of the candidate for a moving object region fails, or applying the articulated object to the generated model fails, subsequent parameter estimation fails and thus the articulated object cannot be correctly parameterized, resulting in failing to correctly extract the moving object region in some cases.

In view of the above, according to the present disclosure, a moving object is not applied to the model, and a region extraction of an articulation and a moving object including an articulation is performed based on "motion information" of the articulation. In particular, a method is proposed which allow region extraction from video for a moving object, represented by a person, which involves an articulated motion and involves temporally a significant change in the shape of the moving object due to a change in a posture and the like.

It is to be noted that, in the present application, an "articulated motion" refers to an articulated motion which is represented by a motion made as articulated parts, such as limbs or legs, of a person who moves, for example.

An example of an object that involves articulated motion, other than a person, is: an object composed by a large number of articulations having little distance therebetween such as a motion of a snake or a centipede; an object having a large number of bones (arms) extending from a single joint (articulation) such as frames of an umbrella; and a mobile or the like.

In the conventional techniques of region extraction, there are many cases in which an object is separated and extracted at a position having such an articulated motion. A position of "articulation" is detected according to the present disclosure, and thus it is possible, in such a case as well, to extract and display the entire object without separation of the object.

One or more exemplary embodiments of the present disclosure provide an articulation region display apparatus and the like which are capable of correctly detecting, in a moving object that involves articulated motion, a sub region, without separately extracting the sub region in the same moving object and without being affected by a change in a shape of the moving object, and thus it is possible to detect and display an articulation position at which an articulated motion is involved on the moving object.

In addition, one or more exemplary embodiments of the present disclosure provide an articulation region detecting apparatus which id capable of correctly detecting, in a moving object that involves articulated motion, a sub region, without separately extracting the sub region in the same moving object and without being affected by a change in a shape of the moving object, and thus it is possible to detect an articulation position at which an articulated motion is involved on the moving object.

In addition, one or more exemplary embodiments of the present disclosure provide an articulation region belongingness calculating apparatus capable of correctly calculating belongingness of a trajectory of a moving object to an articulation region without being affected by a change in a shape of the moving object.

In addition, one or more exemplary embodiments of the present disclosure provide an articulated object region belongingness calculating apparatus capable of correctly calculating belongingness of the trajectory to an articulated object region that is a region connected via an articulation region without being affected by a change in a shape of the moving object.

Hereinafter, embodiments of the present disclosure will be described in detail with reference to the drawings. It is to be noted that each of the embodiments described below shows a specific example of an implementation of the present disclosure. Any numerical number, shape, constituent element, connection form of the constituent elements, steps, and order of steps described in the following embodiments are mere examples, and these are not intended to limit the present disclosure. The present disclosure is limited only by the CLAIMS. Accordingly, of the constituent elements in the embodiments below, some constituent elements that are not described in independent claims representing highest concepts of the present disclosure are described as not essential but as components of a more preferable embodiment.

According to an exemplary embodiment of the present disclosure, an articulation region display apparatus which (i) detects an articulation region, using trajectories corresponding, in a one-to-one relationship, to regions included in a moving object in video and (ii) displays the detected articulation region, the articulation region display apparatus includes: an articulatedness calculating unit configured to: calculate, for a pair of given trajectories among trajectories each of which is a motion trajectory of a block and spans pictures included in the video, (i) a point-to-point distance that is a direct distance between the trajectories of the pair of trajectories and (ii) a geodetic distance that is a distance of a path that passes through, as a relay point, a trajectory other than the trajectories of the pair of trajectories, from one of the trajectories of the pair of trajectories to reach the other; and calculate an articulatedness based on a temporal change in the point-to-point distance between the trajectories and a temporal change in the geodetic distance between the trajectories, the block including one or more pixels each of which constitutes a corresponding one of the pictures, and the articulatedness indicating a degree of likelihood that regions corresponding, in a one-to-one relationship, to the trajectories are connected via a same joint; an articulation detecting unit configured to detect, as an articulation region, a region corresponding to a first trajectory, based on the articulatedness between the trajectories obtained by the articulatedness calculating unit, the first trajectory being in a state where the region corresponding to the first trajectory and a region corresponding to a second trajectory are present on a same rigid body, the region corresponding to the first trajectory and a region corresponding to a third trajectory are present on a same rigid body, and the region corresponding to the second trajectory is connected with the region corresponding to the third trajectory via a same joint; and a display control unit configured to transform the articulation region detected by the articulation detecting unit into a form that can be visually recognized by a user, and output each of the pictures.

With the configuration described above, the articulation region is extracted based on a temporal change in the geodetic distance and a temporal change in a point-to-point distance between trajectories, thereby enabling accurate detection of an articulation position without being affected by a change in the shape of a moving object. It is therefore possible to correctly extract a moving object in such a case where the shape of the moving object significantly changes due to a change in a posture or a size, in a scene in which plural persons walk, for example.

To be more specific, the articulation detecting unit may calculate a jointness based on the articulatedness between the trajectories obtained by the articulatedness calculating unit, and detect the articulation region from the calculated jointness, the jointness indicating that a possibility that the region corresponding to the first trajectory is included in the articulation region increases with a higher likelihood that the region corresponding to the first trajectory and the region corresponding to the second trajectory are present on the same rigid body, the region corresponding to the first trajectory and the region corresponding to the third trajectory are present on the same rigid body, and the region corresponding to the second trajectory is connected with the region corresponding to the third trajectory via the same joint.

In addition, the articulation detecting unit may detect, on the picture, a region to which a trajectory corresponding to a local maximum value of the calculated jointness belongs, as the articulation region.

With the configuration described above, an articulation region (joint region) is detected and displayed, based on the temporal change in the geodetic distance and the temporal change in a point-to-point distance between trajectories, thereby enabling accurate display of the articulation region without being affected by a change in the shape of a moving object. Hereinafter, the articulation region is also referred to as the joint region.

More specifically, a trajectory of which the temporal change in the geodetic distance and the temporal change in the point-to-point distance are zero with respect to each of the trajectories is detected as a trajectory that belongs to a rigid body region.

Through the processes described above, it is possible to detect, among trajectories included in two detected rigid body regions, a trajectory included in both of the two rigid body regions, as a trajectory included in an articulation region, and to display the detected trajectory.

In addition, the articulation detecting unit may (i) select trajectories in pairs from among the trajectories other than a target trajectory, (ii) calculate the jointness of the target trajectory, and (iii) determine whether or not a region corresponding to the target trajectory is the articulation region, based on the calculated jointness that is calculated by summing the articulatedness of the selected pairs of trajectories, using the first trajectory as the target trajectory and the second trajectory and the third trajectory as the trajectories of the pair of trajectories.

With the configuration described above, it is also possible to calculate an articulation region by performing processing on all of the pairs of trajectories.

Through the processes described above, it is possible to simultaneously detect a large number of articulations, and since an articulation region is (i) less detectable from trajectories of an articulation region detected from a pair of trajectories which is less likely to be articulated and (ii) more detectable from trajectories of an articulation region detected from a pair of trajectories which is more likely to be articulated, it is possible to more stably detect an articulation. The a pair of trajectories which is more likely to be articulated is a pair of trajectories in which rigid bodies including the trajectories that make the pair of trajectories are connected via the same articulation region (or you can just call it as "joint region".)

At this time, it is possible to reduce calculation amount compared to the case where all of the pairs of trajectories are calculated afterwards, by calculating in advance, for each of the trajectories, a rigid body region including each of the trajectories.

In addition, the articulation detecting unit may detect a trajectory included in a same rigid body, by determining, based on the articulatedness between the trajectories calculated by the articulatedness calculating unit, whether or not regions corresponding to the trajectories of the pair of trajectories are present on the same rigid body, and then detect, as the articulation region, the region corresponding to the first trajectory in a state where the region corresponding to the first trajectory and the region corresponding to the second trajectory are present on the same rigid body, the region corresponding to the first trajectory and the region corresponding to the third trajectory are present on the same rigid body, and the region corresponding to the second trajectory is connected with the region corresponding to the third trajectory via the same joint.

By doing so, it is possible to efficiently detect an articulation.

In addition, the articulation detecting unit may detect, using only a trajectory having the articulatedness between the trajectories which is calculated by the articulatedness calculating unit and which is equal to or smaller than a predetermined threshold, a trajectory included in a same rigid body, by determining, based on the articulatedness between the trajectories calculated by the articulatedness calculating unit, whether or not regions corresponding to the trajectories of the pair of trajectories are present on the same rigid body, and then detect, as the, the region corresponding to the first trajectory in a state where the region corresponding to the first trajectory and the region corresponding to the second trajectory are present on the same rigid body, the region corresponding to the first trajectory and the region corresponding to the third trajectory are present on the same rigid body, and the region corresponding to the second trajectory is connected with the region corresponding to the third trajectory via the same joint.

By doing so, it is possible to efficiently detect an articulation.

In addition, the temporal change in the geodetic distance between the trajectories may be an absolute sum of the temporal changes in the geodetic distances that span a series of predetermined processing frames, and the temporal change in the point-to-point distance between the trajectories may be an absolute sum of the temporal changes in the point-to-point distances that span a series of predetermined processing frames.

Since the temporal change over plural frames is used, it is possible to detect the temporal change in a distance between trajectories with higher accuracy.

In addition, the articulatedness calculating unit may calculate the articulatedness between the trajectories, based on a value obtained by dividing the temporal change in the geodetic distance between the trajectories by the temporal change in the point-to-point distance between the trajectories.

With the configuration described above, it is possible to express the articulatedness using a simple expression. It is to be noted that, when the temporal change in a point-to-point distance is zero, an error value may be set in order to prevent the articulatedness from being infinite.

In addition, the articulatedness calculating unit may calculate the articulatedness between the trajectories, by referring to a data table on which a correspondence relationship among the temporal change in the geodetic distance, the temporal change in the point-to-point distance, and the articulatedness are indicated.

It is possible to detect an articulation region with higher precision, by creating a data table in advance through experimentation or the like. In addition, the articulatedness calculating unit may calculate the articulatedness as 1 in the case where (i) the temporal change in the geodetic distance between the trajectories is smaller than a predetermined geodetic distance threshold and (ii) the temporal change in the point-to-point distance between the trajectories is larger than a predetermined point-to-point distance threshold; and calculate the articulatedness as 0 in the case where (iii) the temporal change in the geodetic distance between the trajectories is equal to or larger than the predetermined geodetic distance threshold or (iv) the temporal change in the point-to-point distance between the trajectories is equal to or smaller than the predetermined point-to-point distance.

It is possible to easily calculate an articulatedness, by appropriately setting the geodetic distance threshold and a point-to-point distance threshold.

In addition, the display control unit may: color a region on the picture with a specified color; and output the picture, the region corresponding to a trajectory included in the articulation region detected by the articulation detecting unit.

For example, it is possible to easily present, to a user, the position of an articulation region, by coloring, with red or yellow, the position of a region corresponding to the trajectory included in the articulation region and displaying, and so on.

In addition, the display control unit may: color a region on the picture with a specified color; and output the picture, the region corresponding to a trajectory included in a rigid body region obtained by removing, from the articulated object region, the articulation region detected by the articulation detecting unit, the articulated object region including regions connected via the articulation region. Displaying a region of rigid bodies with an articulation region (joint region) disposed therebetween allows a user to easily understand the configuration of the rigid bodies and the articulation region of the moving object.

In addition, the display control unit may: color regions on the picture with different specified colors; and output the picture, the regions including (i) a region corresponding to a trajectory included in a rigid body region obtained by removing, from the articulated object region, the articulation region detected by the articulation detecting unit and (ii) a region corresponding to a trajectory included in the articulation region detected by the articulation detecting unit, the articulated object region including regions connected via the articulation region. With the configuration described above, it is possible to provide a user with information of both of the articulation region and the rigid body, and thus a user-friendly image is realized.

In addition, the specified color for coloring the region corresponding to the trajectory included in the articulation region detected by the articulation detecting unit may be a color that corresponds to a jointness of the articulation region detected by the articulation detecting unit.

With the configuration described above, it is possible to indicate, to a user, reliability on jointness of the articulation region.

In addition, the display control unit may superimpose, on the picture, a straight line connecting the articulation regions included in a same rigid body region, and output the picture.

With the configuration described above, it is possible to perform such a display as a bone in computer graphics. Therefore, it is also possible to use the articulation region display apparatus for the display of two-dimensional animation, or the like.

In addition, the articulation region display apparatus described above may further include: an image input unit configured to capture the pictures included in the video; and a trajectory calculating unit configured to: detect, per block including one or more pixels each of which constituting a corresponding one of the captured pictures, a motion of the block between two temporally neighboring pictures included in the video; and calculate the trajectories by concatenating the detected motion for the pictures.

In addition, the articulatedness calculating unit may further calculate, using a graph in which the temporal change in the point-to-point distance and the temporal change in the geodetic distance between the trajectories of the pair of trajectories are indicated by a vertical axis and a horizontal axis, a same-rigid-body feature value indicating a degree of likelihood that trajectories of a target pair are included in a same rigid body, based on a distance from a straight line on which the temporal change in the point-to-point distance is equivalent to the temporal change in the geodetic distance, to a value of the temporal change in the point-to-point distance and a value of the temporal change in the geodetic distance of the target pair that is a pair of the target trajectories.

In addition, the articulation region display apparatus described above may further include an articulated object region detecting unit configured to detect an articulated object region by calculating, for the target trajectory, as an articulated object region likelihood that indicates a degree of likelihood that trajectories of the target pair are included in the articulated object region, a product of (i) the same-rigid-body feature value of pairs of trajectories including the target pair of trajectories and (ii) the jointness of trajectories other than the target trajectories, the articulated object region including regions connected via an articulation region.

Use of the same-rigid-body feature value allows accurate detection of an articulated object region.

According to another exemplary embodiment of the present disclosure, an articulation region display apparatus which (i) detects an is articulation region using trajectories corresponding, in a one-to-one relationship, to regions included in a moving object in video and (ii) displays the detected articulation region, includes: an articulatedness calculating unit configured to: calculate, for a pair of given trajectories among trajectories each of which is a motion trajectory of a block and spans pictures included in the video, (i) a point-to-point distance that is a direct distance between the trajectories of the pair of trajectories and (ii) a geodetic distance that is a distance of a path that passes through, as a relay point, a trajectory other than the trajectories of the pair of trajectories, from one of the trajectories of the pair of trajectories to reach the other; and calculate an articulatedness, for a temporal change in the point-to-point distance between the trajectories and a temporal change in the geodetic distance between the trajectories, such that the articulatedness results in a larger positive value as the temporal change in an Euclidean distance is larger or the temporal change in the geodetic distance is smaller, the block including one or more pixels each of which constitutes a corresponding one of the pictures; an articulation detecting unit configured to detect a region corresponding to a first trajectory, as an articulation region, based on the articulatedness between the trajectories obtained by the articulatedness calculating unit, the first trajectory being in a state where the region corresponding to the first trajectory and a region corresponding to a second trajectory are present on a same rigid body, the region corresponding to the first trajectory and a region corresponding to a third trajectory are present on a same rigid body, and the region corresponding to the second trajectory is connected with the region corresponding to the third trajectory via a same joint; and a display control unit configured to transform the articulation region detected by the articulation detecting unit into a form that can be visually recognized by a user, and output the transformed articulation region.

With the configuration described above, an articulation region is detected and displayed, based on the temporal change in the geodetic distance and the temporal change in a point-to-point distance between trajectories, thereby enabling accurate display of the articulation position without being affected by a change in the shape.

According to yet another exemplary embodiment of the present disclosure, an articulation region display apparatus which (i) detects an articulation region using trajectories corresponding, in a one-to-one relationship, to regions included in a moving object in video and (ii) displays the detected articulation region, includes: an articulatedness calculating unit configured to: calculate, for a pair of given trajectories among trajectories each of which is a motion trajectory of a block and spans pictures included in the video, (i) a point-to-point distance that is a direct distance between the trajectories of the pair of trajectories and (ii) a geodetic distance that is a distance of a path that passes through, as a relay point, a trajectory other than the trajectories of the pair of trajectories, from one of the trajectories of the pair of trajectories to reach the other; and calculate an articulatedness, using a graph in which the temporal change in the point-to-point distance and the temporal change in the geodetic distance between the pair of trajectories are indicated by a vertical axis and a horizontal axis, such that the articulatedness results in a larger value as a distance from a straight line on which the temporal change in the point-to-point distance is equivalent to the temporal change in the geodetic distance, to a value of the temporal change in the point-to-point distance and a value of the temporal change in the geodetic distance of the target pair that is a pair of the target trajectories is larger, the block including one or more pixels each of which constitutes a corresponding one of the pictures; an articulation detecting unit configured to detect, as an articulation region, a region corresponding to a first trajectory, based on the articulatedness between the trajectories obtained by the articulatedness calculating unit, the first trajectory being in a state where the region corresponding to the first trajectory and a region corresponding to a second trajectory are present on a same rigid body, the region corresponding to the first trajectory and a region corresponding to a third trajectory are present on a same rigid body, and the region corresponding to the second trajectory is connected with the region corresponding to the third trajectory via a same joint; and a display control unit configured to transform the articulation region detected by the articulation detecting unit into a form that can be visually recognized by a user, and output each of the pictures. With the configuration described above, an articulation region is detected and displayed, based on the temporal change in the geodetic distance and the temporal change in a point-to-point distance between trajectories, thereby enabling accurate display of the articulation region without being affected by a change in the shape.

According to yet another exemplary embodiment of the present disclosure, an articulation region detecting apparatus which detects an articulation region using trajectories corresponding, in a one-to-one relationship, to regions included in a moving object in video, includes: an articulatedness calculating unit configured to: calculate, for a pair of given trajectories among trajectories each of which is a motion trajectory of a block and spans pictures included in the video, (i) a point-to-point distance that is a direct distance between the trajectories of the pair of trajectories and (ii) a geodetic distance that is a distance of a path that passes through, as a relay point, a trajectory other than the trajectories of the pair of trajectories, from one of the trajectories of the pair of trajectories to reach the other; and calculate an articulatedness based on a temporal change in the point-to-point distance between the trajectories and a temporal change in the geodetic distance between the trajectories, the block including one or more pixels each of which constitutes a corresponding one of the pictures, and the articulatedness indicating a degree of likelihood that regions corresponding, in a one-to-one relationship, to the trajectories are connected via a same joint; and an articulation detecting unit configured to detect, as an articulation region, a region corresponding to a first trajectory, based on the articulatedness between the trajectories obtained by the articulatedness calculating unit, the first trajectory being in a state where the region corresponding to the first trajectory and a region corresponding to a second trajectory are present on a same rigid body, the region corresponding to the first trajectory and a region corresponding to a third trajectory are present on a same rigid body, and the region corresponding to the second trajectory is connected with the region corresponding to the third trajectory via a same joint.

With the configuration described above, an articulation region is detected based on the temporal change in the geodetic distance and the temporal change in a point-to-point distance between trajectories, thereby enabling accurate detection of the articulation region without being affected by a change in the shape.

According to yet another exemplary embodiment of the present disclosure, an articulation region belongingness calculating apparatus which calculates a belongingness to an articulation region for each of trajectories corresponding, in a one-to-one relationship, to regions included in a moving object in video includes: a distance calculating unit configured to calculate, for a pair of given trajectories among trajectories each of which is a motion trajectory of a block and spans pictures included in the video, (i) a point-to-point distance that is a direct distance between the trajectories of the pair of trajectories and (ii) a geodetic distance that is a distance of a path that passes through, as a relay point, a trajectory other than the trajectories of the pair of trajectories, from one of the trajectories of the pair of trajectories to reach the other, the block including one or more pixels each of which constitutes a corresponding one of the pictures; and an articulation region belongingness calculating unit configured to calculate a jointness as a belongingness of a first trajectory to an articulation region, based on a temporal change in the point-to-point distance and a temporal change in the geodetic distance of two given trajectories among the first trajectory, a second trajectory, and a third trajectory, the jointness indicating a degree at which three relationships are simultaneously satisfied, the three relationships being that a region corresponding to the first trajectory and a region corresponding to a second trajectory are present on a same rigid body, the region corresponding to the first trajectory and a region corresponding to a third trajectory are present on a same rigid body, and the region corresponding to the second trajectory and the region corresponding to the third trajectory are present on different rigid bodies connected via a same joint.

With the configuration described above, a belongingness of a trajectory to an articulation region is calculated based on the temporal change in the geodetic distance and the temporal change in a point-to-point distance between trajectories, thereby enabling accurate calculation of the belongingness of the trajectory to the articulation region without being affected by a change in the shape of the moving object.

According to yet another exemplary embodiment of the present disclosure, an articulated object region belongingness calculating apparatus which calculates, for each of trajectories corresponding, in a one-to-one relationship, to regions included in a moving object in video, a belongingness to an articulated object region including regions connected via the articulation region, includes: a distance calculating unit configured to calculate, for a pair of given trajectories among trajectories each of which is a motion trajectory of a block and spans pictures included in the video, (i) a point-to-point distance that is a direct distance between the trajectories of the pair of trajectories and (ii) a geodetic distance that is a distance of a path that passes through, as a relay point, a trajectory other than the trajectories of the pair of trajectories, from one of the trajectories of the pair of trajectories to reach the other, the block including one or more pixels each of which constitutes a corresponding one of the pictures; and an articulated object region belongingness calculating unit configured to calculate an articulated object region likelihood as a belongingness of a target trajectory to an articulated object region, based on a temporal change in the point-to-point distance and a temporal change in the geodetic distance of two given trajectories among the target trajectory, a first trajectory, a second trajectory, and a third trajectory, the articulated object region likelihood being calculated based on a degree at which three relationships are simultaneously satisfied, the three relationships being that a region corresponding to the first trajectory and a region corresponding to the second trajectory are present on a same rigid body, the region corresponding to the first trajectory and a region corresponding to the third trajectory are present on a same rigid body, and the region corresponding to the second trajectory and the region corresponding to the third trajectory are present on different rigid bodies connected via a same joint.

With the configuration described above, a belongingness of a trajectory to an articulated object region is calculated based on the temporal change in the geodetic distance and the temporal change in a point-to-point distance between trajectories, thereby enabling accurate calculation of the belongingness of the trajectory to the articulated object region without being affected by a change in the shape of the moving object.

It is to be noted that the articulation region display apparatus according to one or more exemplary embodiments of the present disclosure can be implemented not only by configuring each of the processing units included in the articulation region display apparatus as hardware but also as an articulation region display method having the above-described processing units as steps, or the articulation region display method can be implemented as a program on a computer, a non-transitory computer-readable recording medium such as a CD-ROM in which the program is stored, or an image processing apparatus that extracts or segment a region of an object having a motion in the video. In addition, an articulation region detecting apparatus, an articulation region belongingness calculating apparatus, and an articulated object region belongingness calculating apparatus also can be implemented as methods and programs in the same manner as above.

Hereinafter, certain exemplary embodiments of the present disclosure are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the inventive concept, the scope of which is defined in the appended Claims and their equivalents. Therefore, among the structural elements in the following exemplary embodiments, structural elements not recited in any one of the independent claims defining the most generic part of the inventive concept are not necessarily required to overcome conventional disadvantages.

Embodiment 1

FIG. 1 is a diagram which shows a configuration of an articulation region display apparatus according to Embodiment 1. As shown in FIG. 1, an articulation region display apparatus 100 includes: an image input unit 101; a trajectory calculating unit 102; and an articulation region display unit 103. The articulation region display apparatus 100 is an apparatus which (i) detects a region including an articulated motion, using trajectories which correspond, in a one-to-one relationship, to regions included in a moving object in video and (i) displays the detected region.

In the present embodiment, the articulation region display apparatus 100 is provided with video captured by a camera 110, detects an articulation region in the video, generates a picture based on a result of the detection, and outputs the generated picture. A display 120 displays the picture outputted from the articulation region display apparatus 100. A picture is also referred to as an image in the present application.

The image input unit 101 is a processing unit that captures plural pictures included in the video, and is, for example, a camera, a communication interface connected to a camera, or the like. It is to be noted that the image input unit 101 may be an interface for reading video stored in a storage apparatus.

The trajectory calculating unit 102 detects, in units of a block including one or more pixels and constituting the pictures captured by the image input unit 101, motions of the block between two temporally neighboring pictures included in the video, and concatenates the detected motions for the pictures, thereby calculating plural trajectories. The corresponding points between pictures may be calculated for each of the pixels in the picture, or may be calculated in units of neighboring pixels (block) in the picture. In the present application, it is not discriminated whether a corresponding point is calculated for each of the pixels or in units of pixels. In addition, each of a corresponding point that corresponds to a pixel i of a picture, which is located in another picture, and a corresponding point that corresponds to a block i of a picture, which is located in another picture, is assumed to be called a trajectory of the pixel i.

The articulation region display unit 103 is a processing unit which detects, using the trajectory calculate by the trajectory calculating unit 102, a region that involves articulation motion and performs display, based on a temporal change in a distance between trajectories. The articulation region display unit 103 includes: an articulatedness calculating unit 104; an articulation detecting unit 105; and a display control unit 106.

The articulatedness calculating unit 104 includes: a distance calculating unit 107; and a feature value calculating unit 108. The distance calculating unit 107 is a processing unit which calculates a distance indicating a similarity between the trajectories. More specifically, the distance calculating unit 107 calculates (i) a point-to-point distance that is a distance directly connecting a first trajectory and a second trajectory and (ii) a geodetic distance that is a distance of a path that passes through, as a relay point, a trajectory other than the first trajectory and the second trajectory, to reach the second trajectory from the first trajectory.

In the present embodiment, the distance calculating unit 107 extracts N trajectories which are corresponding points that span T pictures (T≥2) from among the trajectories calculated by the trajectory calculating unit 102, and calculates, based on the extracted trajectories, the point-to-point distance and geodetic distance indicating the similarity between the trajectories.

In the present application, the term "distance" between two trajectories includes not only the distance between two points in a corresponding two-dimensional image space but also an arithmetic distance between multidimensional data items, as described below. It is to be noted that a distance and a similarity generally have a contradictory relationship. To be more specific, the similarity is high when the distance between two data items is small, and on the other hand, the similarity is low when the distance between two data items is large.

In addition, as to the two types of distances of the "point-to-point distance" and the "geodetic distance" defined in the present application, the "point-to-point distance" refers to a distance obtained only from a distance between two data items, and the "geodetic distance" refers to a distance obtained from points passing other than two data items as described below.

It is to be noted that the "point-to-point distance" according to the present application is a distance that is used as an index indicating a geometric similarity such as a position, a speed, an acceleration, and so on, in a picture coordinate between trajectories, and need not be a linear distance. In the present application, a "Euclidean distance" is used in the description below, as a representative of the "point-to-point distance". A detailed example of the above-stated distance will be described below in the explanation for the distance calculating unit 107.

The feature value calculating unit 108 is a processing unit which calculates a temporal change in a distance for each of the geodetic distance and the Euclidean distance calculated by the distance calculating unit 107, and calculates an articulatedness based on the calculated temporal change in the distances.

More specifically, the feature value calculating unit 108 calculates, based on the temporal change in the Euclidean distance and the temporal change in the geodetic distance of given two trajectories, the degree of likelihood (articulatedness described below) of two trajectories being trajectories connected with the same joint and involving articulated motion, and outputs the calculated degree of likelihood to a subsequent stage.

Next, the articulation detecting unit 105 calculates, based on the articulatedness between the trajectories, whether each pair of the trajectories, among three different trajectories, is on the same rigid body or connected via the same joint, and detect an articulation (joint region, articulation region) based on the calculate relationship. Lastly, the display control unit 106 outputs the result of the detection of the articulation in the video performed by the articulation detecting unit 105. More specifically, the display control unit 106 performs image processing on the video captured by the image input unit 101 so as to be in the display form different for each of the articulations detected by the articulation detecting unit 105, for example, and outputs the video on which the image processing is performed, to the display 120 or the like.

In the present application, the term "region extraction" includes both of (i) a detection technique for extracting an image region in which a particular object exists and (ii) a segmentation technique for segmenting a region in a picture regardless of what the object is. It is to be noted that, since the detection technique and the segmentation technique have a lot in common, they are not discriminated in the present application.

Furthermore in the present application, the term "moving object detection" includes both of (i) a detection technique for detecting only an image region in which an object that moves with respect to a base coordinate system exists and (ii) a segmentation technique for segmenting a region in a picture for each object that has a relatively different movement.

Figure 2:
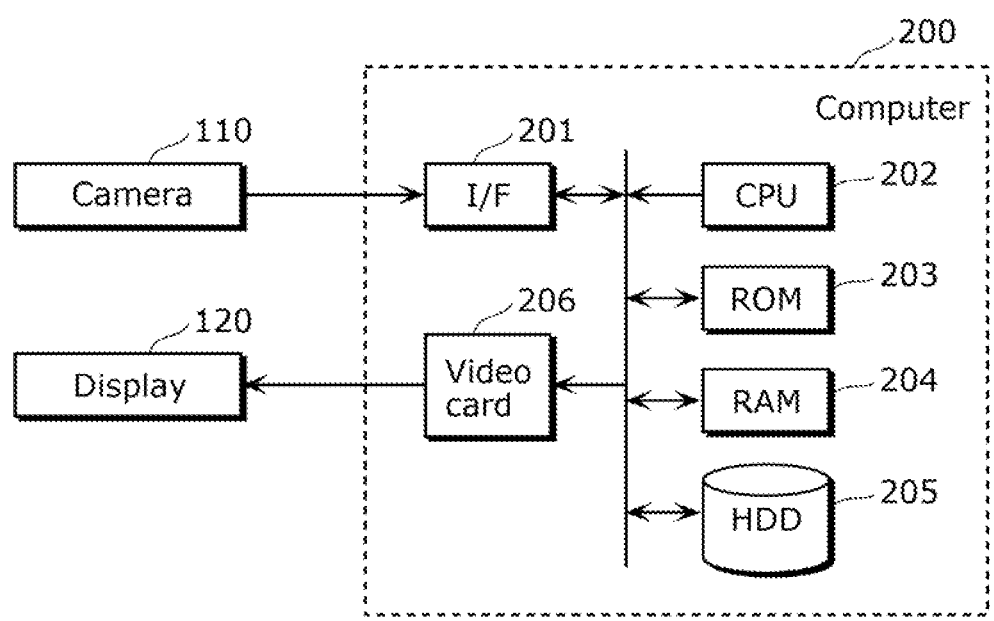
FIG. 2 is a diagram which shows a hardware configuration of an articulation region display apparatus configured by a computer.

It is to be noted that each of the components included in the articulation region display apparatus 100 (the image input unit 101, the trajectory calculating unit 102, and the articulation region display unit 103) may be implemented as software such as a program executed on a computer, or may be implemented as hardware such as an electronic circuit or an integrated circuit. FIG. 2 is a diagram which shows a hardware configuration of the articulation region display apparatus configured by a computer, according to the present embodiment. In FIG. 2, the camera 110 captures and outputs a picture, and a computer 200 obtains, and performs articulation region extracting processing on, the picture to generate a picture for displaying a result of the region extraction. A display 120 obtains and displays the picture generated by the computer 200. The computer 200 includes: an I/F 201; a CPU 202; a ROM 203; a RAM 204; an HDD 205, and a video card 206. The program that causes the computer 200 to operate is held by the ROM 203 or the HDD 205 in advance. The program is read by the CPU 202 that is a processor, from the ROM 203 or the HDD 205 to the RAM 204, to be developed. The CPU 202 executes each instruction that is coded in the program developed by the RAM 204. The I/F 201, in response to the execution of the program, downloads the picture captured by the camera 110, onto the RAM 204. The video card 206 outputs the picture generated in response to the execution of the program and the display 120 displays the picture.

It is to be noted that the computer program is not limited to being stored in the ROM 203 that is a semiconductor, or the HDD 205, but may be stored in a CD-ROM, for example. In addition, the computer program may be transmitted via a wired or wireless network, broadcasting, and so on, and downloaded onto the RAM 204 of the computer.

Figure 3:
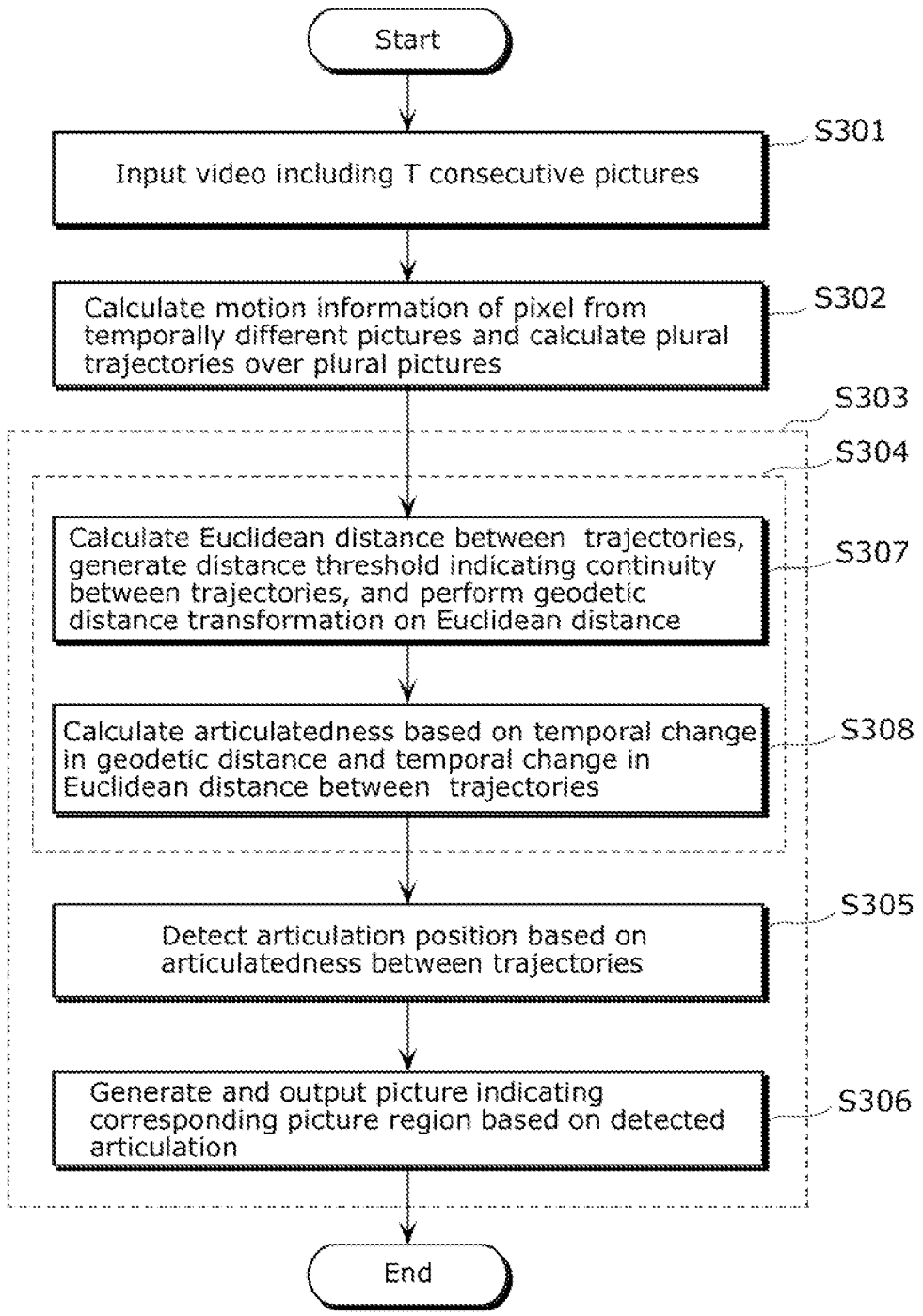
FIG. 3 is a flowchart which shows an operation procedure of the articulation region display apparatus.

The following describes, with reference to FIG. 3, an operation of the articulation region display apparatus 100 according to the present embodiment.

FIG. 3 is a flowchart that shows an operation of the articulation region display apparatus 100 according to the present embodiment.

In FIG. 3, eight steps S301 to S308 correspond to the processing units 101 to 108, respectively, in FIG. 1. To be more specific, the image input unit 101 performs the operation of the image inputting step S301, the trajectory calculating unit 102 performs the operation of the trajectory calculating step S302, and the articulation region display unit 103 performs the operation of the articulation region display step S303. In addition, the articulation region display step S303 includes three steps of an articulatedness calculating step S304, an articulation detecting step S305, and a display step S306. The articulatedness calculating unit 104 performs the operation of the articulatedness calculating step S304, the articulation detecting unit 105 performs the operation of the articulation detecting, step S305; and the display control unit 106 performs the operation of the display step S306. In addition, the articulatedness calculating step S304 includes two steps of a distance calculating step S307 and a feature value calculating step S308. The distance calculating unit 107 performs the operation of the distance calculating step S307, and the feature value calculating unit 108 performs the operation of the feature value calculating step S308. First, the image inputting step S301 is executed by the image input unit 101. More specifically, the image input unit 101 obtains, from the camera 110, plural pictures included in video. In the present embodiment, the video obtained by the camera 110 is video of 30 frames per second.

Figure 4:
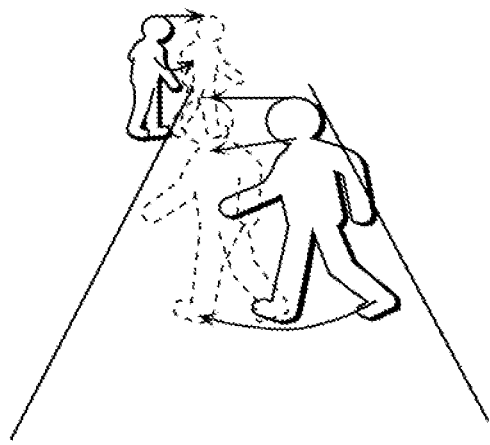
FIG. 4 is a diagram which shows an example of a picture-taking situation.
Figure 5:
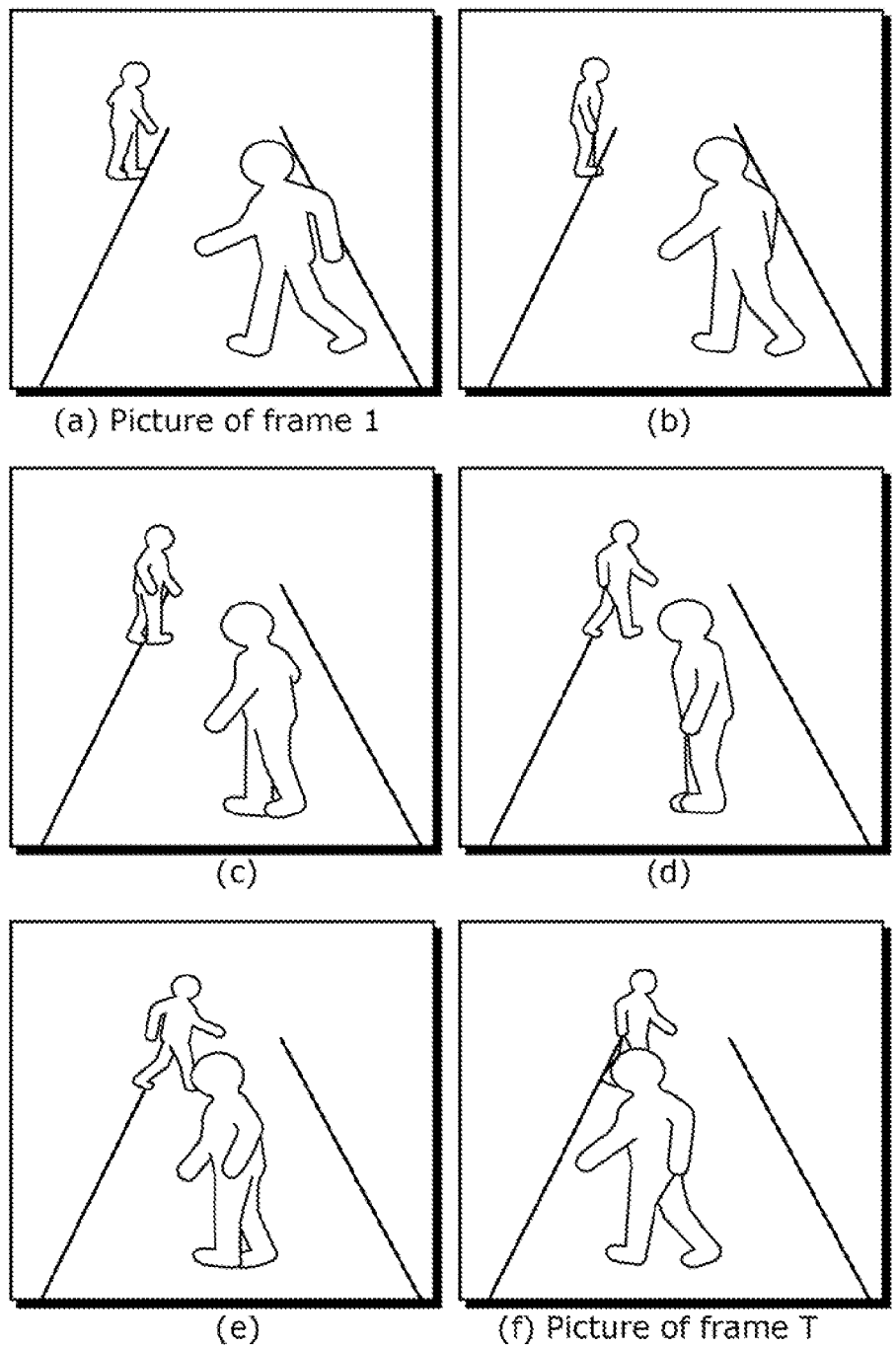
FIG. 5 is a diagram which shows an example of plural pictures.

FIG. 4 is a diagram which shows an example of a picture-taking situation. Furthermore, (a) to (f) in FIG. 5 show an example of pictures captured by the camera 110 in the picture-taking situation of FIG. 4. It is assumed here that T pictures (T≥2) from frame 1 to frame T are captured by the image input unit 101. According to the present embodiment, the number of pictures T is specified in advance and assumed to be 30 frames (T=30).

Next, the trajectory calculating step S302 is executed by the trajectory calculating unit 102. To be more specific, the trajectory calculating unit 102 receives an input of pictures from the image input unit 101, detects a corresponding point between the pictures, generates trajectories, and outputs the generated trajectories. Here, as a technique for calculating a corresponding point between pictures, on the basis of all of the pixels (I pixels) on a picture of frame 1, corresponding pixels on (T−1) pictures from frame 2 to frame T are calculated.

In the following description for the present embodiment, processing per pixel is explained. When processing is carried out per block that includes plural pixels, data (representative value) corresponding to a block is calculated by (i) summing pixel values in the block, (ii) calculating an average of pixel values in the block, or (iii) calculating a median of pixel values in the block, and the obtained representative value is used for the processing in the same manner as in the processing per pixel.

When it is assumed that T pictures are input in step S301, for example, the trajectory calculating unit 102 uses two pictures inputted at time t and time t+1 to estimate a motion vector of a pixel i $(u_t^i, v_t^i)$. Here, the frames need not be consecutive. The motion of a pixel may be calculated using two pictures inputted at time t and time t+n, for example. It is to be noted that n need to be an integer equal to or larger than one.

As a specific method of calculating the corresponding point between the pictures described above, methods disclosed by Non Patent Literature 1, Non Patent Literature 2, or the like may be used. Both are techniques of calculating a motion vector by calculating an optical flow. According to Non Patent Literature 1, the optical flow is calculated based on hierarchical block matching. Since smoothness between pixels is the constraint, an optical flow is obtained such that a motion vector changes smoothly between neighboring optical flows. An efficient and accurate corresponding point is obtained when an abrupt motion or occlusion is not particularly included. In addition, since the reliability of estimation can be calculated, a corresponding point whose reliability is lower than a given threshold is eliminated from subsequent processing, as described below, so that a ratio of incorrect motion vector to all of the motion vectors can be lowered, thereby producing an advantageous effect of allowing more accurate estimation of an articulation region.

On the other hand, Non Patent Literature 2 discloses an optical flow calculating technique based on graph cuts with which an accurate corresponding point is obtained densely on a picture, although high calculating costs are involved. In addition, since the region of occlusion can also be estimated with this technique, it is possible to reduce the ratio of incorrect motion vectors to all of the motion vectors by eliminating a corresponding point positioned at an occlusion region from subsequent processing, as described below, thereby producing an advantageous effect of allowing more accurate estimation of an articulation region. Since further details are described in each of the documents, detailed explanations for them are omitted.

Non Patent Literature 1: P. Anandan, "A Computational Framework and an Algorithm for the Measurement of Visual Motion", International Journal of Computer Vision, Vol. 2, pp. 283-310, 1989

Non Patent Literature 2: Vladimir Kolmogorov and Ramin Zabih, "Computing Visual Correspondence with Occlusions via Graph Cuts", International Conference on Computer Vision, 2001

In addition, the trajectory calculating unit 102 may estimate an affine parameter instead of the motion vector, as motion of a pixel. At this time, motion information may be calculated for all of the pixels. In addition, in the case where the processing is to be performed at higher speed, a picture may be segmented into grids and motion information may be calculated only for the pixels on the grids at predetermined intervals, or a picture may be segmented into blocks and motion information may be calculated for each of the blocks, as described above.

In addition, when calculating a motion vector using the technique disclosed by Non Patent Literature 1, since the reliability can be calculated as described above, only the pixels including motion information with higher reliability may be used. Furthermore, when calculating a motion vector using the technique disclosed by Non Patent Literature 2, it is possible to estimate an occlusion, as described above. Thus, only the motion information of pixels which are not occluded may be used.

In addition, as a technique of calculating a motion of pixels, a method of calculating a motion vector by assuming affine deformation of a block may be used instead of the method of calculating a motion vector by assuming translation of a block as described above. The method of calculating a motion vector by assuming affine deformation can be implemented using the technique disclosed by Non Patent Literature 3.
Non Patent Literature 3: Jianbo Shi and Carlo Tomasi, "Good Features to Track", IEEE Conference on Computer Vision and Pattern Recognition, pp. 593-600, 1994

With the above-described technique, an affine parameter $A_t^i$ is estimated which corresponds to motion in the vicinity of the pixel i in the picture inputted at the time t and the time t+1. As to the pixel i, the pixel position $x_t^i$ and $x_{t+1}^i$ on the picture at the time t and the time t+1 are in the relationship indicated by Expression 1.

[Math. 1] $x_{t+1}^i = A_t^i x_t^i$ (Expression 1)

With the technique described above, it is possible to estimate the motion of the pixel i with higher accuracy especially for an object having a rotational movement, compared to the case where the technique of calculating a motion vector by assuming translation is used.

Figure 6A:
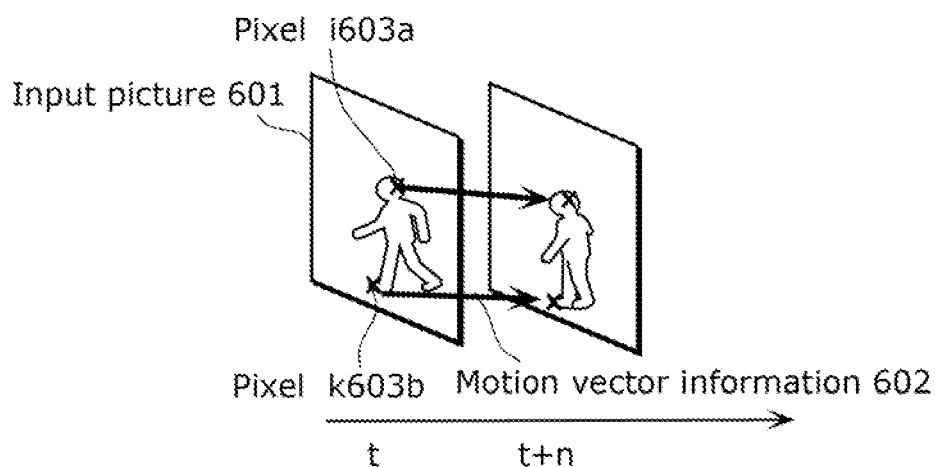
FIG. 6A is a diagram which shows an example of a motion vector.

Then, the trajectory calculating unit 102 calculates a trajectory i using the corresponding point of the pixels calculated between T temporally different pictures. In the following description, a trajectory of the pixel i is referred to as a trajectory i. As shown in FIG. 6A, the trajectory calculating unit 102 tracks motion of a pixel i603a and a pixel k603b, using the motion vector information 602 calculated in step S302 based on the pixel i603a and the pixel k603b of the inputted picture 601 at the time t, thereby obtaining corresponding points of the pixel i603a and the pixel k603b. At this time, the trajectory calculating unit 102 calculates a trajectory $x^i$, as shown in Expression 2, using a coordinate value $(x_1^i, y_1^i)$ of the pixel i on the picture of the frame 1 and a pixel coordinate value $(x_t^i, y_t^i)$ of the corresponding point of the pixel i at the time t.

[Math. 2]

$x^i = (x_1^i, y_1^i, \ldots, x_t^i, y_t^i, \ldots, x_T^i, y_T^i)$ (Expression 2)

In the present embodiment, the trajectory $x^i$ is a corresponding point that spans T pictures from the frame 1 to the frame T.

Figure 6B:
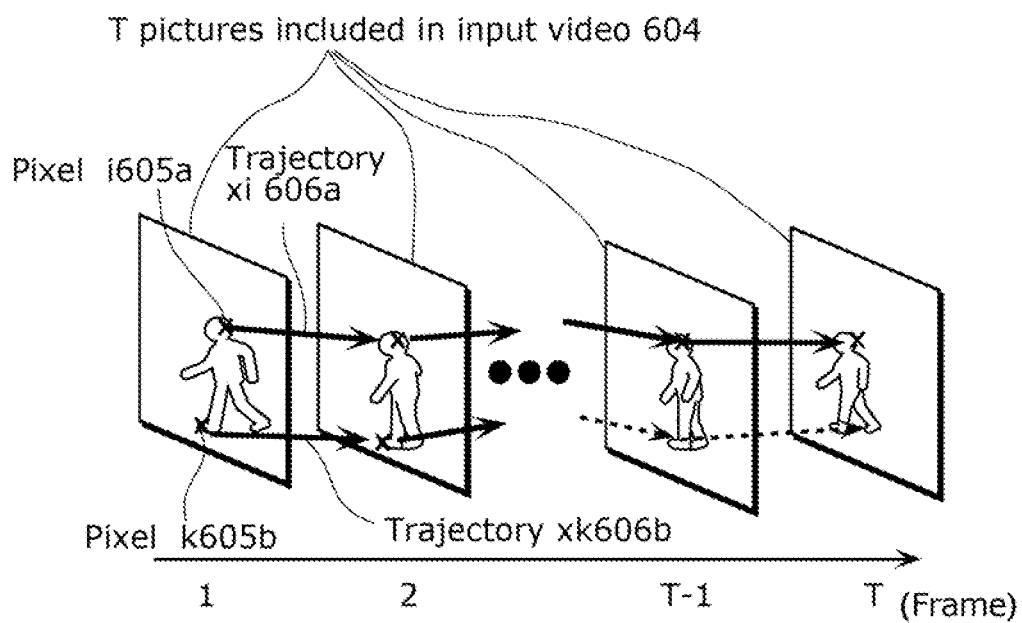
FIG. 6B is a diagram which shows an example of trajectories.

FIG. 6B shows an example of trajectories. The video inputted into the trajectory calculating unit 102 includes T pictures 604. In this case, the trajectories $x^i$ 606a and $x^k$ 606b are groups of corresponding points corresponding to the respective pixel i605a and pixel k605b on the frame 1, on the pictures from the frame 2 to the frame T. The trajectories $x^i$ 606a and $x^k$ 606b are represented as vectors having picture coordinate values of the respective pictures as elements.

It is to be noted that, when the trajectory calculating unit 102 calculates the corresponding points between pictures, the corresponding points may be calculated in units of neighboring pixels (block) in the picture instead of calculating a corresponding point for each of the pixels in the picture. In the present application, it is not discriminated whether a corresponding point is calculated for each of the pixels or in units of pixels. In addition, each of a corresponding point that corresponds to a pixel i of a picture, which is located in another picture, and a corresponding point that corresponds to a block i of a picture, which is located in another picture, is assumed to be called a trajectory of the pixel i.

Next, the articulatedness calculating step S304 is executed by the articulatedness calculating unit 104. The articulatedness calculating unit 104 includes the distance calculating unit 107 and the feature value calculating unit 108 as illustrated in the configuration diagram of FIG. 1. The distance calculating step S307 is executed by the distance calculating unit 107 and the feature value calculating step S308 is executed by the feature value calculating unit 108.[ ] More specifically, the articulatedness calculating unit 104 uses the trajectory $x^i$ calculated by the trajectory calculating unit 102 to (i) calculate, in the distance calculating unit 107, the distance that indicates the similarity between trajectories, and (ii) calculate, in the feature value calculating unit 108, the articulatedness between the trajectories.

Hereinafter, the articulatedness calculating unit 104 will be described.

First, the method of calculating the distance that indicates the similarity between trajectories performed by the distance calculating unit 107 will be described, followed by the method of calculating the articulatedness; that is, the degree of likelihood of regions that correspond to the respective trajectories being connected via the same joint, between trajectories performed by the feature value calculating unit 108.

The distance calculating unit 107 calculates a Euclidean distance f(i, j) and a geodetic distance g(i, j) between the trajectories of the pixel i and the trajectories of the pixel j in a step-by-step manner. Here, since the Euclidean distance and the geodetic distance are both distances that indicate the similarity of trajectories, each of the Euclidean distance and the geodetic distance has (i) a distance value that is zero between trajectories which are completely the same, and conversely, (ii) a larger positive distance value (including 03) as the similarity between trajectories is smaller.

The distance calculating unit 107 calculates, using Expression 3, a Euclidean distance f(i, j) between the trajectories of the pixel i and the trajectories of the pixel j.

[Math. 3]

$$f(i, j) = \frac{1}{T} \sum_{t=1}^{T} d_{ij}^t,$$ (Expression 3)

where $$d_{ij}^t = \sqrt{(x_t^i - x_t^j)^2 + (y_t^i - y_t^j)^2}$$

Here, the Euclidean distance f(i, j) calculated by Expression 3 is defined for between all of the trajectories for convenience of notation; however, a finite value as a Euclidean distance is obtained only between the N trajectories $x^i$.

It is to be noted that the Euclidean distance according to the present embodiment is calculated by Expression 3; however, it is not limited to this expression. An index which represents a geometric similarity, such as a position in the picture coordinate between trajectories, a motion, an acceleration, and a rate of rotation, suffices as the Euclidean distance in the same manner as in Expression 3, and the Euclidean distance may be calculated using, for example, Expression 4 below.

[Math. 4]

$$f(i, j) = \frac{1}{T}\sum_{t=1}^{T} d_{ij}^t + w\sqrt{\frac{1}{T}\sum_{t=1}^{T} (d_{ij}^t - \bar{d})^2},$$ (Expression 4)

where $$d_{ij}^t = \sqrt{(x_t^i - x_t^j)^2 + (y_t^i - y_t^j)^2},$$

$$\bar{d} = \frac{1}{T}\sum_{t=1}^{T} d_{ij}^t$$

In Expression 4, w denotes a weight coefficient and is a parameter that is specified by a designer. The Euclidean distance $f(i, j)$ between trajectories in the above-described Expression 4 is obtained by adding, to a time average of the distance of the picture coordinates in the trajectories, a time variation component of the distance of the picture coordinates. The time variation component of the distance between the trajectories, in particular, indicates the similarity of motion of the trajectories. With this, it is possible to detect the similarity between the trajectories with higher accuracy even when a change in shape is involved.

A set of the Euclidean distances $f(i, j)$ between the trajectories calculated according to the procedure described above is represented as a Euclidean distance matrix $F_{dist}$.

[Math. 5]

$$F_{dist} = \{f(i,j)\}$$ (Expression 5)

Next, the distance calculating unit 107 calculates a geodetic distance $g(i, j)$ from the Euclidean distance $f(i, j)$ between the trajectories. The following describes in detail the operation of calculating the geodetic distance $g(i, j)$ from the Euclidean distance $f(i, j)$ performed by the distance calculating unit 107.

First, the distance calculating unit 107 calculates a non-linearized distance $f'(i, j)$ indicated by Expression 6 using a threshold R predetermined for the calculated Euclidean distance $f(i, j)$.

[Math. 6]

$$f'(i, j) = \begin{cases} f(i, j) & \text{if } f(i, j) < R \\ \infty & \text{otherwise} \end{cases}$$ (Expression 6)

Next, the distance calculating unit 107 calculates the geodetic distance from the non-linearized distance $f'(i, j)$. The term "geodetic distance" means, when, as to plural data points defined in a given space, the data points are connected and a distance between the connected data points is obtained, a distance that is the shortest distance among the distances of all of the paths which can connect given two data points.

Accordingly, the distance calculating unit 107, in calculating a geodetic distance from the i-th trajectory $x^i$ to the j-th trajectory $x^j$, calculates, as the geodetic distance, a path that is the shortest among all of the paths that pass through, as a relay point, a trajectory among other trajectories to reach the j-th trajectory $x^j$ from the i-th trajectory $x^i$.

It is assumed for example that a node distance $f'(i, j)$ directly connecting two points of the trajectory $x^i$ and the trajectory $x^j$ is obtained. At this time, the path connecting the two points of the trajectory $x^i$ and the trajectory $x^j$ includes a path that passes through a different trajectory $x^s$ other than the node directly connecting the two points. The distance of this path is assumed to be $f'(i, s) + f'(s, j)$. There are more than one path connecting two points of the trajectory $x^i$ and the trajectory $x^j$ as above, and the distance shortest among those distances is calculated as the geodetic distance $g(i, j)$ (Expression 7).

[Math. 7]

$$g(i,j) = \min(f'(i,j), f'(i,s) + f'(s,j), \ldots)$$ (Expression 7)

In Expression 7, min (x, y, ...) is a function that returns the smallest value among values such as a value x and a value y. Furthermore, s is a trajectory $x^s$ and a relay point to pass through in order to reach the trajectory $x^j$ from the trajectory $x^i$. Here, the relay point s in $f'(i, s) + f'(s, j)$ is not limited to one point.

As to the details of the technique for searching for the shortest path between two points in calculating the geodetic distance as described above, a detailed explanation for the processing procedure is omitted here because Dijkstra method disclosed in Non Patent Literature 4 is widely known, for example.

Non Patent Literature 4: E. W. Dijkstra, "A note on two problems in connexion with graphs", Numerische Mathematik, pp. 269-271, 1959 According to the procedure described above, the distance calculating unit 107 calculates the geodetic distance $g(i, j)$ from the Euclidean distance $f(i, j)$ between the trajectories. Note that the method of calculating the geodetic distance is not limited to Expression 6 and Expression 7 above.

It is further to be noted that the greatest difference between the Euclidean distance and the geodetic distance is the relationship between the two data points whose distance is to be calculated and other data points. The Euclidean distance is defined by only the two data points irrespective of the state of other data points. On the other hand, the geodetic distance is defined as a distance including the two data points and another data point on the path that can connect the two data point. In other words, the geodetic distance can be affected by the state of other data points.

A set of the calculated geodetic distances $g(i, j)$ between the trajectories is indicated as a geodetic distance matrix $G_{dist}$ (Expression 8).

[Math. 8]

$$G_{dist}\{g(i,j)\}$$ (Expression 8)

The distance calculating unit 107, through the procedure described above, calculates the geodetic distance $g(i, j)$ that indicates the similarity between N trajectories and outputs the geodetic distance $g(i, j)$ as the geodetic distance matrix $G_{dist}$.

Figure 7A:
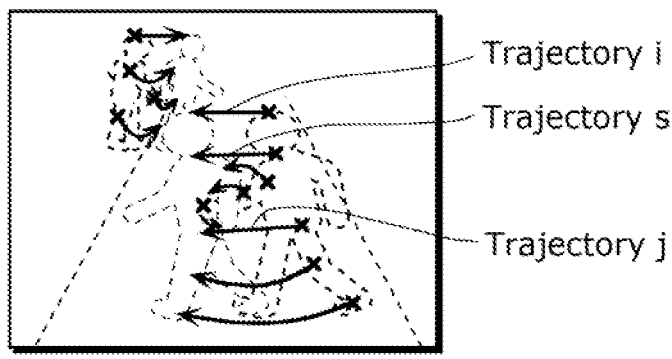
FIG. 7A is a diagram which shows an example of trajectories in a picture.
Figure 7B:
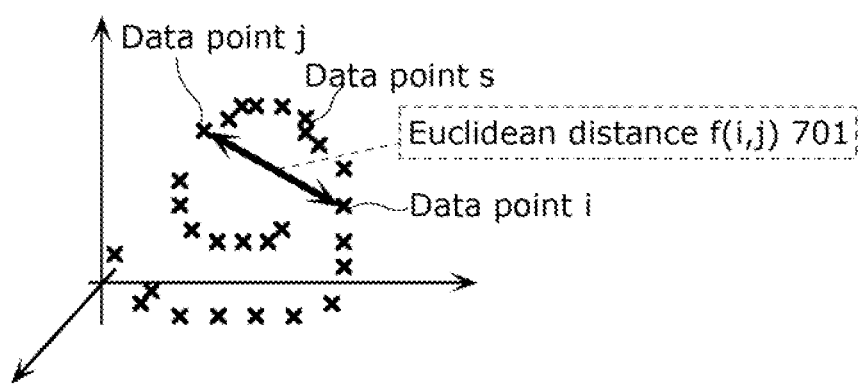
FIG. 7B is a diagram which shows data distributions of trajectories and a linear distance.
Figure 7C:
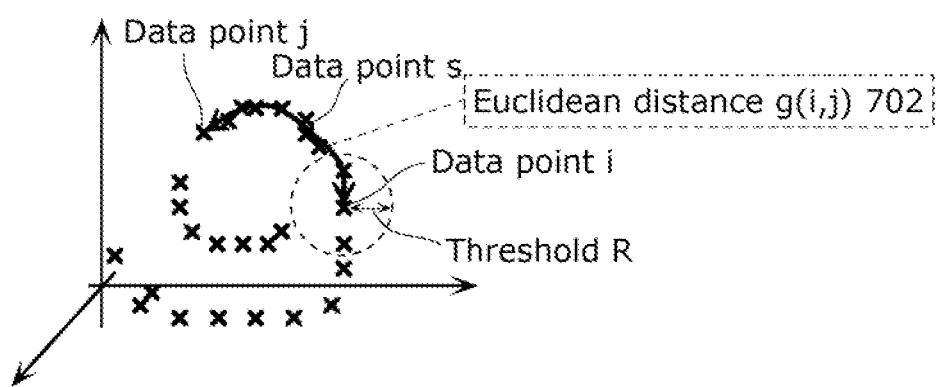
FIG. 7C is a diagram which shows a geodetic distance and data distributions of trajectories.

The following describes the processing of calculating the geodetic distance from the Euclidean distance between the trajectories described above, with reference to conceptual diagrams of FIG. 7A to 7C.

FIG. 7A is a diagram which shows an example of trajectories in a picture. It is to be noted that the trajectories are also calculated in a background region; however, the trajectories of the background region are not illustrated in the following description for the purpose of simple denotation.

FIG. 7B is a diagram which shows a data distribution of the trajectories each of which is represented by Expression 2. Each of the data points indicated by "X" in FIG. 7B corresponds to the trajectory $x^i$ of the pixel i shown in Expression 2. The trajectory $x^i$ is a vector including T×2 independent variables. Thus, the trajectory is, originally, data of (T×2) dimensional space at the maximum; however, is shown as a point in a three-dimensional space for convenience of notation in FIG. 7B. An arrow 701 shown in FIG. 7B represents the Euclidean distance f(i, j) between the trajectory $x^i$ and the trajectory $x^j$, which is obtained by Expression 3. More specifically, the Euclidean distance 701 between the data point i and the data point j is a distance obtained by directly connecting the data points.

On the other hand, an arrow 702 shown in FIG. 7C represents the geodetic distance g(i, j) between the trajectory $x^i$ and the trajectory $x^j$, which is obtained by Expression 7. As shown in FIG. 7C, the geodetic distance 702 between the data point i and the data point j is a distance that passes through the data point s that is a relay point.

Figure 8:
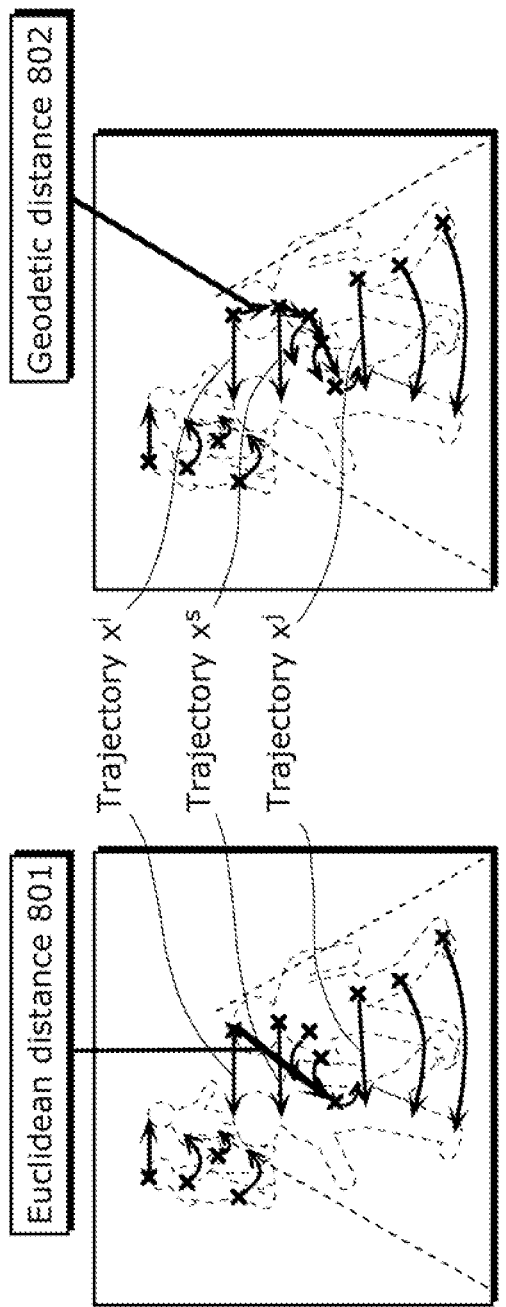
FIG. 8 is a diagram which shows a point-to-point distance and a geodetic distance between trajectories.

The following describes in more detail, with reference to the conceptual diagrams of (a) and (b) in FIG. 8, the characteristics of the Euclidean distance f(i, j) and the geodetic distance g(i, j) calculated by Expression 7.

An arrow 801 in (a) in FIG. 8 represents the Euclidean distance between the trajectory $x^i$ of a head-region and the trajectory $x^j$ of a finger-region on a moving object in a picture. As apparent from the diagrams, the Euclidean distance 801 between the trajectories depends only on the two trajectories $x^i$ and $x^j$ which are the targets to obtain the distance therebetween and is unrelated to other trajectories.

On the other hand, a geodetic distance 802 between the trajectory $x^i$ of the head-region and the trajectory $x^j$ of the finger-region is shown in (b) in FIG. 8. In this case, the trajectory $x^j$ is reached by passing through not only the trajectories $x^i$ and $x^j$ which are the targets to obtain the distance therebetween but also trajectories in the neighborhood such as $X^s$ as shown by a thick arrow 802. Accordingly, the geodetic distance 802 is a summation of the distances between the trajectories which have been passed, and thus the geodetic distance 802 is affected by a trajectory other than the trajectories $x^i$ and $x^j$. In other words, distribution of other trajectories is not reflected at all in the Euclidean distance 801 shown in (a) in FIG. 8. For this reason, in moving objects with articulated movement around joints such as a person, a distance between trajectories results in a value which is independent of the shape. Contrary to the above, the geodetic distance 802 shown in (b) in FIG. 8 is a distance to which other trajectories are reflected. Thus, a distance between the trajectories on a moving object with an articulated motion depends on the shape of the moving object. To be more specific, information about whether there exists articulated motion or not is saliently included in the pair-wise distance, and thus it is possible to use the information also for detecting a moving object changing shape such as a person.

As described above, the trajectory $x^i$ represented by Expression 2 is, mathematically, data of (T×2) dimensional space at the maximum. However, it is confirmed with experimentation by the inventors that the trajectories detected actually from a picture have the characteristic of being localized in only a small region in (T×2) dimensional space as shown in FIG. 7B and FIG. 7C. For the trajectories having the characteristic described above, it can be said that the geodetic distance (the geodetic distance 802 shown in (b) in FIG. 8) that reflects density of data in the neighborhood is more suitable as a measure for a distance indicating a similarity between trajectories than the Euclidean distance (the Euclidean distance 801 shown in (a) in FIG. 8) that is a result of calculating a distance between two data items irrespective of distribution of the data.

It is to be noted that, although the technique using Expression 6 and Expression 7 is describes as a technique used by the distance calculating unit 107 for calculating a geodetic distance from a Euclidean distance, the technique for calculating a geodetic distance is not limited to this.

It is to be noted that the threshold R in Expression 6 is determined empirically. Alternatively, a empirically predetermined threshold N may be used instead of the threshold R. Then, as processing for calculating a non-linearized distance f'(i, j) from the Euclidean distance f(i, j), the following processing may be carried out. More specifically, the non-linearized distance f' (i, j) may be calculated by replacing, with an infinite value, the Euclidean distance larger than the N-th Euclidean distance from the smallest among the Euclidean distances f(i, j) between a trajectory $x^i$ and other (I–1) trajectory, instead of the processing of Expression 6 that replaces, with an infinite value, the Euclidean distance f(i, j) equal to or larger than a threshold R.

Next, the feature value calculating step S308 is performed by the feature value calculating unit 108.

The feature value calculating unit 108 first calculates, based on the geodetic distance and the Euclidean distance calculated by the distance calculating unit 107, a temporal change in the Euclidean distance and a temporal change in the geodetic distance between trajectories. Next, the feature value calculating unit 108 calculates an articulatedness based on the calculated temporal change in the Euclidean distance and the calculated temporal change in the geodetic distance.

First, the property held characteristically by the distance between trajectories which are present on a rigid body region that involves articulated motion will be described, followed by the description for the processing performed by the feature value calculating unit 108. Here, a distance calculated between the first trajectory and the second trajectory that is different from the first trajectory is defined as an inter-trajectory distance. Here, the term "distance" is assumed to be a concept that includes both of the Euclidean distance and the geodetic distance.

FIG. 9 is a diagram which shows a temporal change of the geodetic distance $g(x_i, x_j)$ and the Euclidean distance $f(x_i, x_j)$ between the trajectories $x_i$ and $x_j$, involved with various motion of a rigid body. A temporal change in the inter-trajectory distance involved with articulated motion is shown in (a) and (b) in FIG. 9, and a temporal change in the inter-trajectory distance involved with non-articulated motion is shown in (c) to (f) in FIG. 9.

It is to be noted that, point groups (groups of trajectories) are indicated on the two distinguished regions in FIG. 9 for the purposes of illustration; however, such process as clustering or the like is not at all carried out in practice, and distinction as preprocessing; that is, determining to which region these point groups belong is not carried out neither by the feature value calculating unit 108 nor by any processing units prior to the feature value calculating unit 108. To be more specific, only pair-wise processing between two points is to be carried out in practice. According to the configuration described above, it is possible to detect the position of an articulation without performing the region extraction of the moving object connected at the articulation.

Each of (a) and (b) in FIG. 9 shows an example of the case where two trajectories $x_i$ and $x_j$ are separately present on rigid bodies that involve articulated motions. In order to illustrate the temporal change in the geodetic distance and the Euclidean distance between trajectories in each of the diagrams, the inter-trajectory distance (the geodetic distance and the Euclidean distance between trajectories) are indicated by arrows. The arrows are assumed to indicate the inter-trajectory distances for (c) to (f) in FIG. 9 below in the same manner.

On the other hand, each of (c) and (d) in FIG. 9 shows an example of the case where two trajectories $x_i$ and $x_j$ are present on the same rigid body. The region on which the two trajectories $x_i$ and $x_j$ are present is indicated by different hatchings for the purpose of viewability; however, there is no change in the shape of the region as a whole between time t=T and time t=T+δ. To be more specific, not only the region indicated by the same hatching but also the region indicated by different hatchings belongs to the same rigid body, and in the presented example, the trajectories $x_i$ and $x_j$ involve rigid body motion on the same rigid body.

In addition, each of (e) and (f) in FIG. 9 illustrates an example of a temporal change in the inter-trajectory distance in the case where the trajectories $x_i$ and $x_j$ are not present on the same rigid body and are not two points on two rigid bodies that involve articulated motions; that is, the case that does not belong to any of (a) to (d) in FIG. 9. In other words, each of (e) and (f) in FIG. 9 illustrates an example of the case where the trajectories $x_i$ and $x_j$ belong to different moving objects and the rigid body region including the trajectories $x_i$ and $x_j$ does not involve an articulated motion.

Here, the focus is on the geodetic distances ((a), (c), and (e) in FIG. 9) between the trajectories.

When the rigid bodies including the trajectories $x_i$ and $x_j$ compose an articulated object region as illustrated in (a) in FIG. 9, the geodetic distance between the trajectories $x_i$ and $x_j$ hardly changes. The geodetic distance is a distance that "follows" trajectories by passing through trajectories different from the trajectories $x_i$ and $x_j$, and thus, between two regions involving articulated motion that is a rotating motion for which a given sub region serves as a support, the geodetic distance that "follows" the trajectories passing through the sub region that is the support is invariable. Accordingly, the temporal change in an inter-trajectory geodetic distance $g(x_i, x_j)$ in (a) in FIG. 9 is substantially constant (close to zero).

When the trajectories $x_i$ and $x_j$ are present in the same rigid body as illustrated in (c) in FIG. 9, a geodetic distance that is the shortest path that "follows" trajectories between the trajectories $x_i$ and $x_j$ is always constant, and thus the temporal change in the inter-trajectory geodetic distance $g(x_i, x_j)$ is apparently zero.

When not applied to the above-described two cases, the temporal change in the inter-trajectory geodetic distance $g(x_i, x_j)$ is not zero in most cases, as in the case illustrated in (e) in FIG. 9.

As described above, the temporal change in the inter-trajectory geodetic distance $g(x_i, x_j)$ needs to be substantially constant (close to zero) as a condition for a rigid body including the trajectories $x_i$ and $x_j$ to include an articulated object region as illustrated in (a) in FIG. 9. Next, the focus is on the Euclidean distance between trajectories shown in (b), (d), and (f) in FIG. 9.

When a rigid body including the trajectories $x_i$ and $x_j$ includes an articulated object region connected via an articulation (joint) as illustrated in (b) in FIG. 9, the Euclidean distance between the trajectories $x_i$ and $x_j$, unlike the geodetic distance, changes over time. Especially, it is easily understood from the diagram that a large change is involved when the articulation motion is large, or at an end portion (being away from the joint) rather than a portion near a joint portion of the articulated object region.

When the trajectories $x_i$ and $x_j$ are present in the same rigid body as illustrated in (d) in FIG. 9, a Euclidean distance between the trajectories $x_i$ and $x_3$ is always constant in the same manner as the geodetic distance, and the temporal change in the inter-trajectory Euclidean distance $g(x_i, x_j)$ is apparently zero.

In the case of (f) in FIG. 9 which is not applied to the above-described two cases, the temporal change in the inter-trajectory Euclidean distance $f(x_i, x_j)$ is inconstant but is not zero in most cases, as in the case illustrated in (f) in FIG. 9.

As described above, as a condition for a rigid body including the trajectories $x_i$ and $x_j$ to include an articulation as illustrated in (b) in FIG. 9, the temporal change in the inter-trajectory Euclidean distance $f(x_i, x_j)$ needs to be a value other than zero. Especially, it can be said that, as the articulation motion is larger or each of the trajectories is present at a position further away from the joint of the articulation, the temporal change in the inter-trajectory Euclidean distance $f(x_i, x_j)$ indicates a larger value.

Accordingly, as the condition for two trajectories to be separately present on rigid bodies that include an articulation, there are two conditions as below, which are related to a temporal change in the geodetic distance and a temporal change in the Euclidean distance. To be more specific, a pair of trajectories of which "a temporal change $f_t$ of an inter-trajectory Euclidean distance f is larger" and "a temporal change $g_t$ of an inter-trajectory geodetic distance g is smaller (close to zero)" can be defined as a pair which is more likely to be articulated (a pair of trajectories each of which separately belongs to different rigid bodies that is connected via an articulation.)

According to the present application, "articulated motion" means a motion of a pair of trajectories each of which separately belongs to different rigid bodies that is connected via an articulation. Here, the example as illustrated in (a) in FIG. 9 is given as an example for a typical articulated motion; however, it is not limited to the example illustrated in (a) in FIG. 9, so long as the above-described motion is involved.

In the present application, as mentioned before, how much the motion of a pair of trajectories is likely to be "articulated motion" is defined as "articulatedness", and an articulatedness is calculated by the articulatedness calculating unit 104 for later use.

Figure 10A:
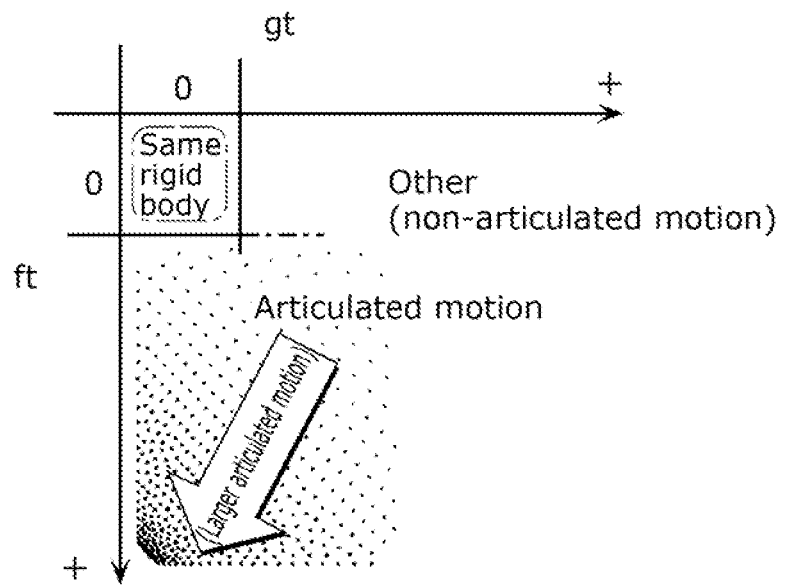
FIG. 10A is a diagram which shows a relationship between the temporal change of a geodetic distance, the temporal change of a point-to-point distance, and articulatedness.

FIG. 10A shows, as to above-described three patterns of the relationship between trajectories, how the temporal change in a distance between trajectories is related to a rigid body including the trajectories.

To be more specific, in the case where the trajectories $x_i$ and $x_j$ are present on the same rigid body as in (c) and (d) in FIG. 9, the temporal change $g_t$ in the geodetic distance and the temporal change $f_t$ in the Euclidean distance between trajectories are both zero. This pattern is indicated as "same rigid body" on FIG. 10A.

In addition, in the case where the trajectories $x_i$ and $x_j$ are present on different rigid bodies both involving an articulated motion as in (a) and (b) in FIG. 9, it is more likely to be articulated as the temporal change $f_t$ in the Euclidean distance is larger than zero and having as larger a value, and the temporal change $g_t$ in the geodetic distance is closer to zero. This is the pattern indicated as "articulated motion" in FIG. 10A.

To be more specific, the "articulatedness" is higher (in other words, more likely to be articulated), as the temporal change $f_t$ in the Euclidean distance is larger than zero and having as larger a value, and the temporal change $g_t$ in the geodetic distance is closer to zero. Lastly, the remaining case which is not applied to the above-described two patterns is indicated as "non-articulated motion" in FIG. 10A.

In view of the above, the following describes processing performed by the feature value calculating unit 108.

First, the feature value calculating unit 108 calculates the temporal change $g_t$ of the inter-trajectory geodetic distance g and the temporal change $f_t$ of the Euclidean distance f, for the trajectories which correspond over a specified set of frames t0 to T that are to be processed. More specifically, according to Expression 9 and Expression 10, each of the temporal change $g_t$ of the inter-trajectory geodetic distance g and the temporal change $f_t$ of the Euclidean distance f is calculated as a value obtained by summing, for each trajectory over a specified set of frames t0 to T that the series of processes performed within, an absolute value of a value obtained by differentiating the geodetic distance g and the Euclidean distance f by a segment unit dt that is provided to each of the geodetic distance g and the Euclidean distance f.

The reason for calculating as an absolute value is that whether being an articulation motion or not depends on the magnitude of a temporal change in a distance, and whether or not the distance increases over time; that is, the orientation of the differentiate value is not involved.

[Math. 9]

$$g_t = \sum_{t_0}^{T} \left| \frac{dg}{dt} \right|$$ (Expression 9)

[Math. 10]

$$f_t = \sum_{t_0}^{T} \left| \frac{df}{dt} \right|$$ (Expression 10)

It is to be noted that how to calculate the temporal change $g_t$ in the geodetic distance g and the temporal change $f_t$ in the Euclidean distance f by the feature value calculating unit 108 is not limited to Expression 9 and Expression 10. As to the method similar to differential, a difference of the geodetic distance g and a difference of the Euclidean distance f may be calculated at a predetermined time interval and use a sum of the absolute value, as the simplest method. For the processing between two frames, in particular, it is possible to calculate as an absolute value of the difference between trajectories each being for a corresponding one of the first frame and the second frame. In addition, a value obtained by squaring a differential value may be used instead of an absolute value.

In addition, in the case where it is known beforehand that a frame set to be used for processing is less than a half cycle of articulation motion (close→open→close) and the Euclidean distance f does not simply increase, Expression 11 and Expression 12 shown below may be used instead of Expression 9 and Expression 10. To be more specific, the absolute value is not necessarily need to be used here, for some situations. In addition, in the case, conversely, where it is known beforehand that the Euclidean distance f only simply decreases, the temporal changes $g_t$ and $f_t$ may be calculated according to Expression 11 and Expression 12 without using an absolute value, and then an absolute value may be calculated in the end.

[Math. 11]

$$g_t = \sum_{t_0}^{T} \frac{dg}{dt}$$ (Expression 11)

[Math. 12]

$$f_t = \sum_{t_0}^{T} \frac{df}{dt}$$ (Expression 12)

Next, the feature value calculating unit 108 calculates an articulatedness $j_{jnt}(i, j)$.

As stated above, a pair of trajectories of which "the temporal change $f_t$ of an inter-trajectory Euclidean distance f is larger" and "the temporal change $g_t$ of an inter-trajectory geodetic distance g is smaller (close to zero)" can be defined as a pair which is more likely to be articulated. It is to be noted that, a typical example of the pair which is likely to be articulated includes a pair of trajectories which are separately present on rigid bodies that include an articulation and which involve the articulated motions.

Thus, the degree of likelihood of the two conditions described above being met is defined below as the articulatedness $j_{jnt}(i, j)$.

Expression 13 below can be used as one of the articulatedness $j_{jnt}(i, j)$ that well approximates the conditions.

[Math. 13]

$$j_{jnt}(i, j) = \begin{cases} 1 - \left\{ \left| \frac{g_t}{f_t} \right| / \max\left( \left| \frac{g_t}{f_t} \right| \right) \right\} & (f_t \neq 0) \\ -1 & (f_t = 0 \text{ and } g_t = 0) \\ -10 & (f_t = 0 \text{ and } g_t \neq 0) \end{cases}$$ (Expression 13)

(, where max(|gt/ft|) is the maximum value of |gt/ft|)

To be more specific, the articulatedness $j_{jnt}(i, j)$ is closer to one as the temporal change $g_t$ in the geodetic distance g is smaller and the temporal change $f_t$ in the Euclidean distance f is larger; that is, two trajectories are more likely to be an articulated pair, and conversely, the two trajectories are less likely to be an articulated pair as the articulatedness $j_{jnt}(i, j)$ is closer to zero. It is to be noted that, here, normalization is carried out by the maximum value and the value of the articulatedness $j_{jnt}(i, j)$ falls within the range from 0 to 1 for the purpose of simple calculation and explanation; however, the normalization, although it is more desirable to be performed, is not necessarily need to be performed in practice for the processing according to an embodiment of the present disclosure. According to the present embodiment, it is assumed that the articulatedness $j_{jnt}(i, j)$ is larger as the object is more likely to be articulated).

It is to be noted that, in the case of the temporal change $f_t$ of the Euclidean distance f is 0, the condition is divided in order to prevent the articulatedness from being infinite.

Figure 10B:
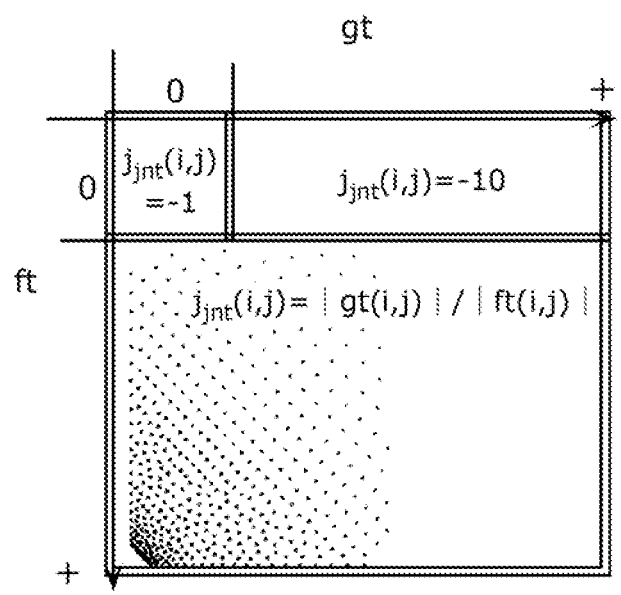
FIG. 10B is a diagram which shows a relationship between the temporal change of a geodetic distance, the temporal change of a point-to-point distance, and articulatedness.

With reference to FIG. 10B, Expression 13 for the articulatedness will be explained, as comparing with FIG. 10A.

Here, in the case where the temporal change $f_t$ of the Euclidean distance f is zero, as described in the description of the FIG. 9, the pattern corresponds to "the same rigid body" on FIG. 10A or "other (non-articulated motion)". Thus, the pattern does not apply to the "articulated motion".

Accordingly, these cases are treated as outliers. However, in the case of $g_t=0$, as being "the same rigid body" and can be used in a subsequent processing, a predetermined value such as $j_{jnt}(i, j)=-1$ is provided. In the case of $g_t \neq 0$, an error value, different from that of the case of "the same rigid body", such as $j_{jnt}(i, j)=-10$ is provided. It is to be noted that, since $j_{jnt}(i, j)>0$ is always satisfied in the case of $f_t \neq 0$ according to Expression 13, the value of $j_{jnt}(i,j)$ for an outlier or error value in the case of $f_t=0$ is not limited to −1 or −10, and may be any value, such as a negative value, as long as the value $j_{jnt}(i, j)$ cannot be realized for $f_t=0$. FIG. 10B shows the pattern of the articulatedness resulting from Expression 13.

The feature value calculating unit 108 calculates, for each of the trajectories, the articulatedness $j_{jnt}(i, j)$ according to Expression 13, based on the temporal change $g_t$ in the geodetic distance g between the trajectories and the temporal change $f_t$ in the Euclidean distance f between the trajectories A set of the calculated articulatedness $j_{jnt}(i, j)$ between the trajectories is indicated as an articulatedness matrix $j_{jnt}$ (Expression 14).

[Math. 14]

$$J_{jnt}=\{j(i,j)\}$$ (Expression 14)

It is to be noted that the method of calculating an articulatedness described above is merely an example, and does not limit the method of calculation to Expression 13. It is only necessary to use an expression or a data table which indicates articulatedness as shown in FIG. 10A. Such an expression or data table can also produce the same advantageous effect.

Through the procedure as described above, the feature value calculating unit 108 calculates the articulatedness $j_{jnt}(i, j)$ among N trajectories, and outputs the calculated articulatedness $j_{jnt}(i, j)$ as an articulatedness matrix $j_{jnt}$.

Next, the articulation detecting step S305 is performed by the articulation detecting unit 105.

The articulation detecting unit 105 detects trajectories corresponding to a rigid body region and a joint comprising an articulated motion, based on the articulatedness matrix J between the trajectories calculated by the articulatedness calculating unit 104.

Hereinafter, the processing performed by the articulation detecting unit 105 is described in detail.

Figure 11:
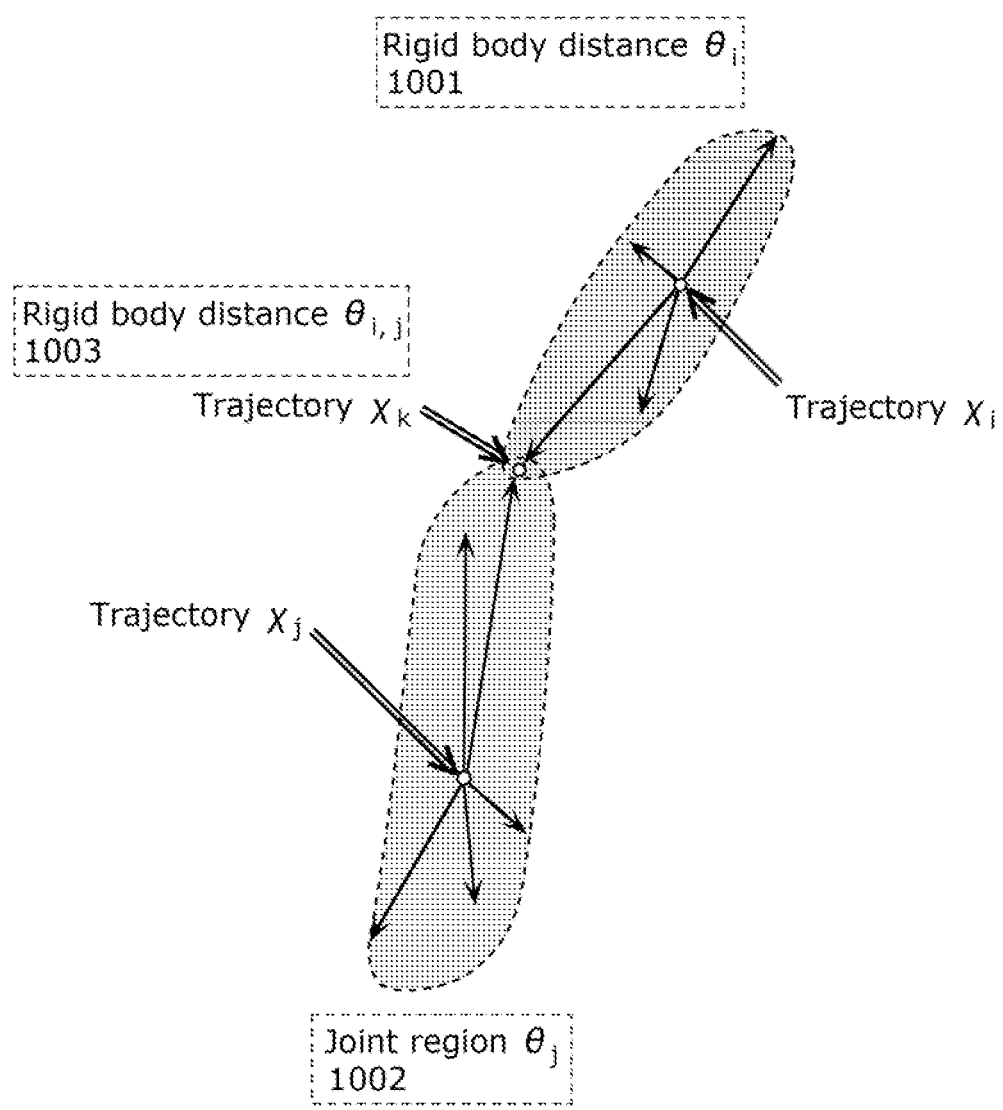
FIG. 11 is a diagram which shows a rigid body region and a joint region which correspond to a pair of trajectories.

First, the processing of detecting a trajectory of an articulation region (a joint region) from two trajectories is described, with reference to FIG. 11.

FIG. 11 is a pattern diagram which shows a close-up of a region around an articulation, in the example of the case where a single articulation is present in an image. In FIG. 11, only three representative trajectories xi, xj, and xk are displayed from among all of the trajectories for the sake of explanation. There are much more trajectories in the region in practice.

In the example of FIG. 11, three pairs of trajectories (xi, xj), (xi, xk), and (xj, xk) are used for pairwise (per pair) processing.

Here, as explained in the description of FIG. 10B, for the pair of trajectories on the same rigid body, the articulatedness $j_{jnt}$ is −1. Accordingly, in this example, the following is obtained.

$$j_{jnt}(i,k)=-1$$

$$j_{jnt}(j,k)=-1$$

Since an articulation region cannot be calculated from such a pair of trajectories, they are excluded here from the processing. In the case of FIG. 10B, $j_{jnt}$ is −10, and thus of course an articulation region cannot be calculated. In view of the above, the articulation detecting unit 105 performs subsequent processes only on the pair of trajectories having the articulatedness of $j_{jnt} \geq 0$.

To be more specific, the processing is carried out only on the pair of trajectories (xi, xj) in this case. The trajectories (xi, xj) of course satisfies the articulatedness $j_{jnt}(i, j) \geq 0$.

An articulation is a part in which two rigid bodies are in contact with each other at substantially a single point and which involves a motion similar to rotation. Accordingly, if (i) trajectories included in the rigid body region θi1001 that includes the first trajectory xi and (ii) trajectories included in the rigid body region θj1002 that includes the second trajectory xj are detected, the trajectories (as trajectory xk) included in an articulation region of an articulated object region can be obtained as the region comprised of the trajectories that both the rigid body region θi1001 and the rigid body region θj1002 include in common.

Accordingly, the articulation detecting unit 105 first performs calculation on all of the pairs of trajectories including the trajectory xi to find a trajectory xip which results in $j_{jnt}(i, ip)=-1$. The trajectory xip can be obtained from among all of the trajectories whose articulatedness with respect to the trajectory xi are previously obtained.

As a result, a trajectory xk is obtained as a trajectory included in the rigid body region θj1001 that includes the trajectory xi. Likewise, the articulation detecting unit 105 performs calculation on all of the pairs of trajectories including the trajectory xj to find a trajectory xjp which results in $j_{jnt}(i, jp)=1$. The trajectory xjp can be obtained from among all of the trajectories whose articulatedness with respect to the trajectory xj are previously obtained. As a result, the trajectory xk is obtained as a trajectory included in the rigid body region θj1002 that includes the trajectory xj.

The articulation region can be calculated as in Expression 15 as a product set of the rigid body region θi1001 and the rigid body region θj1002.

$$\theta i,j=\theta i \cap \theta j$$ (Expression 15)

Accordingly, a trajectory included in the articulation region θi, j can be lastly obtained by calculating the common portion between the trajectories included in the rigid body region θi1001 and the trajectories included in the rigid body region θj1002; that is, the product set. In the example shown in FIG. 11, for example, the trajectory xk is obtained as the trajectory xk included in the articulation region θi, j for the trajectories (xi, xj).

It is to be noted that, in such a case as it is known in advance that only one articulation is present in an image, a pair of trajectories whose articulatedness $j_{jnt}(i, j)$ results in the largest value is selected from among all of the pairs of trajectories and the same processing as the processing performed on the above-described trajectories (xi, xj) is carried out, thereby enabling easy detection of a trajectory included in the articulation region.

In general, however, there are many cases in which the number of articulations is not known in advance. For this reason, calculating an articulation only from a pair of two trajectories, as described above, can cause an error in detection of an articulation. Thus, it is desirable to detect a trajectory included in the articulation region by using all of the pairs of trajectories whose articulatedness is equal to or more than zero, as described below.

Figures 12A, 12B:
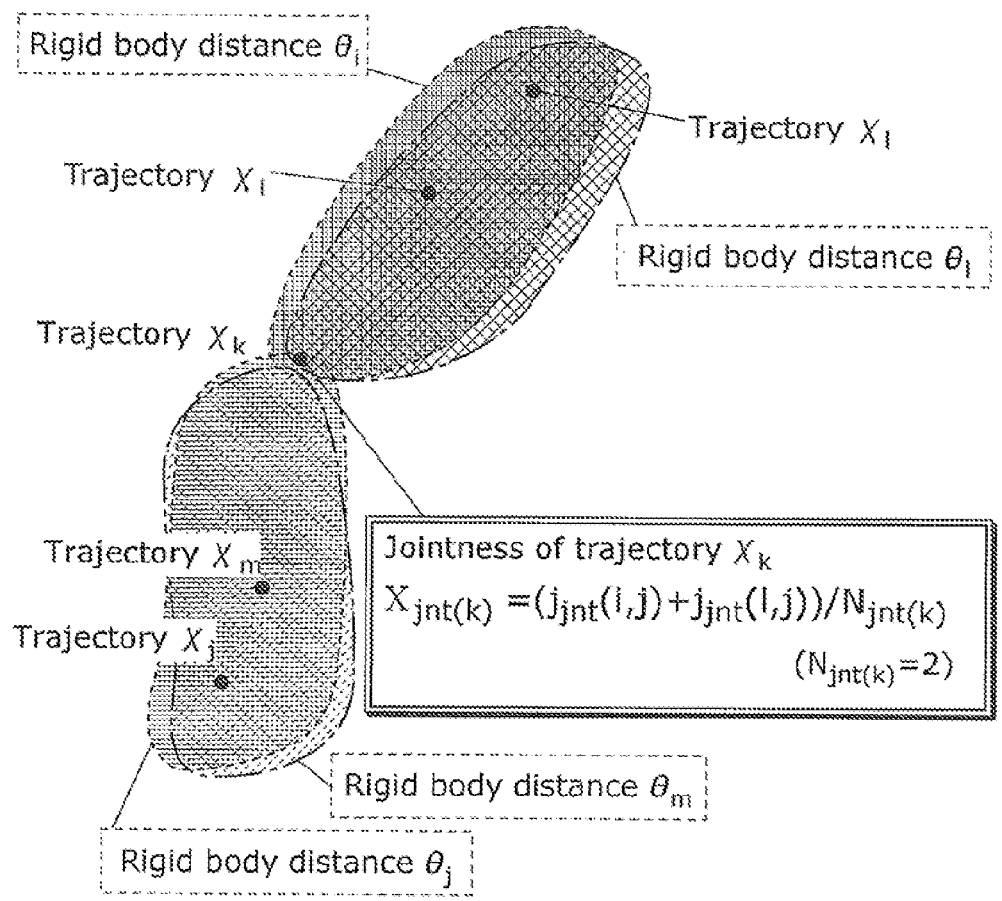
FIG. 12A is a diagram which shows a relationship between plural trajectories and an articulatedness.
FIG. 12B is a diagram which shows a value range of the articulatedness between pairs of trajectories.

FIG. 12A is a pattern diagram which shows a closeup of a region around an articulation, in the example of the case where a single articulation is present in an image. In FIG. 12A, only five representative trajectories xi, xj, xk, xl, and xm are displayed from among all of the trajectories for the sake of explanation. There are much more trajectories in the image in practice.

The table shown in FIG. 12B indicates articulatedness between the trajectories. Only whether the value of an articulatedness is positive or negative is indicated here for simplification. It is to be noted that the trajectories indicated in FIG. 12B correspond to the trajectories shown in FIG. 12A.

First, rigid body regions each including the trajectories xi, xj, xk, xl, and xm are calculated in advance. The rigid body regions may be calculated not at this time but at the time of the subsequent processing for each pair of trajectories. However, it is desirable to calculate in advance when the calculation amount is smaller than the calculation amount for calculating, over and over, the rigid body region with respect to the same trajectory.

According to the description of the above-described articulatedness $j_{jnt}$, when a trajectory has an articulatedness of −1 with respect to a trajectory among the trajectories xi, xj, xk, xl, and xm, the relationship between the trajectories is "rigid body region". The regions that include such trajectories are calculated as rigid body regions θi, θj, θk, θl, and θm, as shown in FIG. 12A. It is to be noted that, although not illustrated in FIG. 12A, θk is a sum of sets of θi, θj, and θl.

In addition, according to the description of the above-described articulatedness j, for only four pairs of trajectories (xi, xj), (xi, xm), (xl, xj), and (xl, xm) which have positive articulatedness, the relationship between the trajectories is "articulation motion". Each of the remaining six pairs has an articulatedness indicating −1, and thus two points are in the relationship of "the same rigid body". Thus, the processing of extracting an articulation is not to be performed in the same manner as the explanation for FIG. 11.

When the articulatedness corresponding to the four pairs of trajectories (xi, xj), (xi, xm), (xl, xj), and (xl, xm) are $j_{jnt}$(i, j), $j_{jnt}$ (i, m), $j_{jnt}$ (l, j), and $j_{jnt}$ (l, m), respectively, they are all non-zero positive values. Each of them represents an articulatedness of a corresponding one of the pairs of trajectories. Thus, it is possible to be used for weighting, as reliability when calculating a articulation region.

Here, FIG. 12A shows that the articulation region that is obtained from the trajectories (xi, xj) includes the trajectory xk. More specifically, the trajectories xk and xi are trajectories on the same rigid body, and the trajectories xk and xj are trajectories on the same rigid body.

In addition, it is shown that the articulation region obtained from the trajectories (xl, xj) also includes the trajectory xk. More specifically, the trajectories xk and xl are trajectories on the same rigid body, and the trajectories xk and xj are trajectories on the same rigid body.

On the other hand, the articulation region obtained from the trajectories (xi, xm) and the articulation region obtained from the trajectories (xl, xm) do not include the trajectory xk.

Accordingly, a jointness of the trajectory xk is determined not by a pair of the trajectories (xi, xm) and the trajectories (xl, xm) but by a pair of the trajectories (xi, xj) and the trajectories (xl, xj).

Here, the possibility of the trajectory xk belonging to the articulation region is called as "jointness" of the trajectory xk, then it can be said that this jointness of the trajectory xk depends on each of the articulatedness of the pair of the trajectories (xi, xj) and the articulatedness of the pair of the trajectories (xl, xj).

For example, there is a possibility that the relationship between the rigid body region θj and each of the rigid body regions θi and θl is a non-articulated motion resulting from occlusion or the like. In this case, the trajectory xk is obtained as a region where each of the rigid body regions overlaps or a trajectory included in the contact region; however, the trajectories xk is not the trajectory of the articulation region in this case because it is not resulting from the articulation motion between rigid bodies. In other words, the trajectory xk is not likely to be a joint.

In view of the above, the region where rigid bodies are overlapped, each of which is defined by a pair of trajectories whose articulatedness is a positive value, is called a joint candidate region, and an average of the articulatedness between pairs of trajectories including the trajectory xk in the joint candidate region is to be used. When a jointness of the trajectory xk is denoted as $X_{jnt(k)}$ and the number of pairs of trajectories including the trajectory xk in the joint candidate region is denoted as $N_{jnt(k)}$, the jointness $X_{jnt(k)}$ of the trajectory xk can be calculated using Expression 16 below, or the like.

$$X_{jnt(k)}=(j_{jnt}(i,j)+j_{jnt}(i,j))/N_{jnt(k)} \quad \text{(Expression 16)}$$

It is to be noted that, in the case shown in FIG. 12A, $N_{jnt(k)}=2$

It is to be noted that the above-described processes are not necessarily need to be performed on all of the pairs of trajectories, and the same result can be obtained by performing only on the pair of trajectories having the articulatedness $j_{jnt}$ larger than a predetermined threshold TH_J.

It is to be noted that the articulatedness can be calculated as in Expression 17 below to perform the same processing.

[Math. 15]

$$j_{jnt}(i,\ j) = \begin{cases} \left|\frac{g_t}{f_t}\right| / \max\left(\left|\frac{g_t}{f_t}\right|\right) & (f_t \neq 0) \\ -1 & (f_t = 0 \text{ and } g_t = 0) \\ -10 & (f_t = 0 \text{ and } g_t \neq 0) \end{cases} \quad \text{(Expression 17)}$$

(, where max(|gt/ft|) is the maximum value of |gt/ft|)

To be more specific, the articulatedness $j_{jnt}$(i, j) is closer to zero as the temporal change $g_t$ in the geodetic distance g is smaller and the temporal change $f_t$ in the Euclidean distance f is larger; that is, two trajectories are more likely to be an articulated pair, and conversely, the two trajectories are less likely to be an articulated pair as the articulatedness $j_{jnt}$(i, j) is further from zero. It is to be noted that, |gt/ft| is normalized with the maximum value to keep the value of the articulatedness $j_{jnt}$(i, j) between 0 and 1 just to simplify the calculation and explanation here; however this normalization is desirable, but not necessarily needed to be done in practice for the processing according to an embodiment of the present disclosure.

In addition, when Expression 17 is used, Expression 16 is to be changed as shown in Expression 18 below.

$$x_{jnt(k)}=((1-j_{jnt}(i,j))+(1-j_{jnt}(i,j))/N_{jnt(k)} \quad \text{(Expression 18)}$$

In addition, the articulatedness $j_{jnt}$(i, j) is calculated here as a continuous value. However, especially in such a case where the trajectories are evenly distributed, the articulatedness $j_{jnt}$ (i, j) may be calculated as below. When the temporal change in the geodetic distance is smaller than a predetermined geodetic distance threshold, and the temporal change in the predetermined point-to-point distance is larger than a predetermined point-to-point distance threshold, the articulatedness $j_{jnt}$(i, j) is calculated as one, and when the temporal change in the geodetic distance is equal to or larger than a predetermined geodetic distance threshold, or the temporal change in the predetermined point-to-point distance is equal to or smaller than a predetermined point-to-point distance threshold, the articulatedness $j_{jnt}(i, j)$ is calculated as zero. This binarization can facilitate the calculation.

As described above, the articulation detecting unit 105 calculates a jointness of the trajectory xk for each of the joint candidate regions using Expression 16 and outputs the obtained values.

In the present embodiment, the display control unit 106 performs image processing on an input picture of video captured by the image input unit 101 so as to be in a display form in which the articulation region detected by the articulation detecting unit 105 can be visually recognized, and outputs the processed input picture to be displayed on the display 120.

The display step S306 is performed by the display control unit 106. More specifically, the display control unit 106, based on the jointness $X_{jnt}(i)$ of each of the trajectories xi provided from the articulation detecting unit 105, generates a picture of which the jointness can be visually recognized, and displays the generated picture on the display 120.

It is assumed that a position on an image corresponding to the trajectory xi is (ui, vi). Since the trajectories are obtained over continuous frames, display may be carried out using, for example, a pixel position in the first frame of the trajectories. Then, color information of a pixel at a position (ui, vi) of the trajectories xi is assumed to be (Ri, Gi, Bi). By specifying the value of color information (Ri, Gi, Bi), color to be provided to the specific position of the image is determined.

For example, the articulation region can be displayed on the image through the processes as below.

Provided that among plural input images, an image corresponding to the first frame in a set of frames is Iin, and an output image is Iout, then copy the details of Iin to Iout in advance.

First, as to the jointness $X_{jnt}(i)$ that is an output of the articulation detecting unit 105, out of all of the jointness, the minimum value $X_{jnt\_}$min and the maximum value $X_{jnt\_}$max are calculated. All of the jointness $X_{jnt}(i)$ are normalized such that the minimum value $X_{jnt\_}$min results in zero and the maximum value $X_{jnt\_}$max results in a value of 255. The normalized jointness $X_{jnt\_}n(i)$ is written over the color information (Ri, Gi, Bi) on Iout. For example, it is possible to represent the jointness in red gradation on pixels to which trajectories which are likely to be joints correspond, by writing over the value represented by (Ri, Gi, Bi)=($X_{jnt\_}n(i)$, 0, 0). it is naturally understood that, $X_{jnt\_}n(i)$ may be substituted, instead of Ri, into Gi or Bi, and it is possible to implement grayscale gradation display by setting the value as (Ri, Gi, Bi)=($X_{jnt\_}n(i)$, $X_{jnt\_}n(i)$, $X_{jnt\_}n(i)$). In addition, although $X_{jnt\_}n(i)$ is calculated by normalizing $X_{jnt}(i)$ above, $X_{jnt\_}n(i)$ may be calculated using a function which monotonically increases or monotonically decreases with respect to $X_{jnt}(i)$, and in the same manner, it is possible to implement display such that the jointness is represented.

In addition, only a pixel (ui, vi) which corresponds to a trajectory xi having $X_{jnt}(i)$ equal to or larger than a predetermined fixed threshold $TH_{jnt}$ may be colored by a predetermined color. This allows clear visual recognition as to whether or not it is likely to be a joint. In addition, it is also possible to allow the articulated object region to be more easily viewed, by performing colored display not only on the joint but also on the trajectories in the rigid body region.

For example, it is possible to display a rigid body region including a joint, by coloring with a predetermined color the pixel (ui, vi) that corresponds to a trajectory included in the rigid body region corresponding to the trajectory xi having $X_{jnt}(i)$ equal to or larger than a predetermined fixed threshold $TH_{jnt}$; that is, the trajectory xj where the articulatedness is represented as j(i, j)=−1.

In addition, only the rigid body region may be displayed without displaying an articulation region.

Alternatively, the pixel (ui, vi) of the articulation region and the pixel (uj, vj) of the rigid body region may be separately colored with different colors. With this, it is possible to visually recognize the joint and the rigid body separately, further facilitating visually recognizing the configuration of the articulated object region.

Figure 13A:
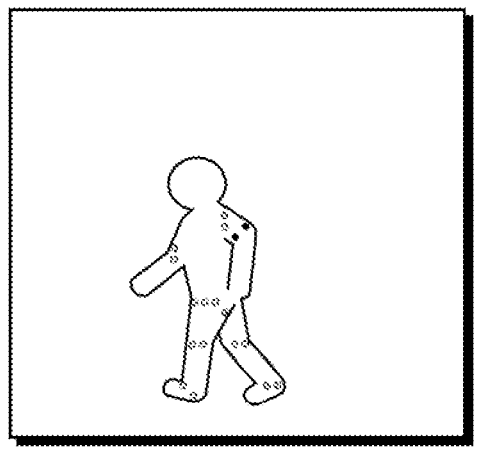
FIG. 13A is a diagram which shows an example of an image outputted from a display control unit.
Figure 13B:
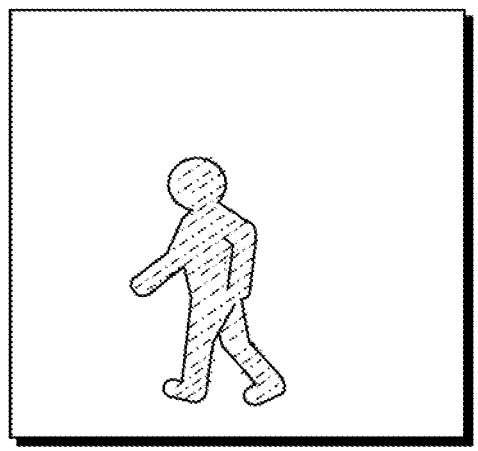
FIG. 13B is a diagram which shows an example of an image outputted from the display control unit.

FIG. 13A and FIG. 13B show examples of pictures generated by the display control unit 106.

The above-described coloring on the trajectories of the articulated object region (joint or rigid body) calculated by the articulation detecting unit 105 allows displaying pictures as shown in FIG. 13A and FIG. 13B, for example. In FIG. 13A, pixels corresponding to the trajectories of articulation regions are indicated by circles. In FIG. 13B, pixels regions corresponding to the trajectories of also rigid body regions are indicated by hatching. Such display modes allows the articulation regions or the rigid body regions in a picture to be correctly extracted and the result thereof to be displayed so as to be easily recognized.

In addition, articulation regions included in the same rigid body region may be connected to each other by a straight line and displayed. With the configuration described above, it is possible to realize a bone-like representation as usually done with Computer Graphics. Alternatively, outputting, as they stand, the pixel position and the position of the straight line also allows, although two dimension, that information to be used as a simple bone data for 2D animation or the like.

It is to be noted that the display control unit 106 draws a pixel positioned at a picture coordinate of a trajectory with a color according to a jointness, as the procedure of generating the picture; however, the method of generating a picture is not limited to this.

To be more specific, as long as the number of trajectories and the number of pixels in the entire picture are the same, it is possible to draw all of the pixels in the picture with a color according to a jointness using the above-described method, or according to a result of judgment of a articulation region, a rigid body region, and a region other than an articulated object region, with distinguishable colors for the respective regions. On the other hand, in the case where the number of trajectories is smaller than the number of pixels in the entire picture, a pixel is present which that does not match a picture coordinate position of any trajectories. It is to be noted that, in the description below, the articulation region, the rigid body region, and the region other than an articulated object region are described as being classified into classes different from each other.

Such a pixel that does not match a picture coordinate position of any trajectories may be drawn with an alternative method. For example, as an alternative method of drawing a pixel that does not match a picture coordinate position of any trajectories, picture coordinate positions (points) of plural trajectories may be connected by Delaunay triangulated mesh generating method, and a pixel included in a triangle surrounded by three points that belong to the same class may be drawn with the color same as the class.

It is to be noted that, when processing video that is consecutively inputted, the aforementioned operations of steps S301 to S307 may be repeated every time T number of pictures are inputted.

As described above, according to the articulation region display apparatus and the method according to the present embodiment, a trajectory in a articulation region is extracted according to an articulatedness obtained based on temporal changes of the inter-trajectory Euclidean distance and the inter-trajectory geodetic distance in a picture. With this, it is possible to extract and display, as a result of temporally tracking an articulated object region of an object moving in a picture, the articulated object region of the moving object in the picture, irrespective of a posture of the articulated object.

Furthermore, since it is not necessary to set a human candidate region as preprocessing, no failure occurs in region extraction due to an error in detecting the human candidate region.

It is to be noted that, the number of pictures T of the trajectories extracted by the distance calculating unit 107 from the trajectories generated by the trajectory calculating unit 102 is T=30 in the articulation region detection apparatus according to the present embodiment; however, the number of pictures T of the trajectories is not limited to this numerical value. For example, another numerical value may be used according to a type or state of a moving object to be detected. For example, when a target of detection can be assumed to be a walking person, since an average walking cycle is approximately 1 second (30 frames), the trajectory that spans pictures of T=30 frames corresponds to one walking cycle of a person. As described above, when a target of detection is a moving object having a periodical change in shape, the influence of change in shape of the moving object is reduced, by setting the number of pictures T of a trajectory to be extracted by the distance calculating unit 107 as the number of pictures corresponding to a cycle of change in shape of the moving object, thereby producing an advantageous effect of enabling more accurate extraction of the moving object. In addition, when a moving object region of which trajectories that span T pictures cannot be calculated due to the influence of occlusion or the like is present in a picture, an advantageous effect is produced that a region of the moving object can be more specifically detected, by setting, as S (S<T), the maximum number of pictures of which the trajectories can be calculated.

With the articulation region display apparatus and method according to the present embodiment and the modifications thereof as described above, an articulatedness between trajectories is calculated based on a temporal change in a geodetic distance and a temporal change in a point-to-point distance between trajectories to extract an articulation, and thus it is possible to correctly detect and display the articulation or a moving object region including the articulation, without being affected by the change in a shape of a moving object.

Furthermore, since it is not necessary to set a human candidate region as preprocessing, no failure occurs in extraction due to an error in detecting the human candidate region. Therefore, without requiring fitting of a vast quantity of parameters, it is possible to correctly extracting an articulation region in a picture including a person or the like which moves changing its shape, by only simply using a simple feature value based on the temporal change in a Euclidean distance and a geodetic distance, thereby enabling accurate extraction and detection of a moving object in the picture.

In addition, the articulation region display apparatus 100 according to the embodiment described above includes the image input unit 101 and the trajectory calculating unit 102; however, those components are not indispensable in the present disclosure. More specifically, in the case where trajectories of a picture in each of the blocks included in video are calculated in advance, the articulation region display apparatus 100 may obtain such trajectories from outside and may perform processing of steps S203 to 208 on the obtained trajectories. Furthermore, although the present disclosure is implemented as an articulation region display apparatus, it should be understood that the present disclosure can be implemented as an image processing apparatus which extracts or segments the articulated object region or the articulation region (joint region) in video as long as the function of the articulation region display unit 103 is provided.

It is to be noted that, in the present embodiment, a Euclidean distance is used as a point-to-point distance; however it is not limited to the Euclidean distance, as described above. The present disclosure also includes an embodiment in which an arbitrary distance index defined with the aforementioned point-to-point distance is used.

Embodiment 2

The articulation region display apparatus according to the above-described Embodiment 1 and modifications thereof calculates, using Expression 16, the jointness of each trajectory of plural pairs of trajectories, in the calculation procedure of the jointness. At this time, in the examples of FIG. 12A and FIG. 12B, the pair of trajectories to be used for calculating the jointness of the trajectory xk is selected in advance from among all of the pairs of trajectories and then used. More specifically, first, the articulatedness of each of the pairs of trajectories is calculated, and only the pairs of trajectories each of which has the articulatedness having a value equal to or larger than a threshold are selected. Further, among the selected pairs of trajectories, two rigid body regions are calculated, each of which includes a corresponding one of the two trajectories forming a corresponding one of the pairs of trajectories. In this case, only the pair of trajectories is selected, which includes the trajectory xk as a trajectory that is common between the rigid body regions. To be more specific, (i) the articulatedness between the pair of trajectories and (ii) the same-rigid-body likelihood between the trajectory xk and each of the trajectories which form the pair of trajectories are sequentially binarized, thereby eventually selecting the pair of trajectories to be used for calculating the jointness of the trajectory xk.

However, such binarization is not necessarily required as the calculation method of a jointness of a trajectory. An advantage of the binarization is that it allows the simplified calculation and the processing at higher speed. However, it is possible to more finely express the jointness of the trajectory xk, by using the articulatedness of the pair of trajectories and the same-rigid-body likelihood between the trajectory xk and each of the trajectories which form the pair of trajectories, not as a binary but as a multiple value as it is. Accordingly, it is possible to calculate the jointness of the trajectory xk with higher accuracy.

Figure 14:
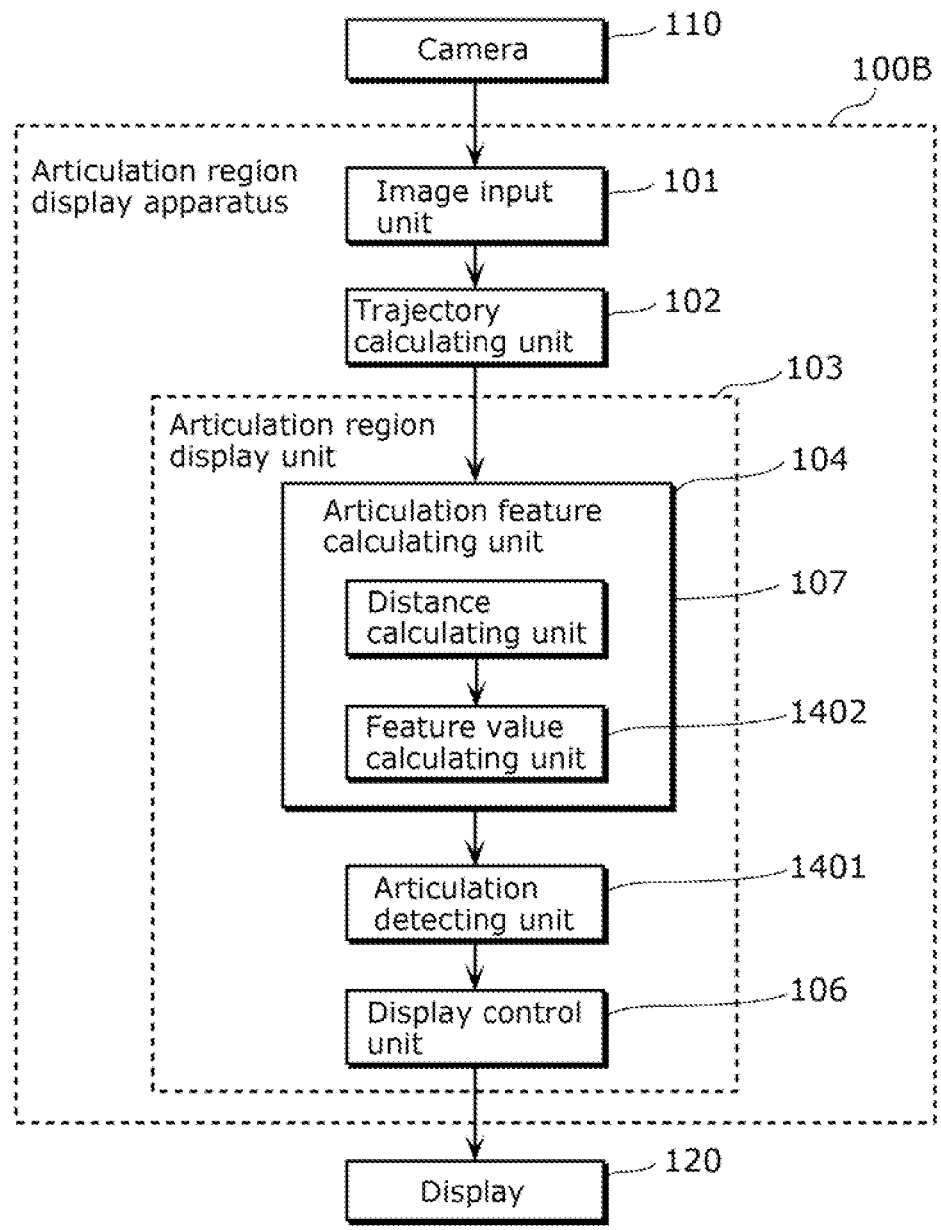
FIG. 14 is a diagram which shows a configuration of an articulation region display apparatus according to Embodiment 2 of the present disclosure.

FIG. 14 is a diagram which shows a configuration of an articulation region display apparatus according to this embodiment. The articulation region display apparatus 100B includes: an articulation detecting unit 1401 which performs a different calculation, instead of the articulation detecting unit 105 of the articulation region display apparatus 100 in Embodiment 1; and a feature value calculating unit 1402 which performs a different calculation, instead of the feature value calculating unit 108.

The feature value calculating unit 1402 according to the present embodiment calculates (i) an articulatedness $j_r$ between a pair of trajectories and (ii) a same-rigid-body feature value $r_r$ which represents the same-rigid-body likelihood between the pair of trajectories and which can be calculated from the articulatedness $j_r$ between the pair of trajectories. The articulation detecting unit 1401 according to the present embodiment calculates a jointness $X_{jnt}$ of each of the trajectories, using the articulatedness $j_r$ between the pair of trajectories and the same-rigid-body feature value $r_r$ which can be calculated from the articulatedness $j_r$ between the pair of trajectories. Accordingly, the articulation detecting unit 1401 uses the articulatedness of the pair of trajectories and the same-rigid-body feature value which are calculated by the feature value calculating unit 1402 for all of the pairs of trajectories, and thus it is possible to calculate the jointness of the trajectories accurately as a whole, even when an error is included individually in an feature value.

Figure 15:
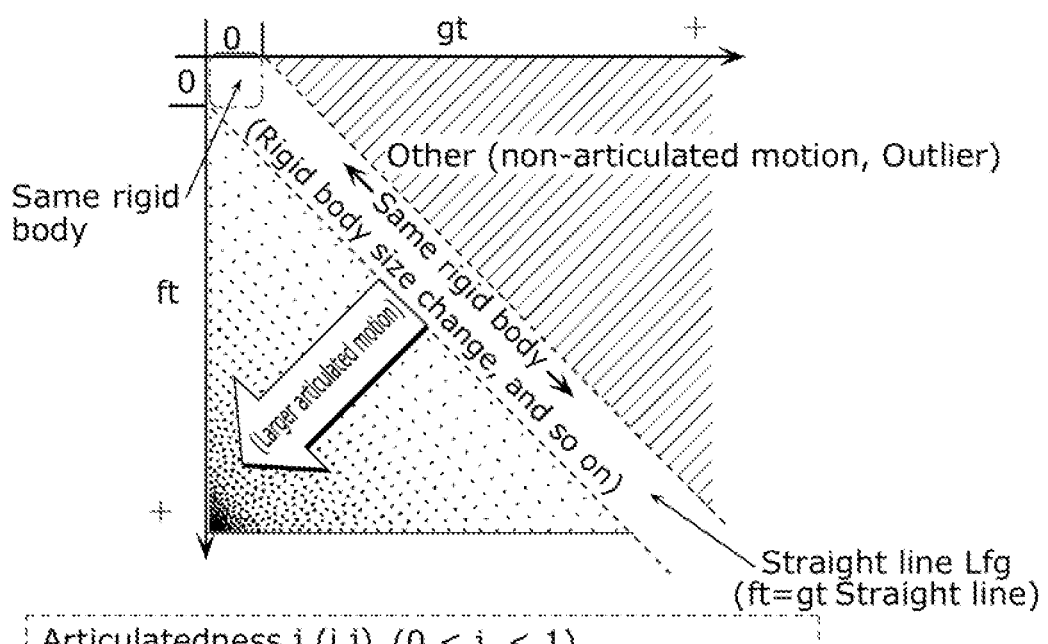
FIG. 15 is a diagram which shows a relationship between a distance between trajectories and articulatedness.

The following describes, with reference to FIG. 15, the operations performed by the articulation detecting unit 1401 and the feature value calculating unit 1402.

First, the procedure for calculating the articulatedness between a pair of trajectories performed by the feature value calculating unit 1402 will be described.

FIG. 15 shows an articulation relationship (rigid body/articulation/others) between a pair of trajectories, and a relationship between $f_t$ and $g_t$. Here, it is empirically known that the pairs of trajectories in which $g_t > f_t$ are mostly two points other than: two points on the same rigid body; or two points that involve articulation motion, and thus there is no problem in setting in advance the pairs of trajectories in which $g_t > f_t$ as an outlier. In practice, a condition of outlier is set with a certain margin kept. The details will be given later.

It is to be noted that, as to the condition of "two trajectories are present on the same rigid body" in FIG. 15, a value range is extended to not only the condition of $g_t = f_t = 0$ but also the condition of $g_t = f_t$; that is the condition that $g_t$ and $f_t$ are present on a straight line Lfg. It has been described in Embodiment 1 that two points are present on the same rigid body only when both of the $g_t$ and $f_t$ are 0; however, $f_t$ does not necessarily result in 0 in the case where a given rigid body is Scaled or where a minute error is included in a corresponding point. However, in this case as well, there is no temporal change in a path for calculating the geodetic distance between two points on the same rigid body; that is a path to "follow" for calculating a distance that "follows" the trajectories. Thus, since the geodetic distance g also changes according to the change in the Euclidean distance f, $f_t = g_t$ is satisfied as to a temporal change in a distance as well.

As described above, $f_t = g_t$ that is the condition that $g_t$ and $f_t$ are present on the straight line Lfg is applied here as the condition that indicates a rigid body relationship in a broader sense compared to Embodiment 1.

In the present embodiment, since continuous articulatedness are used for calculating a jointness, the same-rigid-body feature value $r_r$ is defined which results in a larger value as two trajectories are more likely to be the same rigid body, to be calculated using the temporal change $g_t$ in the geodetic distance and the temporal change $f_t$ in the Euclidean distance. The phrase "two trajectories are likely to be the same rigid body" means that the degree of likelihood is high at which regions that correspond to two trajectories are included in the same rigid body.

The same-rigid-body feature value $r_r$ is calculated based on a distance $dl_{i,j}$ from $f_t = g_t$ (straight line Lfg) when plotting the pair of trajectories $f_t$ and $g_t$ on a $f_t$-$g_t$ graph. First, the distance $dl_{i,j}$ from $f_t = g_t$ (straight line Lfg) can be calculated by Expression 19 below.

[Math. 16]

$$dl_{i,j} = \{f_t(i,j) - g_t(i,j)\}/\sqrt{2.0} \qquad \text{(Expression 19)}$$

It is to be noted that the method of calculating the distance $dl_{i,j}$ from the straight line Lfg is not limited to Expression 19. Since a result that a pair of trajectories is more likely to be articulated as ft is larger, is obtained from an experimentation conducted by the inventors, an expression in which an influence of ft is added to Expression 19 may be used. For example, Expression 20 may be used. Of course, the method of calculating the distance dli, j from the straight line Lfg is not limited to Expression 20, as long as the same advantageous effect can be obtained.

[Math. 17]

$$dl_{i,j} = f_t(i,j)\{f_t(i,j) - g_t(i,j)\}/\sqrt{2.0} \qquad \text{(Expression 20)}$$

As to the pair of trajectories on the same rigid body, $dl_{i,j} = 0$ is supposed to ideally be satisfied; however, there is a case, in practice, where the positions of the pair of trajectories are away from the straight line Lfg due to the influence of a calculation error and the like and $dl_{i,j} = 0$ is not satisfied. In view of the above, thresholds Th1 and Th2 are specified as margins, and the same-rigid-body feature value $r_r$ is calculated by the expression below. The value $r_r$ takes a value ranging from 0 to 1, and it is indicated that the pair of trajectories are more likely to be present on the same rigid body as the value is closer to 1. The value $r_r$ takes −1 as an error value. It is to be noted that it is possible to use 0.1 for the threshold Th1 and 0.01 for the threshold Th2, for example. However, this is an example in the case where all of the distances are normalized using a designated value 64 when calculating $g_t$ and $f_t$.

[Math. 18]

$$r_r(i,j) = (Th_1 - dl_{i,j})/Th_1 (0 \leq dl_{i,j} \leq Th_1)$$

$$r_r(i,j) = (Th_2 + dl_{i,j})/Th_1 (-Th \leq dl_{i,j} \leq 0)$$

$$r_r(i,j) = -1 (-Th_2 > dl_{i,j}, dl_{i,j} > Th_1)$$

, where $(Th_2 \leq Th_1)$ (Expression 21)

In addition, the articulatedness $j_r$ of the pair of trajectories is calculated from the same rigid body feature value $r_r$ using Expression 22 below. The articulatedness $j_r$ indicates that the pair of trajectories are more "likely to be an articulation" as the value is closer to 1, and that the pair of trajectories are more likely to be two trajectories on the same rigid body as the value is closer to 0.

[Math. 19]

$$j_r(i,j) = 1 - r_r(i,j) (1 \geq r_r(i,j) \geq 0)$$

$$j_r(i,j) = -1 (0 > r_r(i,j), r_r(i,j) > 1) \qquad \text{(Expression 21)}$$

The same-rigid-body feature value $r_r$ is a value ranging from 0 to 1, and thus the articulatedness $j_r$ also takes a value ranging from 0 to 1. It is indicated that the articulation motion of the pair of trajectories are larger as the value $j_r$ is closer to 1. The value $j_r$ takes −1 as an error value.

It is to be noted that, both of the same-rigid-body feature value $r_r$ and the articulatedness $j_r$ are used for explanation in the description below; however, since the articulatedness and the same-rigid-body feature value are mutually interdependent variables as described above, it is not necessary, in an actual processing, to explicitly define that these two variables have different values, and it is sufficient to perform calculation based on only one of these variables.

It is to be noted that the methods of calculating the same-rigid-body feature value $r_r$ and the articulatedness $j_r$ are not limited to Expression 21 and Expression 22, and a function whose value is (i) closer to 1 as the positions of the pair of trajectories are closer to the straight line Lfg and (ii) closer to 0 as the positions of the pair of trajectories are further away from the straight line Lfg may be used for the same-rigid-body feature value $r_r$, and a function whose value is (i) closer to 0 as the positions of the pair of trajectories are closer to the straight line Lfg and (ii) closer to 1 as the positions of the pair of trajectories are further away from the straight line Lfg may be used for the articulatedness $j_r$.

The same-rigid-body feature value $r_r$ may be calculated, for example, by Expression 23 or Expression 24 below. It is possible to reduce the influence of an outlier without using Th1 or Th2, by setting appropriately a parameter σ and param.

[Math. 20]

$$r_r(i,j) = \exp(-(dl_{i,j}^2/2\sigma^2)). \quad \text{(Expression 23)}$$

[Math. 21]

$$r_r(i,j) = \exp(-dl_{i,j}/\text{param})(dl_{i,j} \geq 0)$$

$$r_r(i,j) = \exp(dl_{i,j}/\text{param})(dl_{i,j} < 0),$$

, where param>0 \quad (Expression 24)

In addition, the articulatedness $j_r$ may be calculated, for example, by Expression 25 or Expression 26 below. At this time, the form of Expression 22 is not necessarily need to be satisfied, and it is allowed to arbitrarily select from Expression 23, Expression 24, Expression 25, and Expression 26.

It is possible to reduce the influence of an outlier without using Th1 or Th2, by setting appropriately a parameter σ and param. However, max_$dl_{i,j}$ is the maximum value of $dl_{i,j}$ that satisfies $dl_{i,j} > 0$.

[Math. 22]

$$j_r(i,j) = \exp(-(\text{max\_}dl_{i,j} - dl_{i,j})^2/(2\sigma^2))(dl_{i,j} \geq 0)$$

$$j_r(i,j) = -1 (dl_{i,j} < 0) \quad \text{(Expression 25)}$$

[Math. 23]

$$j_r(i,j) = \exp(-(\text{max\_}dl_{i,j} - dl_{i,j})/\text{param})(dl_{i,j} \geq 0)$$

$$j_r(i,j) = \exp((\text{max\_}dl_{i,j} - dl_{i,j})/\text{param})(dl_{i,j} < 0)$$

, where param>0 \quad (Expression 26)

The articulatedness is calculated by the feature value calculating unit 1402 through the processes described above.

Next, the processes performed by the articulation detecting unit 1401 will be described. The articulation detecting unit 1401 calculates a jointness of trajectories based on the articulatedness of each of the pairs of trajectories calculated by the feature value calculating unit 1402.

Here, FIG. 16 shows a trajectory A at a joint, trajectories B, C, and D on rigid bodies, and a trajectory E of an outlier. An example of the case where three pairs of trajectories (AB, BC, and AC) between given three trajectories are selected is shown in (a) in FIG. 16. As shown in (a) in FIG. 16, the pair of trajectories AB has a small articulatedness $j_r$(AB), and thus has a large same-rigid-body feature value $r_r$(AB). In the same manner, the pair of trajectories AC has a small articulatedness $j_r$(AC), and thus has a large same-rigid-body feature value $r_r$(AC). In such a case, it can be said that the trajectory A is likely to be present on the same rigid body as each of the trajectory B and the trajectory C. Here, for the trajectory A to be a joint, the trajectories B and C need to belong to different rigid bodies. Accordingly, the pair of trajectories BC has a large articulatedness $j_r$(BC), and thus has a small same-rigid-body feature value $r_r$(BC), as shown in (a) in FIG. 16.

In the same manner as the above-described example, an example of the case where three pairs of trajectories (AB, BD, and AD) between given three trajectories are selected is shown in (b) in FIG. 16. As shown in (b) in FIG. 16, the pair of trajectories AB has a small articulatedness $j_r$(AB), and thus has a large same-rigid-body feature value $r_r$(AB). In the same manner, the pair of trajectories AD has a small articulatedness $j_r$(AD), and thus has a large same-rigid-body feature value $r_r$(AD). Further in the same manner, the pair of trajectories BD has a small articulatedness $j_r$(BD), and thus has a large same-rigid-body feature value $r_r$(BD). In such a case, information indicating that three trajectories A, B, and D are present on the same rigid body can be obtained. However, information indicating which trajectory is likely to be a joint cannot be obtained, or even information indicating whether or not there is, a trajectory that is likely to be a joint cannot be obtained.

Furthermore, an example of the case where three pairs of trajectories (AB, BE, and AE) between given three trajectories are selected is shown in (c) in FIG. 16. Here, E is a trajectory of an outlier. As shown in (c) in FIG. 16, as to the pairs of trajectories with the outlier, AE and BE, each of the articulatedness $j_r$ and the same-rigid-body feature value $r_r$ has a value indicating −1. In this case as well, information indicating which of the trajectories A and B is likely to be a joint cannot be obtained, or even information indicating whether or not there is, in the first place, a trajectory that is likely to be a joint cannot be obtained.

Thus, the jointness need to be calculated from the pair of trajectories that satisfies the relationship show in (a) in FIG. 16. On the other hand, since the information indicating which trajectory is likely to be a joint cannot be obtained in the case of (b) and (c) in FIG. 16, it is necessary that the pair of trajectories in such cases does not contribute to the calculation. In view of the above, the jointness $X_{jnt}$ is calculated from the pairs of all of the trajectories other than the trajectory A, using the expression below.

[Math. 24]

$$X_{jnt}(A) = r_r(AB)r_r(AC)j_r(BC) + r_r(AB)r_r(AD)j_r(BD) + \quad \text{(Expression 27)}$$
$$r_r(AB)r_r(AE)j_r(BE) + r_r(AC)r_r(AD)j_r(CD) +$$
$$r_r(AC)r_r(AE)j_r(CE) + r_r(AD)r_r(AE)j_r(DE),$$

where as to the term having an articulatedness of −1,
the value −1 is replaced with 0 for multiplication Here, it can be said that Expression 27 results in as shown in [Math. 26] below, in consideration of [Math. 25] below.

$$j_r(BD) \cong 0, j_r(BE) \cong 0, j_r(CE) \cong 0, j_r(DE) \cong 0 \quad \text{[Math. 25]}$$

$$X_{jnt}(A) \cong r_r(AB)r_r(AC)j_r(BC) + r_r(AC)r_r(AD)j_r(CD) > 0 \quad \text{[Math. 26]}$$

To be more specific, the jointness of the trajectory A can be represented by information from three trajectories that satisfy the relationship shown in (a) in FIG. 16.

On the other hand, as to the trajectory B which is not present at the joint, for example, the jointness $X_{jnt}$ can be calculated from the pairs of all of the trajectories other than the trajectory B, using Expression 28 below.

[Math. 27]

$$X_{jnt}(B) = r_r(AB)r_r(BC)j_r(AC) + r_r(AB)r_r(BD)j_r(AD) + \quad \text{(Expression 28)}$$
$$r_r(AB)r_r(BE)j_r(AE) + r_r(BC)r_r(BD)j_r(CD) +$$
$$r_r(BC)r_r(BE)j_r(CE) + r_r(BD)r_r(BE)j_r(DE),$$

where as to the term having an articulatedness of −1,
the value −1 is replaced with 0 for multiplication Here, Expression 28 results in as shown in [Math. 29] below, in consideration of [Math. 28] below.

$$j_r(AC) \cong 0, j_r(AD) \cong 0, j_r(AE) \cong 0, r_r(BC) \cong 0, j_r(DE) \cong 0 \quad \text{[Math. 28]}$$

$$X_{jnt}(B) \cong 0 \quad \text{[Math. 29]}$$

To be more specific, it can be seen that, as to the trajectories other than the trajectory at the joint, the value of the jointness $X_{jnt}$ is suppressed to be small.

According to the configuration described above, it is possible to express more finely the jointness of the trajectory xk, in other words, it is possible to calculate the jointness of the trajectory xk with higher accuracy.

Figure 17:
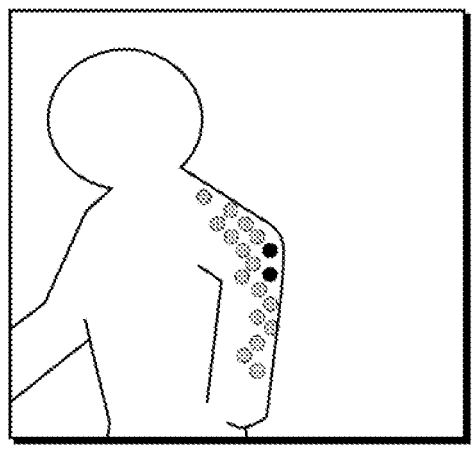
FIG. 17 is a diagram which shows an example of an image outputted from the display control unit.

FIG. 17 shows an example of a joint of an articulation expressed by gradation, based on a value of the jointness. It can be seen that the color is darker in a position closer to the joint, and thus it is possible to easily visually recognize the position of the joint.

It is to be noted that, as to the predetermined thresholds Th1 and Th2, for example, in the case where the size of an object or the size of a motion is known in advance, it is known that the distribution of the $g_t$-$f_t$ value changes as shown in FIG. 18. In FIG. 18, the portion on which hatching is performed represents the region in which the $g_t$ value and the $f_t$ value are distributed. Thus, the thresholds Th1 or Th2 may be changed according to the size of the object or the size of the motion. As to the large object and motion as shown in (b) in FIG. 18, for example, the thresholds Th1 and Th2 may be set to larger values than the thresholds Th1 and Th2 used in the case of (a) in FIG. 18.

Alternatively, an object selecting mode to be used by a user may be provided. it is possible to calculate the jointness of the trajectories with higher accuracy using more suitable thresholds Th1 and Th2, by determining in advance the thresholds Th1 and Th2 which are optimal for the object and the size of the object so that a user can specify in advance the object or the size when using the apparatus. In addition, the information may indicate not only the object and the size but also a picture-taking site or a setting place of the apparatus which can define the size of an articulation region to some extent. This indicates the maximum size or a broad size of the object. Alternatively, a user may interactively specify in advance an object region to some extent, using a touch-pen, a touch-pad, or the like. It is to be noted that, although it has been described above that the pair of trajectories which is "likely to be the same rigid body" is closer to the relationship $f_t = g_t$ than the pair of trajectories which is "likely to be an articulation", since there also is a difference between the values of $f_t$ and $g_t$ to some extent, it is also possible to add these items of information so as to increase the accuracy in articulation detection. As shown in (c) in FIG. 18, for example, weighting is performed such that (i) the same-rigid-body feature value $r_r$ becomes larger for the pair of trajectories of which both of the $f_t$ and $g_t$ are smaller than the threshold ThRig and (ii) the same-rigid-body feature value $r_r$ becomes smaller for the pair of trajectories of which one of the $f_t$ and $g_t$ is larger than the threshold ThRig, thereby allowing handling objects which are more "likely to be the same rigid body" as data which is more "likely to be the same rigid body". Therefore, it is possible to perform calculation of a jointness with higher accuracy.

It is to be noted that the articulation detecting unit 1401 may convert the jointness $X_{jnt}$ before outputting and output the converted jointness to the display control unit 106, instead of outputting the jointness $X_{jnt}$ as it is to the display control unit 106.

To be more specific, the articulation detecting unit 1401 calculates as a joint, a point which becomes local maximum on a two-dimensional plane having a pixel coordinate system, among values of the jointness $X_{jnt}$. For example, a new jointness $newX_{jnt}$ which takes 1 when the jointness $X_{jnt}$ is locally maximum and otherwise takes 0 may be defined and the articulation detecting unit 1401 may output the new jointness $newX_{jnt}$ to the display control unit 106. Here, binarization is performed for simplification; however, multiple values may, of course, be used. According to the configuration described above, since information at a pixel position at which the jointness $X_{jnt}$ is locally the highest can be transmitted to the display control unit 106, it is possible to stably display the articulation region even when there is an increase in the number of articulations.

Embodiment 3

The articulation region display apparatus according to the above-described Embodiment 2 calculates, from plural pairs of trajectories, the jointness of each trajectory and performs display based on the jointness. In this case, for example, the display based on the jointness is sufficient in the case where, for example, only the articulation region is to be detected. However, when the entire articulated object region is to be detected, there is a problem that the display of the entire articulated object region is difficult to be visually recognized when merely displaying the jointness on an image, because the jointness decreases at an edge portion of the articulated object region.

In view of the above, the present embodiment describes processing that aims to detect the entire articulated object region using an "articulated object region likelihood" of each trajectory as a measure, calculated by using the obtained jointness of each trajectory and the same-rigid-body feature value of trajectories.

Figure 19:
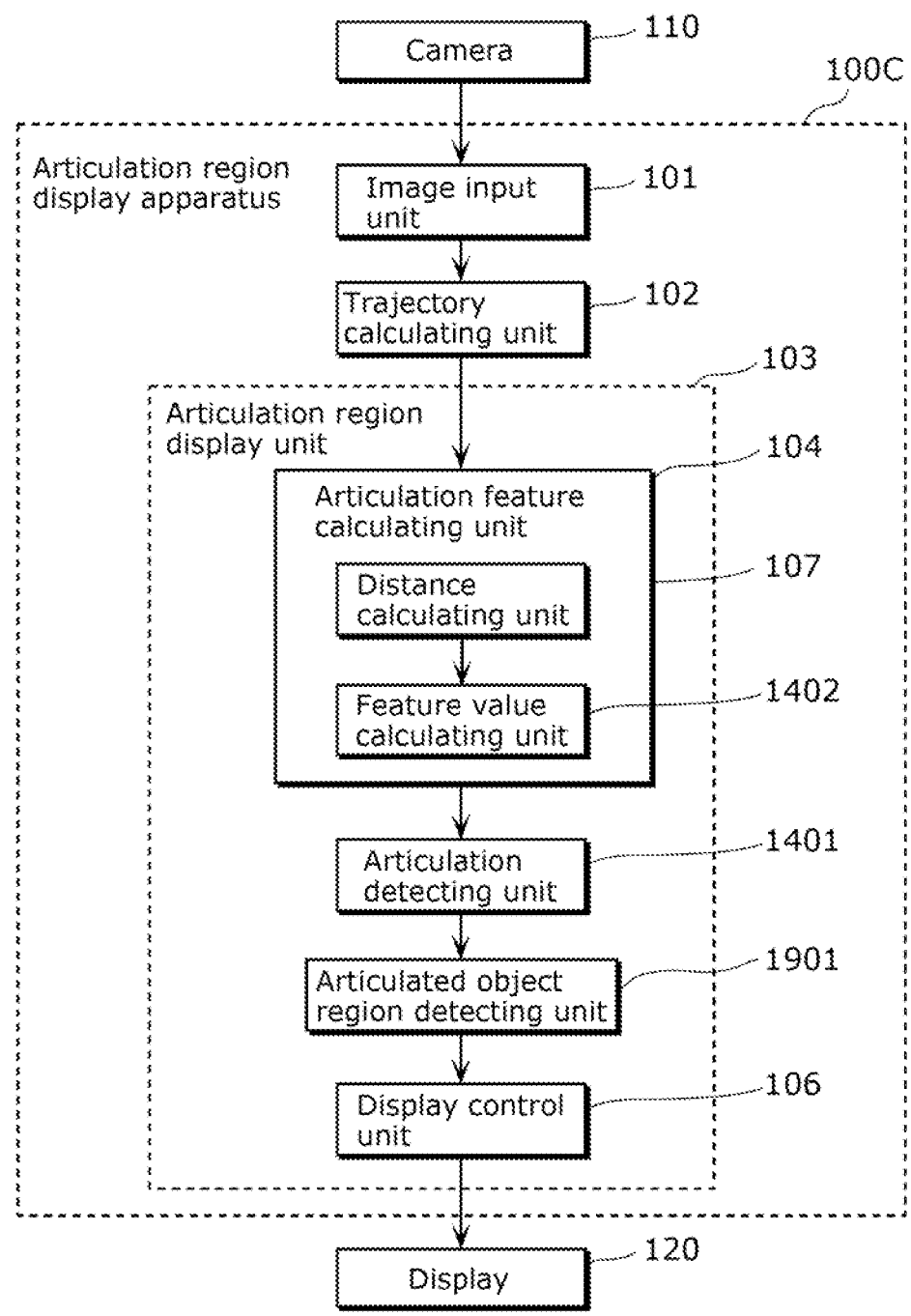
FIG. 19 is a diagram which shows a configuration of an articulation region display apparatus according to Embodiment 3 of the present disclosure.

FIG. 19 is a diagram which shows a configuration of an articulation region display apparatus according to this embodiment. An articulation region display apparatus 100C includes: an articulated object region detecting unit 1901 subsequent to the articulation detecting unit 1401 included in the configuration of the articulation region display apparatus 100B according to Embodiment 2.

The articulated object region detecting unit 1901 according to the present embodiment calculates an "articulated object region likelihood" Xreg of trajectories, using the same-rigid-body feature value $r_r$ between a pair of trajectories and the jointness $X_{jnt}$ of a trajectory.

To be more specific, since the articulated object region detecting unit 1901 calculates an articulated object region likelihood under the definition that a trajectory "which is likely to be present on the same rigid body as a trajectory which is more likely to be a joint" is an articulated object region, it is possible to calculate the "articulated object region likelihood" of each of the trajectories only from information of the jointness.

Figure 20:
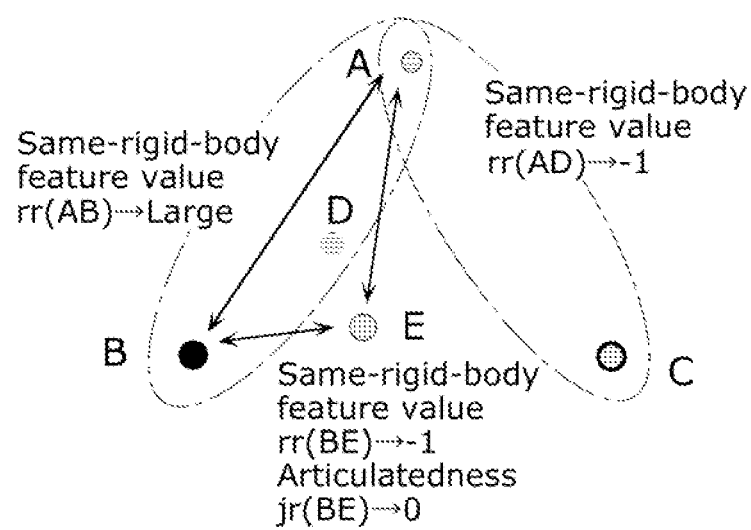
FIG. 20 is a diagram for explaining an operation of the articulated object region detecting unit.

The following describes, with reference to FIG. 20, the operations performed by the articulated object region detecting unit 1901. In FIG. 20, A, B, C, and D are points on an articulated object region, and E is an outlier outside the articulated object region. All the trajectories on the articulated object region have in common that the same-rigid-body feature value is larger than the same-rigid-body feature value of a trajectory which is likely to be a joint. Accordingly, the articulated object region likelihood Xreg(B) of the point B is defined by an expression below.

$$X_{reg}(B)=X_{jnt}(A)r_r(AB)+X_{jnt}(B)r_r(BB)+X_{jnt}(C)r_r(BC)+X_{jnt}(D)r_r(BD)+X_{jnt}(E)r_r(BE)$$

, where $r_r(BB)=1$, and [Math. 30]

where as to the term having a jointness of −1, the value −1 is replaced with 0 for multiplication.
Here, Math. 32 is obtained based on Math. 31 below.

$$X_{jnt}(B)\cong 0, X_{jnt}(C)\cong 0, X_{jnt}(E)\cong 0 \quad [\text{Math. 31}]$$

$$X_{reg}(B)\cong X_{jnt}(A)r_r(AB)+X_{jnt}(D)r_r(BD)>0 \quad [\text{Math. 32}]$$

In addition, as to the outlier E, Xreg(E) is represented as below.

$$X_{reg}(E)=X_{jnt}(A)r_r(AE)+X_{jnt}(B)r_r(BE)+X_{jnt}(C)r_r(CE)+X_{jnt}(D)r_r(DE)+X_{jnt}(E)r_r(EE)$$

, where $r_r(BB)=1$, and [Math. 33]

where, as to the term having a jointness of −1, the value −1 is replaced with 0 for multiplication.
Here, Math. 35 is obtained based on Math. 34 below.

$$r_r(AE)\cong 0, X_{jnt}(B)\cong 0, X_{jnt}(C)\cong 0, r_r(DE)\cong 0, X_{jnt}(E)\cong 0 \quad [\text{Math. 34}]$$

$$X_{reg}(E)\cong 0 \quad [\text{Math. 35}]$$

To be more specific, a positive value in which the articulated object region likelihood is reflected was obtained for the trajectory B on the articulated object region, and the value of the articulated object region of the trajectory E outside the articulated object region was suppressed to be small.

It is possible to separate the trajectory E located outside the articulated object region, from the trajectories A to D on the articulated object region, by performing calculation based on the processes described above, and the display control unit 106 can display only the trajectories on the articulated object region.

Figure 21:
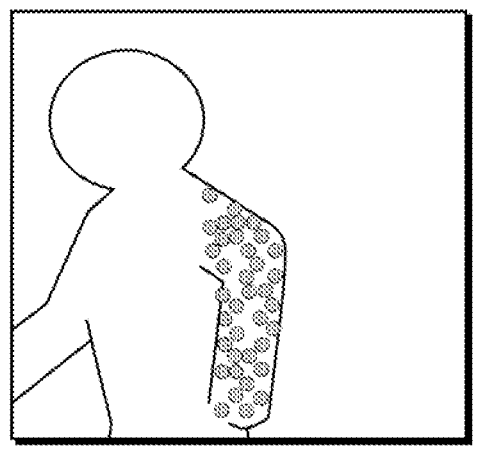
FIG. 21 is a diagram which shows an example of an image outputted from the display control unit.

FIG. 21 shows an example case where an articulated object region likelihood is displayed which is calculated from a scene in which the entire arm moves, for example. The positions each of which has an articulated object region likelihood equal to or larger than a predetermined threshold is colored.

In FIG. 17, only the elbow which is the joint part is emphasized by gradation. Contrary to this, in the example of FIG. 21, all of the parts that are likely to be articulate object regions are extracted, and thus the articulate object regions can easily be visually recognized.

Embodiment 4

The following describes an articulation region belongingness calculating apparatus according to Embodiment 4 of the present disclosure.

Figure 22:
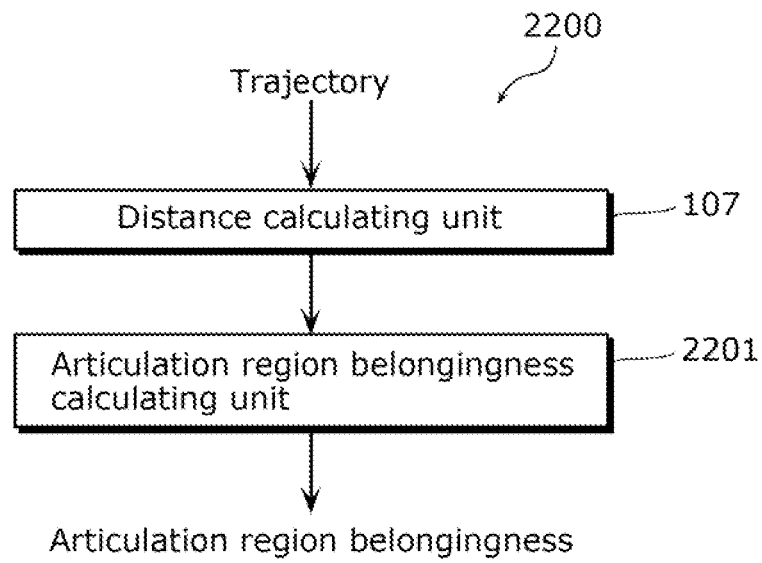
FIG. 22 is a block diagram which shows a functional configuration of an articulation region belongingness calculating apparatus according to Embodiment 4 of the present disclosure.

FIG. 22 is a block diagram which shows a functional configuration of the articulation region belongingness calculating apparatus.

The articulation region belongingness calculating apparatus 2200 calculates a belongingness to an articulation region for each of the trajectories corresponding, in a one-to-one relationship, to regions included in a moving object in video. The articulation region belongingness calculating apparatus 2200 includes a distance calculating unit 107 and an articulation region belongingness calculating unit 2201.

The distance calculating unit 107 is a processing unit which receives, as an input, the trajectories described above, and calculates, for a given pair of trajectories included in the trajectories, a distance indicating the similarity between the trajectories. The processing performed by the distance calculating unit 107 is the same as the processing described in Embodiment 1.

The articulation region belongingness calculating unit 2201 calculates, as a belongingness of a first trajectory to an articulation region, a jointness which indicates the degree of likelihood of simultaneously satisfying three relationships; that is, (i) a region corresponding to the first trajectory and a region corresponding to a second trajectory are present on the same rigid body, (ii) the region corresponding to the first trajectory and a region corresponding to a third trajectory are present on the same rigid body, and (iii) the region corresponding to the second trajectory and the region corresponding to the third trajectory are separately present on different rigid bodies that are connected via the same joint, based on a temporal change in a point-to-point distance and a temporal change in a geodetic distance between two given trajectories among the first trajectory, the second trajectory, and the third trajectory. Accordingly, the articulation region belongingness calculating unit 2201 calculates, for each of the trajectories, the belongingness of the trajectory to an articulation region; that is, the level of possibility that the trajectory is present on the articulation region. The articulation region belongingness calculating unit 2201 calculates the jointness of a trajectory as the belongingness to an articulation region of the trajectory. The articulation region belongingness calculating unit 2201 is capable of calculating the jointness using the same method as the method described is Embodiment 1 or Embodiment 2.

Figure 23:
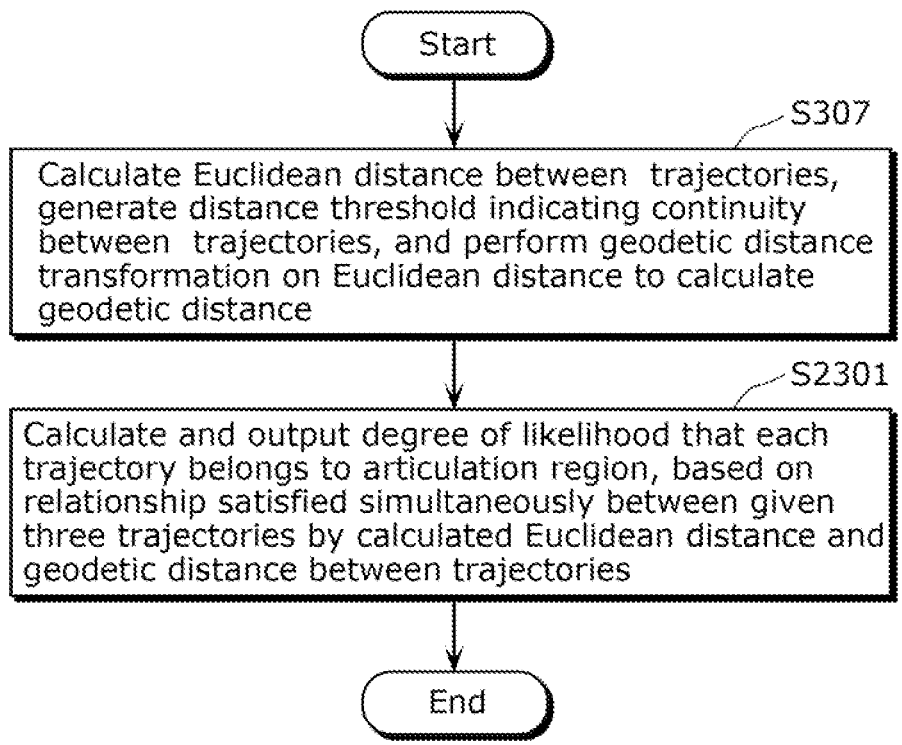
FIG. 23 is a flowchart which shows an operation of the articulation region belongingness calculating apparatus.

FIG. 23 is a flowchart which shows an operation of the articulation region belongingness calculating apparatus 2200.

In FIG. 23, two steps of S307 and S2301 correspond to the distance calculating unit 107 and the articulation region belongingness calculating unit 2201, respectively, of FIG. 22. To be more specific, the distance calculating unit 107 performs the operation of step S307, and the articulation region belongingness calculating unit 2201 performs the operation of step S2301.

In step S307, the distance calculating unit 107 receives, as an input, a plurality of trajectories corresponding, in a one-to-one relationship, to a plurality of regions included in a moving object in video, and calculates, for a pair of given trajectories included in a plurality of trajectories, (i) a point-to-point distance that is a distance directly connecting between the trajectories of the pair of trajectories, and (ii) a geodetic distance that is a distance of a path that passes, from one of the trajectories of the pair of trajectories through, as a relay point, a trajectory other than the trajectories of the pair of trajectories to reach the other. It is to be noted that the details of step S307 are as described in Embodiment 1.

In step S2301, the articulation region belongingness calculating unit 2201 calculates, as a belongingness of the first trajectory to an articulation region, a jointness which indicates the degree of likelihood of simultaneously satisfying three relationships; that is, (i) a region corresponding to the first trajectory and a region corresponding to the second trajectory are present on the same rigid body, (ii) the region corresponding to the first trajectory and a region corresponding to the third trajectory are present on the same rigid body, and (iii) the region corresponding to the second trajectory and the region corresponding to the third trajectory are separately present on different rigid bodies that are connected via the same joint, based on a temporal change in a point-to-point distance and a temporal change in a geodetic distance between two given trajectories among the first trajectory, the second trajectory, and the third trajectory. More specifically, the articulation region belongingness calculating unit 2201 calculates the jointness of the first trajectory using substantially the same method as the method described in step S308 and step S305 in FIG. 3.

According to Embodiment 4, the belongingness of a trajectory to an is calculated based on the temporal change in the geodetic distance and the temporal change in the point-to-point distance between trajectories, thereby enabling accurate calculation of the belongingness of the trajectory to the articulation region without being affected by a change in the shape of the moving object.

Embodiment 5

The following describes an articulated object region belongingness calculating apparatus according to Embodiment 5 of the present disclosure.

Figure 24:
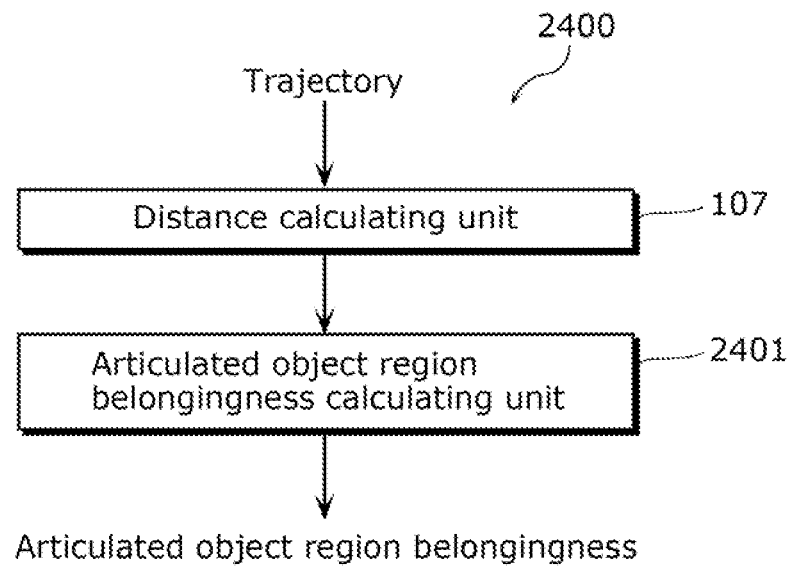
FIG. 24 is a block diagram which shows a functional configuration of an articulation region belongingness calculating apparatus according to Embodiment 5 of the present disclosure.

FIG. 24 is a block diagram which shows a functional configuration of the articulated object region belongingness calculating apparatus. The articulated object region belongingness calculating apparatus 2400 calculates, for each of the trajectories corresponding, in a one-to-one relationship, to regions included in a moving object in video, a belongingness to an articulated object region that is a region connected via an articulation region. The articulated object region belongingness calculating apparatus 2400 includes a distance calculating unit 107 and an articulated object region belongingness calculating unit 2401.

The distance calculating unit 107 is a processing unit which receives, as an input, the trajectories described above, and calculates, for a given pair of trajectories included in the trajectories, a distance indicating the similarity between the trajectories. The processing performed by the distance calculating unit 107 is the same as the processing described in Embodiment 1.

The articulated object region belongingness calculating unit 2401 calculates, an articulated object region likelihood based on the degree of likelihood of simultaneously satisfying three relationships; that is, (i) a region corresponding to the first trajectory and a region corresponding to the second trajectory are present on the same rigid body, (ii) the region corresponding to the first trajectory and a region corresponding to the third trajectory are present on the same rigid body, and (iii) the region corresponding to the second trajectory and the region corresponding to the third trajectory are separately present on different rigid bodies that are connected via the same joint, based on a temporal change in a point-to-point distance and a temporal change in a geodetic distance between two given trajectories among a target trajectory, the first trajectory, the second trajectory, and the third trajectory.

For example, it is possible to calculate the articulated object region likelihood calculated based on the degree of likelihood of satisfying the relationships, as the belongingness of the second trajectory and the third trajectory to the articulated object region.

Further desirably, it is possible to calculate, as the belongingness of the second trajectory to the articulated object region, the degree of likelihood of satisfying a relationship that the first trajectory is present in an articulation region and the region corresponding to the first trajectory and the region corresponding to the second trajectory are present in the same rigid body, based on the articulation region belongingness of the first trajectory among the target trajectory, the first trajectory, and the second trajectory, and a temporal change in the point-to-point distance and a temporal change in the geodetic distance between two target trajectories. As described in Embodiment 4, it is possible to calculate the articulation region belongingness of the first trajectory, based on the relationships of the above-described three items. It can be said that a trajectory "which is likely to be present on the same rigid body as a trajectory which is likely to be a joint" has a high belongingness to an articulated object region, and thus it is possible to calculate an articulated object region belongingness with higher accuracy.

More specifically, the articulated object region belongingness calculating unit 2401 calculates, for each of the trajectories, the belongingness of the trajectory to an articulated object region; that is, the level of possibility that the trajectory is present on the articulated object region. The articulated object region belongingness calculating unit 2401 calculates the articulated object region likelihood of a trajectory as the belongingness of the trajectory to an articulated object region. The articulated object region belongingness calculating unit 2401 is capable of calculating the articulated object region likelihood using the same method as the method described is Embodiment 3.

Figure 25:
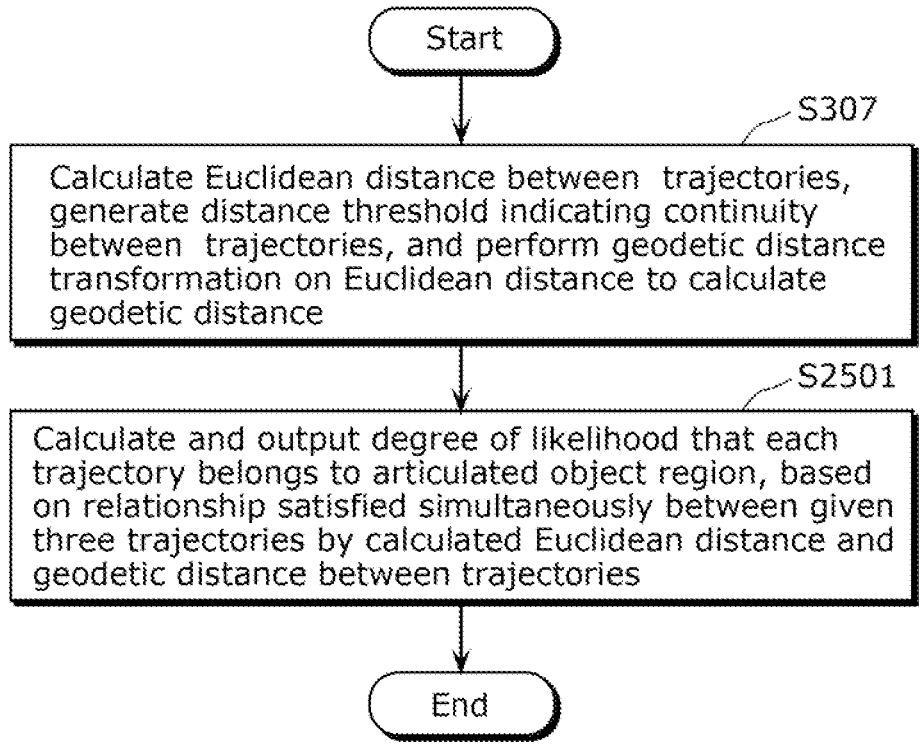
FIG. 25 is a flowchart which shows an operation of the articulated object region belongingness calculating apparatus.

FIG. 25 is a flowchart which shows an operation of the articulated object region belongingness calculating apparatus 2400.

In FIG. 25, two steps of S307 and S2501 correspond to the distance calculating unit 107 and the articulated object region belongingness calculating unit 2401, respectively, of FIG. 24. To be more specific, the distance calculating unit 107 performs the operation of step S307, and the articulated object region belongingness calculating unit 2401 performs the operation of step S2501.

In step S307, the distance calculating unit 107 receives, as an input, a plurality of trajectories corresponding, in a one-to-one relationship, to a plurality of regions included in a moving object in video, and calculates, for a pair of given trajectories included in a plurality of trajectories, (i) a point-to-point distance that is a distance directly connecting between the trajectories of the pair of trajectories, and (ii) a geodetic distance that is a distance of a path that passes, from one of the trajectories of the pair of trajectories through, as a relay point, a trajectory other than the trajectories of the pair of trajectories to reach the other. It is to be noted that the details of step S307 are as described in Embodiment 1.

In step S2501, the articulated object region belongingness calculating unit 2401 calculates, as a belongingness of a target trajectory to an articulated object region, an articulated object region likelihood calculated based on the degree of likelihood of simultaneously satisfying three relationships; that is, (i) a region corresponding to the first trajectory and a region corresponding to the second trajectory are present on the same rigid body, (ii) the region corresponding to the first trajectory and a region corresponding to the third trajectory are present on the same rigid body, and (iii) the region corresponding to the second trajectory and the region corresponding to the third trajectory are separately present on different rigid bodies that are connected via the same joint, based on a temporal change in a point-to-point distance and a temporal change in a geodetic distance between two given trajectories among a target trajectory, the first trajectory, the second trajectory, and the third trajectory which are included in the above-described trajectories. To be more specific, the articulated object region belongingness calculating unit 2401 calculates an articulated object region likelihood of a target trajectory, using the same method as that performed by the feature value calculating unit 1402, the articulation detecting unit 1401, and the articulated object region detecting unit 1901 shown in FIG. 19. According to Embodiment 5, the belongingness of a trajectory to an articulated object region is calculated based on the temporal change in the geodetic distance and the temporal change in a point-to-point distance between trajectories, thereby enabling accurate calculation of the belongingness of the trajectory to the articulation region without being affected by a change in the shape of the moving object. It is to be noted that it is also possible to implement the present disclosure as an articulation region detecting apparatus in which the display control unit 106 is deleted from the articulation region display apparatus according to Embodiments 1 to 3.

It is to be noted that, in the above-described Embodiments 1 to 3, the articulatedness calculating unit may: calculate the articulatedness as 0 in the case where (i) the temporal change in the geodetic distance between a given pair of trajectories is smaller than a predetermined geodetic distance threshold and (ii) the temporal change in the point-to-point distance between the given pair of trajectories is larger than a predetermined point-to-point distance; and calculate the articulatedness as 1 in the case where (iii) the temporal change in the geodetic distance between the given pair of trajectories is equal to or larger than the predetermined geodetic distance threshold and (iv) the temporal change in the point-to-point distance between the given pair of trajectories is equal to or smaller than the predetermined point-to-point distance.

It is to be noted that an object having an articulation that includes a joint and a rigid body region is used for description as a general example in the embodiments according to the present disclosure; however, a non-rigid-body object such as a string may be used instead. The string-shaped object can be regarded as an articulated object having small rigid bodies each connected via innumerable joints. Accordingly, the motion of the string can also be regarded as a series of innumerable articulated motions, and thus it is possible to calculate the jointness and display the articulated object region in the same manner according to the present technique.

In addition, the definition of a "region" used in the present disclosure includes not only a region including large number of trajectories but also a region including only a single trajectory. This is because it is possible, as long as there are at least one trajectory of a joint and two other trajectories, to calculate the jointness for each of the trajectories and the articulated object region likelihood.

It is to be noted that indispensable components of the articulation region display apparatus according to the present disclosure are the articulatedness calculating unit, the articulation detecting unit, and the display control unit included in the articulation region display apparatus according to Embodiments 1 to 3. In addition, indispensable components of the articulation region detecting apparatus according to the present disclosure are the articulatedness calculating unit and the articulation detecting unit included in the articulation region display apparatus according to Embodiments 1 to 3. It is to be noted that, in each of the embodiments, each of the components may be formed with dedicated hardware or may be implemented by executing a software program suitable to each of the components. Each of the components may be implemented by reading and executing, by a program executing unit such as a CPU and a processor as shown in FIG. 2, a software program recorded on a recoding medium such as a hard disk or a semiconductor memory. Here, the software that implements an image decoding apparatus of the above-described embodiment is a program as described below. For example, the program causes a computer to execute each of the steps included in an articulation region display method. The articulation region display method for (i) detecting an articulation region, using trajectories corresponding, in a one-to-one relationship, to regions included in a moving object in video and (ii) displaying the detected articulation region, includes: calculating, for a pair of given trajectories among trajectories each of which indicates a motion of a block between two or more pictures in the video, (i) a point-to-point distance that is a direct distance between the pair of trajectories and (ii) a geodetic distance that is a distance between a pair of trajectories which is a distance of a path that passes through, as a relay point, a trajectory other than the first trajectory and the second trajectory, to reach the second trajectory from the first trajectory, and (iii) an articulatedness, based on a temporal change in the point-to-point distance between the trajectories and a temporal change in the geodetic distance between the trajectories, the block including one or more pixels each of which constitutes a corresponding one of the pictures, and the articulatedness being a degree of likelihood that regions corresponding, in a one-to-one relationship, to the trajectories are connected via a same articulation (joint); detecting, as an articulation region, a region corresponding to a first trajectory, based on the articulatedness between the trajectories obtained in the calculating, the first trajectory being in a state where the region corresponding to the first trajectory and a region corresponding to a second trajectory are present on a same rigid body, the region corresponding to the first trajectory and a region corresponding to a third trajectory are present on a same rigid body, and the region corresponding to the second trajectory is connected with the region corresponding to the third trajectory via a same joint; and transforming the articulation region detected in the detecting, into a form that can be visually recognized by a user, and outputting each of the pictures.

Although only some exemplary embodiments have been described in detail above, those skilled in the art will readily appreciate that various modifications may be made in these exemplary embodiments without materially departing from the principles and spirit of the inventive concept, the scope of which is defined in the appended Claims and their equivalents.

INDUSTRIAL APPLICABILITY

One or more exemplary embodiments of the present disclosure are applicable to, for example, a motional analysis apparatus, a monitoring apparatus, an articulation region display apparatus to be built into an AV device such as a video camera and a TV, as the articulation region display apparatus that extracts a region of an articulation and a moving object including an articulation, by extracting an articulation of a moving object such as a person in a picture which moves changing its shape, based on the motion of the pictures.

The invention claimed is:

1. An articulation region display apparatus which (i) detects an articulation region, using trajectories which correspond to regions included in a moving object in video and (ii) displays the detected articulation region, said articulation region display apparatus comprising:

an articulatedness calculating unit configured to: calculate a pair-wise distances listed below for a pair of given trajectories, among trajectories each of which indicates a motion of a block between two or more pictures included in a video sequence, each of the blocks being included in a corresponding one of the pictures and having one or more pixels:

(i). a point-to-point distance that is a direct distance between the pair of trajectories;

(ii). a geodetic distance that is a distance of a path that passes through, as a relay point, a trajectory other than the pair of trajectories, from one of the pair of trajectories to reach the other;

and calculate an articulatedness which is a pair-wise measure to describe how likely a pair of trajectories are on a same articulated object, based on a temporal change in the point-to-point distance between the pair of trajectories and a temporal change in the geodetic distance between the pair of trajectories; and an articulation detecting unit configured to detect a region corresponding to a first trajectory as an articulation region, based on the articulatedness between the trajectories obtained by said articulatedness calculating unit, if the first trajectory satisfies three conditions listed below:
1. a region corresponding to the first trajectory and a region corresponding to a second trajectory are on a same rigid body;
2. the region corresponding to the first trajectory and a region corresponding to a third trajectory are on a same rigid body; and
3. the region corresponding to the second trajectory is connected with the region corresponding to the third trajectory via a same joint; and a display control unit configured to transform the articulation region detected by said articulation detecting unit into a form that can be visually recognized by a user, and output each of the pictures.

2. The articulation region display apparatus according to claim 1,
wherein said articulation detecting unit is configured to calculate a jointness based on the articulatedness between the trajectories obtained by said articulatedness calculating unit, and detect the articulation region from the calculated jointness which indicates how likely the first trajectory belongs to the articulation region, based on how likely the three trajectories including the first trajectory satisfies the condition listed below:
1. a region corresponding to the first trajectory and a region corresponding to a second trajectory are on a same rigid body;
2. the region corresponding to the first trajectory and the a region corresponding to a third trajectory are on a same rigid body; and
3. the region corresponding to the second trajectory is connected with the region corresponding to the third trajectory via the same joint.

3. The articulation region display apparatus according to claim 2,
wherein said articulation detecting unit is configured to detect a region to which a trajectory with a local maximum value of the calculated jointness belongs, as the articulation region.

4. The articulation region display apparatus according to claim 2,
wherein said articulation detecting unit is configured to (i) select pairs of trajectories from the trajectories other than a target trajectory, (ii) calculate the jointness of the target trajectory by summing the articulatedness calculated among the target trajectory and each selected trajectory pairs, and (iii) determine whether or not a region corresponding to the target trajectory can be detected as the articulation region, based on the jointness of the target trajectory.

5. The articulation region display apparatus according to claim 1,
wherein said articulation detecting unit is configured to, firstly, detect a pair of trajectories that each belongs to a same rigid body, by determining whether or not a pair of trajectories are on the same rigid body, based on the articulatedness between the pair calculated by said articulatedness calculating unit, and then, detect a region corresponding to a first trajectory as the articulation region, if the first trajectory satisfies the conditions listed below:
1. a region corresponding to the first trajectory and a region corresponding to a second trajectory are on a same rigid body;
2. the region corresponding to the first trajectory and a region corresponding to a third trajectory are on a same rigid body; and
3. the region corresponding to the second trajectory is connected with the region corresponding to the third trajectory via the same joint.

6. The articulation region display apparatus according to claim 1,
wherein said articulation detecting unit is configured to, firstly detect, using limited pairs of trajectories only with the articulatedness, calculated by said articulatedness calculating unit, equal to or smaller than a predetermined threshold, the pairs of trajectories that each belongs to a same rigid body, by determining whether or not each pair of trajectories are on a same rigid body, based on the articulatedness between the pair that is calculated by said articulatedness calculating unit, and then detect a region corresponding to a first trajectory, as the articulation region, if the first trajectory satisfies the conditions listed below:
1. a region corresponding to the first trajectory and a region corresponding to a second trajectory are on a same rigid body;
2. the region corresponding to the first trajectory and a region corresponding to a third trajectory are on a same rigid body; and
3. the region corresponding to the second trajectory is connected with the region corresponding to the third trajectory via the same joint.

7. The articulation region display apparatus according to claim 1,
wherein, the temporal change in the geodetic distance between the trajectories is an absolute sum of the temporal changes in the geodetic distances throughout a frameset with a series of frames of predetermined frameset length.

8. The articulation region display apparatus according to claim 1,
wherein, the temporal change in the point-to-point distance between the trajectories is an absolute sum of the temporal changes in the point-to-point distances throughout a frameset with a series of frames of predetermined frameset length.

9. The articulation region display apparatus according to claim 1,
wherein, said articulatedness calculating unit is configured to calculate the articulatedness between the trajectories, based on a value obtained by dividing the temporal change in the geodetic distance between the trajectories by the temporal change in the point-to-point distance between the trajectories.

10. The articulation region display apparatus according to claim 1,
wherein, said articulatedness calculating unit is configured to calculate the articulatedness between the trajectories, using a data table on which a correspondence between the temporal change in the geodetic distance, the temporal change in the point-to-point distance, and the articulatedness is mapped, as a reference.

11. The articulation region display apparatus according to claim 1,
wherein said articulatedness calculating unit is configured to: calculate the articulatedness as 1 in the case where (i) the temporal change in the geodetic distance between the trajectories is smaller than a predetermined geodetic distance threshold and (ii) the temporal change in the point-to-point distance between the trajectories is larger than a predetermined point-to-point distance threshold; and calculate the articulatedness as 0 in the case where (iii) the temporal change in the geodetic distance between the trajectories is equal to or larger than the predetermined geodetic distance threshold or (iv) the temporal change in the point-to-point distance between the trajectories is equal to or smaller than the predetermined point-to-point distance.

12. The articulation region display apparatus according to claim 2,
wherein said display control unit is configured to: fill a region on the picture corresponding to a trajectory included in the articulation region detected by said articulation detecting unit, with a specified color, and output the picture.

13. The articulation region display apparatus according to claim 2,
wherein said display control unit is configured to: fill a region on the picture corresponding to a trajectory included in a rigid body region obtained by removing the articulation region, detected by said articulation detecting unit, from the articulated object region comprised of regions connected via the articulation region, with a specified color, and output the picture.

14. The articulation region display apparatus according to claim 2,
wherein said display control unit is configured to: fill the regions on the picture each with different specified color and output the picture; the regions including (i) a region corresponding to a trajectory included in a rigid body region obtained by removing, from the articulated object region, the articulation region detected by said articulation detecting unit and (ii) a region corresponding to a trajectory included in the articulation region detected by said to articulation detecting unit, the articulated object region including regions connected via the articulation region.

15. The articulation region display apparatus according to claim 12,
wherein the specified color, for filling the region corresponding to the trajectory included in the articulation region detected by said articulation detecting unit, corresponds to a jointness of the articulation region detected by said articulation detecting unit.

16. The articulation region display apparatus according to claim 1,
wherein said display control unit is configured to superimpose, on the picture, a straight line connecting the articulation regions on a same rigid body region, and output the picture.

17. The articulation region display apparatus according to claim 1, further comprising:
an image input unit configured to capture the pictures included in the video; and
a trajectory calculating unit configured to: detect, per block including one or more pixels each of which constituting a corresponding one of the captured pictures, a motion of the block between two temporally neighboring pictures included in the video; and calculate the trajectories by concatenating the detected motion for the pictures.

18. The articulation region display apparatus according to claim 2,
wherein said articulatedness calculating unit is further configured to calculate, using a graph in which the temporal change in the point-to-point distance and the temporal change in the geodetic distance between the pair of trajectories are each indicated by a vertical axis and a horizontal axis, a same-rigid-body feature value indicating a degree of how likely a target pair of trajectories is included in a same rigid body, based on a distance from a straight line on which the temporal change in the point-to-point distance is equal to the temporal change in the geodetic distance, to a value of the temporal change in the point-to-point distance and a value of the temporal change in the geodetic distance of the target pair of trajectories.

19. The articulation region display apparatus according to claim 18, further comprising
an articulated object region detecting unit configured to detect an articulated object region by calculating an articulated object region likelihood that indicates how likely a trajectory belongs to the articulated object region including regions connected via an articulation region, as a product of (i) the same-rigid-body feature value between pairs of trajectories including a target trajectory, and (ii) the jointness of the trajectories among the said pairs other than the target trajectories.

20. An articulation region display apparatus which (i) detects an articulation region using trajectories which correspond to regions included in a moving object in video and (ii) displays the detected articulation region, said articulation region display apparatus comprising:
an articulatedness calculating unit configured to: calculate a pair-wise distances listed below for a pair of given trajectories among trajectories each of which indicates a motion of a block between two or more pictures included in the video:
(i) a point-to-point distance that is a direct distance between the pair of trajectories;
(ii) a geodetic distance that is a distance of a path that passes through, as a relay point, a trajectory other than the pair of trajectories, from one of the pair of trajectories to reach the other;
and calculate an articulatedness, for a temporal change in the point-to-point distance between the trajectories and a temporal change in the geodetic distance between the trajectories, such that the articulatedness results in a larger positive value as the temporal change in an Euclidean (point-to-point) distance is larger or the temporal change in the geodetic distance is smaller, the block including one or more pixels each of which constitutes a corresponding one of the pictures;
an articulation detecting unit configured to detect a region corresponding to a first trajectory, as an articulation region, based on the articulatedness between the trajectories obtained by said articulatedness calculating unit, if the first trajectory satisfies the conditions listed below:
1. a region corresponding to the first trajectory and a region corresponding to a second trajectory are on a same rigid body;
2. the region corresponding to the first trajectory and a region corresponding to a third trajectory are on a same rigid body;
3. the regions, each of which corresponding to the second trajectory and the third trajectory are connected to each other via a same joint; and a display control unit configured to transform the articulation region detected by said articulation detecting unit into a form that can be visually recognized by a user, and output the transformed articulation region.

21. An articulation region display apparatus which (i) detects an articulation region using trajectories corresponding, in a one-to-one relationship, to regions included in a moving object in video and (ii) displays the detected articulation region, said articulation region display apparatus comprising:

an articulatedness calculating unit configured to: calculate a pair-wise distances listed below for a pair of given trajectories among trajectories, each of which indicates a motion of a block between two or more pictures included in a video sequence, each of the blocks being included in a picture and having one or more pixels;

(i) a point-to-point distance that is a direct distance between a pair of trajectories; and (ii) a geodetic distance that is a distance of a path that passes through, as a relay point, a trajectory other than the pair of trajectories, from one of the pair of trajectories to reach the other;

and calculate an articulatedness, using a graph in which the temporal change in the point-to-point distance and the temporal change in the geodetic distance between the pair of trajectories are indicated by a vertical axis and a horizontal axis, such that the articulatedness results in a larger value as a distance from a straight line on which the temporal change in the point-to-point distance is equal to the temporal change in the geodetic distance, to a value of the temporal change in the point-to-point distance and a value of the temporal change in the geodetic distance of the target pair that is a pair of the target trajectories is larger;

an articulation detecting unit configured to detect, as an articulation region, a region corresponding to a first trajectory, based on the articulatedness between the trajectories obtained by said articulatedness calculating unit, if the first trajectory satisfies the conditions listed below:

1. the region corresponding to the first trajectory and a region corresponding to a second trajectory are on a same rigid body;
2. the region corresponding to the first trajectory and a region corresponding to a third trajectory are on a same rigid body;
3. the regions each of which corresponding to the second trajectory and the third trajectory are connected to each other via a same joint; and a display control unit configured to transform the articulation region detected by said articulation detecting unit into a form that can be visually recognized by a user, and output each of the pictures.

22. An articulation region detecting apparatus which detects an articulation region using trajectories corresponding, in a one-to-one relationship, to regions included in a moving object in video, said articulation region detecting apparatus comprising:

an articulatedness calculating unit configured to: calculate a pair-wise distances listed below for a pair of given trajectories among trajectories each of which indicates a motion of a block between two or more pictures included in a video sequence, each of the blocks being included in a picture and having one or more pixels;

(i) a point-to-point distance that is a direct distance between a pair of trajectories; and (ii) a geodetic distance that is a distance of a path that passes through, as a relay point, a trajectory other than the pair of trajectories, from one of the pair of trajectories to reach the other;

and calculate an articulatedness based on a temporal change in the point-to-point distance between the trajectories and a temporal change in the geodetic distance between the trajectories, and the articulatedness being a degree of how likely the regions corresponding, in a one-to-one relationship, to the trajectories are connected via a same joint; and an articulation detecting unit configured to detect, as an articulation region, a region corresponding to a first trajectory, based on the articulatedness between the trajectories obtained by said articulatedness calculating unit, if the first trajectory satisfies the conditions listed below:

1. the region corresponding to the first trajectory and a region corresponding to a second trajectory are on a same rigid body;
2. the region corresponding to the first trajectory and a region corresponding to a third trajectory are on a same rigid body;
3. the regions each of which corresponding to the second trajectory and the third trajectory are connected to each other via a same joint.

23. An articulation region belongingness calculating apparatus which calculates a belongingness to an articulation region for each of trajectories corresponding, in a one-to-one relationship, to regions included in a moving object in video, said articulation region belongingness calculating apparatus comprising:

a distance calculating unit configured to calculate a pair-wise distances listed below for a pair of given trajectories among trajectories each of which indicates a motion of a block between two or more pictures included in a video sequence, each of the blocks being included in a picture and having one or more pixels;

(i) a point-to-point distance that is a direct distance between the pair of trajectories; and (ii) a geodetic distance that is a distance of a path that passes through, as a relay point, a trajectory other than the pair of trajectories, from one of the pair of trajectories to reach the other; and an articulation region belongingness calculating unit configured to calculate a jointness as a belongingness of a first trajectory to an articulation region, based on a temporal change in the point-to-point distance and a temporal change in the geodetic distance of two given trajectories among the first trajectory, a second trajectory, and a third trajectory, the jointness value indicating a degree at which three relationships listed below are simultaneously satisfied:

1. a region corresponding to the first trajectory and a region corresponding to the second trajectory are on a same rigid body;
2. the region corresponding to the first trajectory and a region corresponding to the third trajectory are on a same rigid body;
3. the regions each of which corresponding to the second trajectory and the region corresponding to the third trajectory are on different rigid bodies connected via a same joint.

24. An articulated object region belongingness calculating apparatus which calculates, for each of trajectories corresponding, in a one-to-one relationship, to regions included in a moving object in video, a belongingness to an articulated object region including regions connected via the articulation region, said articulated object region belongingness calculating apparatus comprising:

a distance calculating unit configured to calculate a pair-wise distances listed below for a pair of given trajectories among trajectories each of which indicates a motion of a block between two or more pictures included in a video sequence, each of the blocks being included in a picture and having one or more pixels:
(i) a point-to-point distance that is a direct distance between the pair of trajectories; and
(ii) a geodetic distance that is a distance of a path that passes through, as a relay point, a trajectory other than the pair of trajectories, from one of the pair of trajectories to reach the other; and an articulated object region belongingness calculating unit configured to calculate an articulated object region likelihood as a belongingness of a target trajectory to an articulated object region, based on a temporal change in the point-to-point distance and a temporal change in the geodetic distance of two given trajectories among the target trajectory, a first trajectory, a second trajectory, and a third trajectory, the articulated object region likelihood being calculated based on a degree at which three relationships listed below are simultaneously satisfied;
1. a region corresponding to the first trajectory and a region corresponding to the second trajectory are on a same rigid body;
2. the region corresponding to the first trajectory and a region corresponding to the third trajectory are on a same rigid body;
3. the regions each of which corresponding to the second trajectory and the region corresponding to the third trajectory are on different rigid bodies connected via a same joint.

25. An articulation region display method for (i) detecting an articulation region, using trajectories corresponding, in a one-to-one relationship, to regions included in a moving object in video and (ii) displaying the detected articulation region, said articulation region display method comprising:

Calculating, a pair-wise distances listed below for a pair of given trajectories among trajectories, each of which indicates a motion of a block between two or more pictures included in a video sequence, each of the blocks being included in a picture and having one or more pixels:
(i) a point-to-point distance that is a direct distance between the pair of trajectories;
(ii) a geodetic distance that is a distance of a path that passes through, as a relay point, a trajectory other than the pair of trajectories, from one of the pair of trajectories to reach the other;
and an articulatedness which is a pair-wise measure to describe how likely a pair of trajectories are on a same articulated object, based on a temporal change in the point-to-point distance between the trajectories and a temporal change in the geodetic distance between the trajectories; and detecting a region corresponding to a first trajectory as an articulation region, based on the articulatedness between the trajectories obtained in said calculating, if the first trajectory satisfies the conditions listed below:
1. a region corresponding to the first trajectory and a region corresponding to a second trajectory are present on a same rigid body;
2. a region corresponding to the first trajectory and a region corresponding to a third trajectory are present on a same rigid body;
3. the regions each of which corresponding to the second trajectory and the third trajectory are connected to each other via a same joint; and transforming the articulation region detected in said detecting, into a form that can be visually recognized by a user, and outputting each of the pictures.

26. A non-transitory computer-readable recording medium for use in a computer, said recording medium having a computer program recorded thereon for causing the computer to execute the steps of the articulation region display method according to claim 25.

* * * * *